(12) United States Patent
Rudaz et al.

(10) Patent No.: US 9,317,988 B2
(45) Date of Patent: Apr. 19, 2016

(54) METHOD FOR GENERATING A SECURITY BI-LEVEL IMAGE FOR A BANKNOTE

(75) Inventors: Nicolas Rudaz, Veyras (CH); Martin Kutter, Remaufens (CH); Frederic Jordan, Les Paccots (CH); Jean-Claude Gilles, Frankfurt am Main (BE); Pierre Durant, Frankfurt am Main (DE)

(73) Assignee: EUROPEAN CENTRAL BANK (ECB), Frankfurt am Main (DE)

( * ) Notice: Subject to any disclaimer, the term of this patent is extended or adjusted under 35 U.S.C. 154(b) by 986 days.

(21) Appl. No.: 13/394,780

(22) PCT Filed: Sep. 8, 2010

(86) PCT No.: PCT/EP2010/063173
§ 371 (c)(1),
(2), (4) Date: Dec. 12, 2012

(87) PCT Pub. No.: WO2011/029845
PCT Pub. Date: Mar. 17, 2011

(65) Prior Publication Data
US 2013/0114876 A1    May 9, 2013

Related U.S. Application Data

(60) Provisional application No. 61/240,689, filed on Sep. 9, 2009.

(30) Foreign Application Priority Data

Sep. 9, 2009   (EP) .................................... 09169875

(51) Int. Cl.
*G06K 9/00* (2006.01)
*G07D 7/20* (2006.01)
*H04N 1/32* (2006.01)

(52) U.S. Cl.
CPC .............. *G07D 7/20* (2013.01); *H04N 1/32203* (2013.01); *H04N 1/32208* (2013.01); *H04N 1/32256* (2013.01); *H04N 1/32293* (2013.01); *H04N 1/32325* (2013.01); *H04N 2201/328* (2013.01)

(58) Field of Classification Search
CPC .................................. G07D 7/12; G07D 7/20

USPC .......... 235/462.01; 359/2; 382/100, 171, 196, 382/198, 199
See application file for complete search history.

(56) References Cited

U.S. PATENT DOCUMENTS 5,416,851 A * 5/1995 Huttenlocher et al. ....... 382/196
(Continued)

FOREIGN PATENT DOCUMENTS

| EP | 0962886 | 12/1999 |
|----|---------|---------|
| EP | 1691539 | 8/2006 |
| GB | 2369949 | 6/2002 |

(Continued)

OTHER PUBLICATIONS

Danielsson, P.E., "Euclidean Distance Mapping," Computer Graphics and Image Processing, vol. 14, pp. 227-248, 1980.*
(Continued)

*Primary Examiner* — Vikkram Bali
*Assistant Examiner* — Xuemei Chen
(74) *Attorney, Agent, or Firm* — Cowan, Liebowitz & Latman, P.C.; Steven D. Underwood

(57) ABSTRACT

The present invention proposes a method for generating a security bi-level image used to form one of the inks of a banknote, said image comprising an original bi-level image and a security pattern, said security pattern being obtained in the spatial domain by the inverse Fourier transform of the combination in the frequency domain between the Fourier transform of an auxiliary image and a two-dimensional sweep, said two-dimensional sweep being a circularly symmetric, two-dimensional pattern created by sweeping a self-similar, one-dimensional function along a 360-degree arc, such as said security pattern being detectable from the maximum value of the cross-correlation of said one-dimensional function with the Fourier transform of one line of said banknote, said method comprising the step of: —determining a distance map of the original bi-level image, —generating a merged image by linearly interpolating at least a part of said distance map with said security pattern, —thresholding the merged image to obtain the security bi-level image, —applying the security bi-level image on a support.

7 Claims, 52 Drawing Sheets

(56) References Cited

U.S. PATENT DOCUMENTS

| | | | | |
|---|---|---|---|---|
| 5,513,277 | A | * | 4/1996 | Huttenlocher ................ 382/171 |
| 6,240,209 | B1 | * | 5/2001 | Wilcke .......................... 382/198 |
| 6,345,104 | B1 | * | 2/2002 | Rhoads ......................... 382/100 |
| 6,865,001 | B2 | * | 3/2005 | Long et al. ........................ 359/2 |
| 7,991,186 | B2 | * | 8/2011 | Rudaz et al. .................. 382/100 |
| 2001/0005431 | A1 | | 6/2001 | Mori |
| 2002/0001095 | A1 | | 1/2002 | Kawakami et al. |
| 2007/0108287 | A1 | * | 5/2007 | Davis et al. .............. 235/462.01 |
| 2010/0061637 | A1 | * | 3/2010 | Mochizuki et al. ........... 382/199 |

FOREIGN PATENT DOCUMENTS

| | | |
|---|---|---|
| JP | 2003-244426 | 8/2003 |
| JP | 2004-015396 | 1/2004 |
| WO | WO 02/087251 | 10/2002 |

OTHER PUBLICATIONS

Written Opinion of the International Searching Authority re PCT/EP2010/063173, Mar. 13, 2012.

International Search Report of PCT/EP2010/063173 dated May 2, 2011.

* cited by examiner

1014

1023

1024

1025　　　　　　　　　　　1026

1029 dH_K

| 2 | 1 | 0 | 0 | 0 | 0 | 0 | 0 |
|---|---|---|---|---|---|---|---|
| 2 | 1 | 0 | 0 | 0 | 0 | 1 | 1 |
| 1 | 0 | 0 | 0 | 1 | 1 | 2 | 2 |
| 0 | 0 | 0 | 0 | 1 | 2 | 3 | 3 |
| 0 | 0 | 0 | 1 | 2 | 3 | 4 | 4 |
| 0 | 0 | 0 | 1 | 2 | 3 | 4 | 5 |
| 0 | 0 | 1 | 2 | 3 | 4 | 5 | 6 |
| 0 | 0 | 1 | 2 | 3 | 4 | 5 | 6 |

2101 dH_W

| 0 | 0 | 1 | 2 | 2 | 2 | 1 | 1 |
|---|---|---|---|---|---|---|---|
| 0 | 0 | 1 | 2 | 1 | 1 | 0 | 0 |
| 0 | 1 | 2 | 1 | 0 | 0 | 0 | 0 |
| 1 | 2 | 2 | 1 | 0 | 0 | 0 | 0 |
| 2 | 2 | 1 | 0 | 0 | 0 | 0 | 0 |
| 3 | 2 | 1 | 0 | 0 | 0 | 0 | 0 |
| 2 | 1 | 0 | 0 | 0 | 0 | 0 | 0 |
| 2 | 1 | 0 | 0 | 0 | 0 | 0 | 0 |

| 4 | 3 | 2 | 3 | 4 |
|---|---|---|---|---|
| 3 | 2 | 1 | 2 | 3 |
| 2 | 1 | 0 | 1 | 2 |
| 3 | 2 | 1 | 2 | 3 |
| 4 | 3 | 2 | 3 | 4 |

2103

$L_\infty$

| 2 | 2 | 2 | 2 | 2 |
|---|---|---|---|---|
| 2 | 1 | 1 | 1 | 2 |
| 2 | 1 | 0 | 1 | 2 |
| 2 | 1 | 1 | 1 | 2 |
| 2 | 2 | 2 | 2 | 2 |

2104

$L_2$

| $\sqrt{8}$ | $\sqrt{5}$ | 2 | $\sqrt{5}$ | $\sqrt{8}$ |
|---|---|---|---|---|
| $\sqrt{5}$ | $\sqrt{2}$ | 1 | $\sqrt{2}$ | $\sqrt{5}$ |
| 2 | 1 | 0 | 1 | 2 |
| $\sqrt{5}$ | $\sqrt{2}$ | 1 | $\sqrt{2}$ | $\sqrt{5}$ |
| $\sqrt{8}$ | $\sqrt{5}$ | 2 | $\sqrt{5}$ | $\sqrt{8}$ |

METHOD FOR GENERATING A SECURITY BI-LEVEL IMAGE FOR A BANKNOTE

CROSS-REFERENCE TO RELATED APPLICATIONS

This application claims priority to International Application No. PCT/EP2010/063173 filed on Sep. 8, 2010, Application No. EP 09169 875.3, filed Sep. 9, 2009, and U.S. Provisional Application No. 61/240,689, filed Sep. 9, 2009, the entire disclosures of which are hereby incorporated by reference.

INTRODUCTION

The present invention concerns the field of the methods to embed security patterns within a printed image, in particular for banknotes.

STATE OF THE ART

Many solutions have been devised in the past in order to allow the easy spotting of counterfeit documents. Recently, more direct approaches were proposed that try to stop the counterfeiting attempt before a counterfeit document can be actually produced. In these approaches, the document carries a security feature that is detectable by the device used for the counterfeiting attempt. When detecting the security feature, the device can react so as to thwart the attempt by interrupting its normal operation, shutting itself down or silently distorting its output. Existing solutions are based on optically visible features, or on invisible elements using special consumables, or on digital signal processing methods. Visible solutions that do not require special consumables such as security inks offer a weak resistance against the ingenuity of counterfeiters. On the other hand, the detectors of invisible features have high demands for computational power and memory. It should be noted that in both cases feature detection is usually based on the acquisition of a digital image followed by a signal processing method for digitally detecting the security feature. As a consequence, a detector for an invisible solution cannot be implemented directly into those devices with low computational capabilities, like printers, scanners, monitors or digital cameras, that are frequently involved in counterfeiting attempts, but it must be instead implemented in software at the computer level. The current invention describes a way to eschew this limitation by using a special combination of a security pattern and a detection process, allowing for visible or invisible features that can be detected with little processing power. Since it is designed to protect banknotes that are usually entirely covered by a rich graphical content, the security pattern may be seamlessly integrated into the separation halftone images that are crafted by the designer of the banknote, and that serve the purpose of producing the offset or intaglio plates used for transferring the inks to the banknote paper during the printing process. If required, the integration of the security pattern can be adapted for preserving critical characteristics of these separation halftone images: for instance, the device performing the integration can be instructed to preserve a minimal thickness in the modulated halftone elements, or the amplitude of modulation can be limited to a set of predefined values. In addition, the coarseness and the internal symmetries of the security pattern may be freely adjusted by the designer so as to blend smoothly and harmoniously in the banknote design.

Several techniques used for protecting valuable documents against illegal duplication use small, localized variations of the visual appearance of the protected documents. These variations can take the form of a human-readable pattern (microtext, evolutionary screen dots [U.S. Pat. No. 6,198,545], moiré patterns [U.S. Pat. No. 5,995,638], microstructure color differences [EP 1073257A1]), or they can be implemented using invisible, but machine-readable patterns (Cryptoglyph WO01/00560, WO03/04178). In either case, authenticating a document protected by these methods requires the access to a significantly large digitized area of the document at some or all times during the authentication process. In digital signal processing this is translated into performing a computation on a 2D (two dimensional) matrix composed of pixel values of the acquired image.

This requirement poses two problems. A first problem arises with the authentication of a document in the case where a minimum document surface is not available in its entirety at some time during the authentication process. This is for instance the case for documents that are digitally transmitted over a serial line or a bus system, e.g. document transmission from a scanner to a computer, from a camera to a computer, from a computer to a printer, between two computers or between a computer and a mobile phone.

A second problem arises when the authentication of documents has to be performed by devices that have only little memory or a low processing power. When the size of the document increases linearly, the memory and time required to process the document increase geometrically. Therefore, authenticating security documents used in everyday life, e.g. banknotes, plane tickets or ID cards, is a major problem for devices such as scanners, printers, digital cameras and mobile phones.

One important approach for invisible signal embedding is referred in the literature as "digital watermarking". Digimarc describes several approaches especially suitable for banknotes in U.S. Pat. No. 6,771,796, U.S. Pat. No. 6,754,377, U.S. Pat. No. 6,567,534, U.S. Pat. No. 6,449,377. These approaches rely on modifications performed at a microscopic level (i.e. 40 μm or lower, corresponding to about 600 dpi resolution). These modifications are done in such a way that they can be detected at a macroscopic level (i.e. using 100 dpi scanning resolution), but are generally invisible for the naked eye (Digimarc also describes some techniques yielding to visible alterations in U.S. Pat. No. 6,674,886 and U.S. Pat. No. 6,345,104). The detection of the digital watermark and decoding of the embedded data are performed using combinations of image processing algorithms which can be found in the digital watermarking literature. Some of these algorithms include in particular reference patterns in Fourier domain (for affine transform registration), cross-correlation in the spatial domain (for registration against image shift) and correlation in order to decode the signal. It should be highlighted that the most challenging part of the detection process is usually to define a process that is robust against geometrical transformations as well as reaching satisfying reliability performance. In some cases, a so-called "fragile digital watermarking" technique is used. With this technique, the embedded signal disappears when a copy of the protected document is performed. It enables to distinguish between original documents and copies. One example of such an approach is described in WO2004/051917. Other approaches enable data embedding in halftone images. Many solutions rely on an optical, analog process for revealing the data. However, some solutions are also based on digital processing. In this case the common technique is to modify slightly the threshold matrix in order to embed some information. Basically, any halftone image produced using this matrix and the original gray level image carries the signal. One solution is described in U.S. Pat.

No. 6,760,464 (and U.S. Pat. No. 6,694,041) and another approach is also presented in U.S. Pat. No. 6,723,121 each with a different watermarking technique. A more generic approach which does not specify a particular digital watermarking technique is described in U.S. Pat. No. 6,775,394. Some approaches do not use digital watermarking technique (in the sense of robust steganography), like in U.S. Pat. No. 6,839,450 where authors describe a detection method of data embedded in halftone images using matched filter. It is possible to significantly improve embedding performance in halftone images by using a modified version of more sophisticated halftoning schemes. For instance, US2003021437 gives a description of a generation of a dither matrix produced from a bilevel image using morphological operations. This dither matrix is then used for producing halftone images, which may be used in security printing. Inserting a signal into a digital media or printing it on a document and detecting it later has been address extensively in older patents. From a technical point of view the main issues to solve are signal design, signal embedding and signal detection. Here, the signal can be a modification applied to an existing image, or it can be embodied by the generation of an independent signal printed over an existing document or overlaid onto a digital image. The signal design is largely driven by the functional behavior of the detector. It is desirable that the detector should be able to detect or to retrieve the embedded signal independently of possible geometrical transformations applied to the protected media. To solve this challenge it is state of the art in digital marking technologies to either embed additional key characteristics in the spatial or even frequency domain that later allow for the identification of the geometrical transformation and its inversion (for instance the U.S. Pat. No. 6,408,082, U.S. Pat. No. 6,704,869 and U.S. Pat. No. 6,424,725 describe approaches where a log-polar in the transform domain is used to compute the geometrical transform). A different approach is based on the design and embedding of an auto-similar signal. During detection an auto-correlation function is computed. The analysis of the auto-correlation function then allows for the identification of the geometrical transformations and their inversions.

All the above solutions solve the problem of robust detection using 2-dimensional processing techniques for continuous or halftone images. However, none of them perform this detection using a 1D signal processing, which is required for applications based on low computing power systems.

A 1D solution is described in AU 2002951815 where the inventors propose an approach to mark digital images with embedded signal where the signals are represented by a 2D pattern constructed using a 1D basis function. For the detection of the pattern, the inventors first compute a projective transformation of the image and then retrieve the embedded information through a 1D correlation at different angles. However, since the correlation has to be re-computed for each angle, the overall complexity is still of the same order as for the 2D processing described above. In addition, the 2D patterns are defined in the spatial domain. Finally, the invention offers no way of embedding the 2D patterns into an existing halftone image while preserving essential characteristics of the halftone elements.

Another 1D solution is described in WO/2006/048368 where the inventors describe the generation of a security pattern under the form of a 2D grating obtained by sweeping a 1D signal along a predefined curve. The security pattern may be visible in either the spatial domain or in the frequency domain. It may be added to the banknote as a printed overlay, or it may be used as a dither matrix in order to generate a halftone image printed on the banknote. However, the invention described in WO/2006/048368 does not offer the possibility of controlling the visual aspect of the security pattern. In addition, it does not provide a method for modulating an existing halftone image with the security pattern. Finally, the preservation of essential characteristics of the halftone elements that are merged with the pattern cannot be guaranteed.

SHORT DESCRIPTION OF THE INVENTION

The present invention proposes a method for generating a security bi-level image used to form one of the inks of a banknote, said image comprising an original bi-level image and a security pattern, said security pattern being obtained in the spatial domain by the inverse Fourier transform of the combination in the frequency domain between the Fourier transform of an auxiliary image and a two-dimensional sweep, said two-dimensional sweep being a circularly symmetric, two-dimensional pattern created by sweeping a self-similar, one-dimensional function along a 360-degree arc, such as said security pattern being detectable from the maximum value of the cross-correlation of said one-dimensional function with the Fourier transform of one line of said banknote, said method comprising the step of:

determining a distance map of the original bi-level image,
generating a merged image by linearly interpolating at least a part of said distance map with said security pattern,
thresholding the merged image to obtain the security bi-level image,
applying the security bi-level image on a support.

The present invention discloses methods for generating a circularly invariant 2D grating based on a self-similar 1D source signal, for assembling a security pattern in the frequency domain based on a 2D grating and a random phase, for deriving a phase with orthogonal or hexagonal symmetries from a random phase, and for modulating the coarseness of a security pattern in the frequency domain. The present invention also discloses methods for embedding a security pattern into an existing grayscale image, for generating a grayscale image that follows the morphology of an existing bilevel image, for generating a thickness map of a halftone image, and for merging a security pattern with a halftone image while preserving essential morphological characteristics of the halftone elements.

In addition, the present invention discloses methods for retrieving a 1D signal from a 2D image by performing a circular sweep on the discrete Fourier transform of the 2D image, for resampling and flattening a 1D signal, for applying a predefined random permutation to a 1D signal and for cross-correlating a permuted 1D signal with a codebook of permuted templates.

Finally, the present invention discloses a method for measuring the overall signal strength as well as the local signal strength in a banknote that contains some areas embedded with a security pattern.

SHORT DESCRIPTION OF THE FIGURES

The disclosed invention is easier to understand with the help of the enclosed figures, in which:

FIG. 23 shows a fragment of a distance-to-black map and a fragment of a distance-to-white map.

FIG. 24 shows the fragments of a $L_1$, a $L_\infty$ and a $L_2$ distance map.

DETAILED DESCRIPTION OF THE INVENTION

Generation of a Security Pattern

Figure 1:
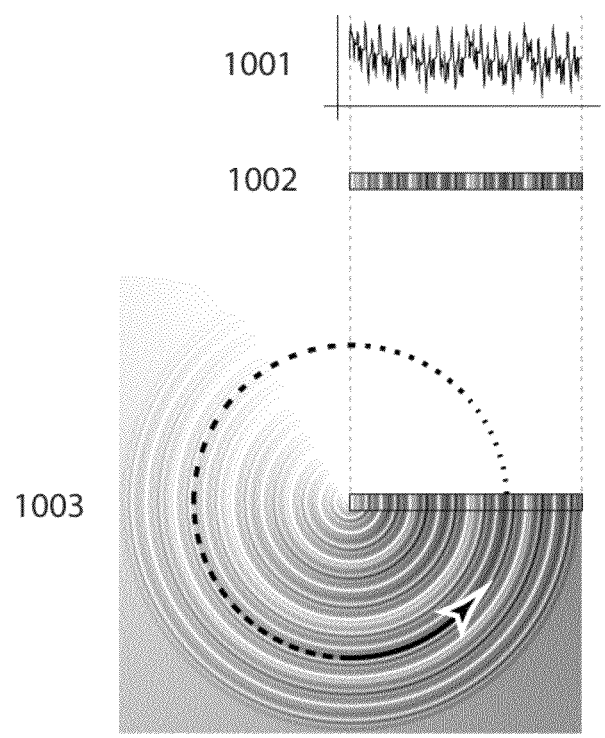
FIG. 1 shows the generation of a circularly symmetric 2D signal by sweeping a 1D signal along a circle.

The security pattern as illustrated in the FIG. 1 is based on a circularly symmetric grating (1003) obtained by sweeping a self-similar, one-dimensional signal (1001-1002) along a 360-degree circular arc. The property of circular symmetry guarantees that the signal observed along a straight line crossing the grating at its center remains the same for all angles of the line. The self-similarity of the swept one-dimensional signal guarantees that the grating remains constant through changes of scale.

The methods exposed hereafter for embedding a circularly symmetric grating are all based on an integral transform and its inverse. An integral transform is an operator that takes a function f as its input and outputs another function $T_f$:

$$T_f(u) = T(f(u)) = \int_{t_1}^{t_2} K(t,u) f(t) dt$$

where the function $K(t,u)$ is the kernel of the transform. If $K(t,u)$ has an associated inverse kernel $K^{-1}(u,t)$, then the inverse integral transform is defined as:

$$f(t) = \int_{u_1}^{u_2} K^{-1}(u,t) T_f(u) du$$

The simplest example of an integral transform is the identity transform, with:

$$K(u,t) = \delta(u-t), t_1 < u < t_2, \text{ and } K^{-1}(u,t) = \delta(t-u), u_1 < t < u_2$$

where $\delta$ is the Dirac distribution.

Another example is the Laplace transform, with:

$$K(u,t) = e^{-ut}, t_1 = 0, t_2 = \infty, \text{ and}$$

$$K^{-1}(u,t) = \frac{e^{+ut}}{2\pi i}, u_1 = c - i\infty, u_2 = c + i\infty$$

Yet another example commonly used in signal processing is the Fourier transform, with:

$$K(u,t) = \frac{e^{-iut}}{\sqrt{2\pi}}, t_1 = -\infty, t_2 = \infty, \text{ and}$$

$$K^{-1}(u,t) = \frac{e^{+iut}}{\sqrt{2\pi}}, u_1 = -\infty, u_2 = \infty$$

When working with images made of discrete pixels, a specific form of the selected integral transform is needed. For instance, if the selected integral transform is the Fourier transform, then the discrete Fourier transform (noted F hereafter) and its inverse (noted $F^{-1}$ hereafter) are needed to generate a security pattern S. The generation of S starts in the frequency domain and is based on two components: the first one is a magnitude component R and the second one is a phase component P. The magnitude and the phase components are used together to produce an array C of complex numbers using the relation $C_{xy} = R_{xy} \cdot e^{iP_{xy}}$, where i denotes the square root of −1. The result of the inverse discrete Fourier transform of C is defined in the spatial domain and yields the security pattern S. By construction, when the discrete Fourier transform is applied to S, it yields back the array C in the frequency domain. The magnitude component R can be retrieved from the coefficients of C by computing their absolute value: if $C_{xy} = a + bi$, then $R_{xy} = \sqrt{a^2 + b^2}$.

Several methods for producing a security pattern S are derived from the general scheme that consists in applying an inverse integral transform to a pair of components {R,P} defined in the frequency domain. The first three methods have in common a magnitude component R taking the form of a 2D function invariant under rotation and scaling. In the first method, the phase component P is entirely random. In the second method, an octant with random values is symmetrically replicated in order to generate a phase component with 90°/45° axial symmetries. In the third method, a right triangle with random values is symmetrically replicated in order to generate a phase component with 120° axial symmetries.

The fourth method extracts the magnitude and the phase components $\{R^0, P^0\}$ from the discrete Fourier transform of a source halftone pattern; $P^0$ is used as a phase component for S, and $R^0$ is combined with a 2D function that is invariant under rotation and scaling in order to generate the magnitude component of S.

The fifth method applies a pre-processing step to the magnitude component R before it is used to produce the array C: R is multiplied along its radius with a modulating function in order to fit its envelope to specific requirements. With this envelope modulation step, the power spectral density of the security pattern S becomes adjustable, allowing the generation of various colors of noise such as pink ($1/f$) noise, red ($1/f^2$) noise, blue noise, etc.

(1) Circularly Symmetric Magnitude and Stochastic Phase

Figure 2:
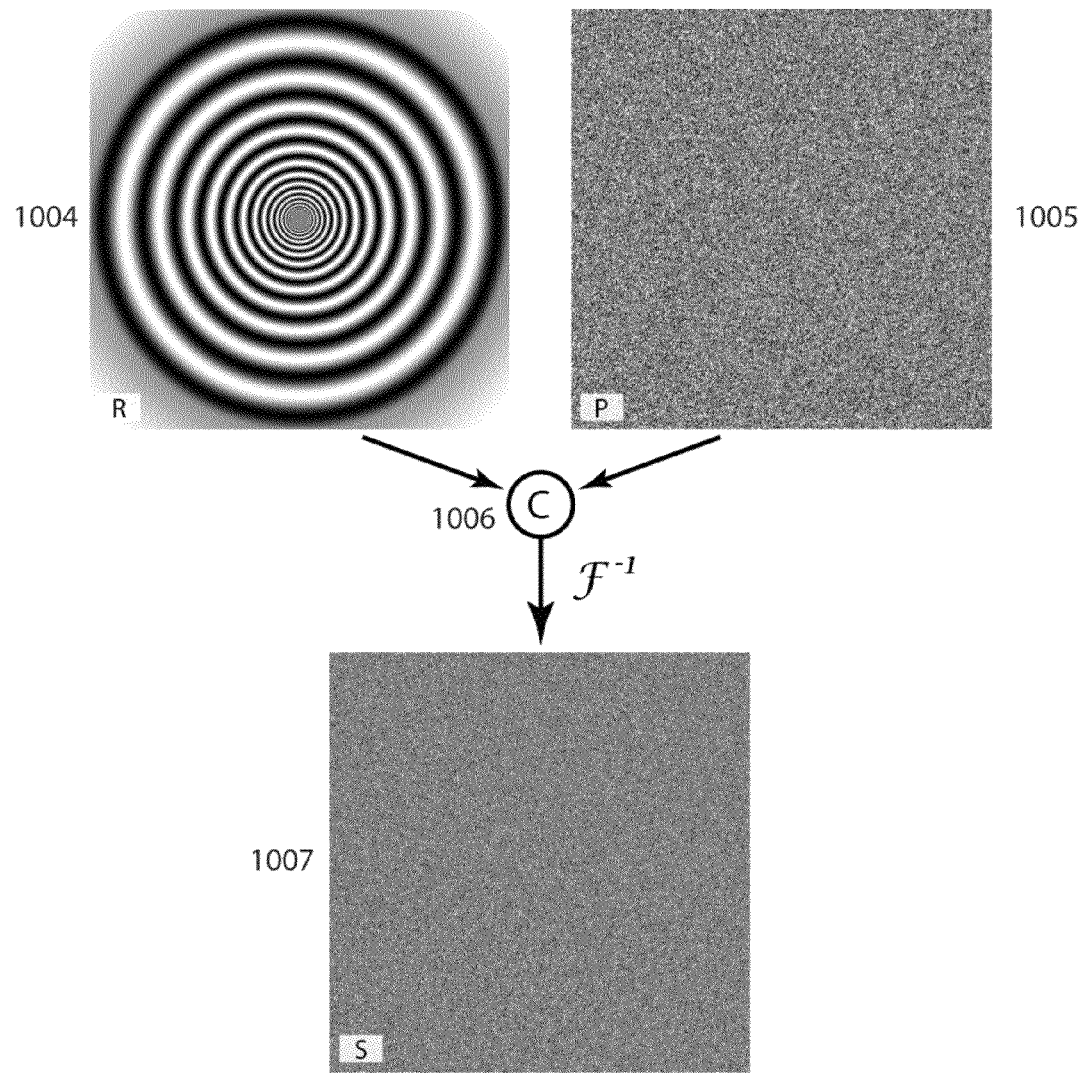
FIG. 2 shows a circularly symmetric 2D signal used as a magnitude component (R), a random pattern used as a phase component (P), and the combination of these two components in the frequency domain followed by an inverse Fourier transform that produces a security pattern in the spatial domain (S).

In the first method illustrated in the FIG. 2, the magnitude component R (1004) takes the form of a 2D circularly symmetric grating. The coefficients of the phase component P (1005) are produced with a stochastic process following an uniform distribution in the range $[\pi, -\pi]$. This stochastic process may be implemented by a quantum random number generator (e.g. http://www.randomnumbers.info/) or by a pseudo-random number generator. R and P are then used to compute an array C (1006) of complex numbers using the relation $C_{xy} = R_{xy} \cdot e^{iP_{xy}}$. C is made symmetrical by replacing its right half by a copy of its left half, rotated by 180°. The inverse discrete Fourier transform is applied to C in order to obtain a security pattern S (1007) in the spatial domain.

(2) Circularly Symmetric Magnitude and Stochastic Phase with 90°/45° Symmetry

Figure 3:
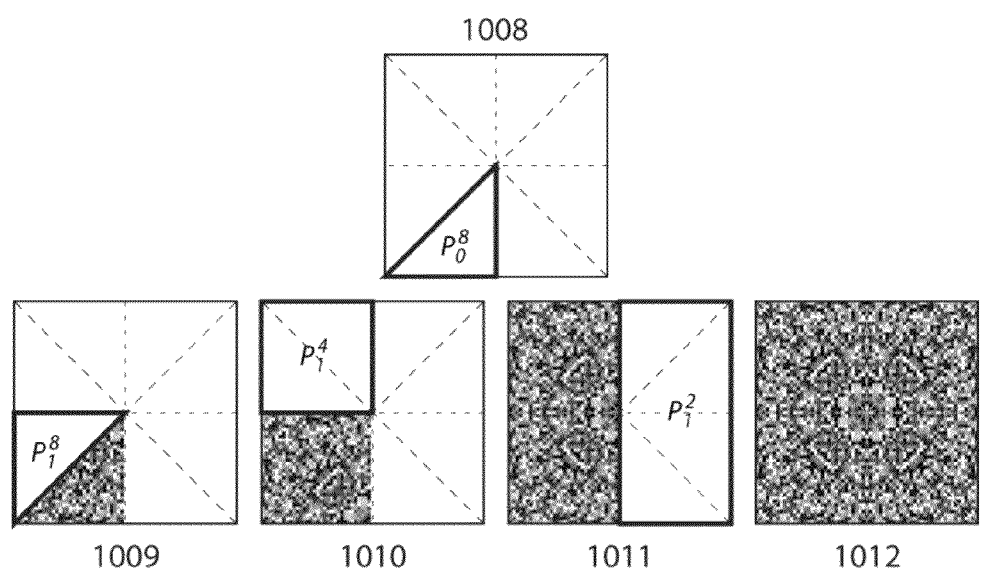
FIG. 3 shows the generation of a phase component with 90°/45° symmetry.

In the second method illustrated in the FIG. 3, the magnitude component R takes the form of a 2D circularly symmetric grating. An empty version of the phase component P is created as a 2D array of zeroes. P is then subdivided along its 90° and 45° axes of symmetry: the first subdivision step divides P in four quadrants along its two orthogonal axes of symmetry, and the second step further subdivides these quadrants in eight octants along the diagonal axes of symmetry of P (1008). Formally, this subdivision scheme is equivalent to the wallpaper group p4m; for reference, see:

http://en.wikipedia.org/wiki/Wallpaper_group#Group_p4m

Figure 4:
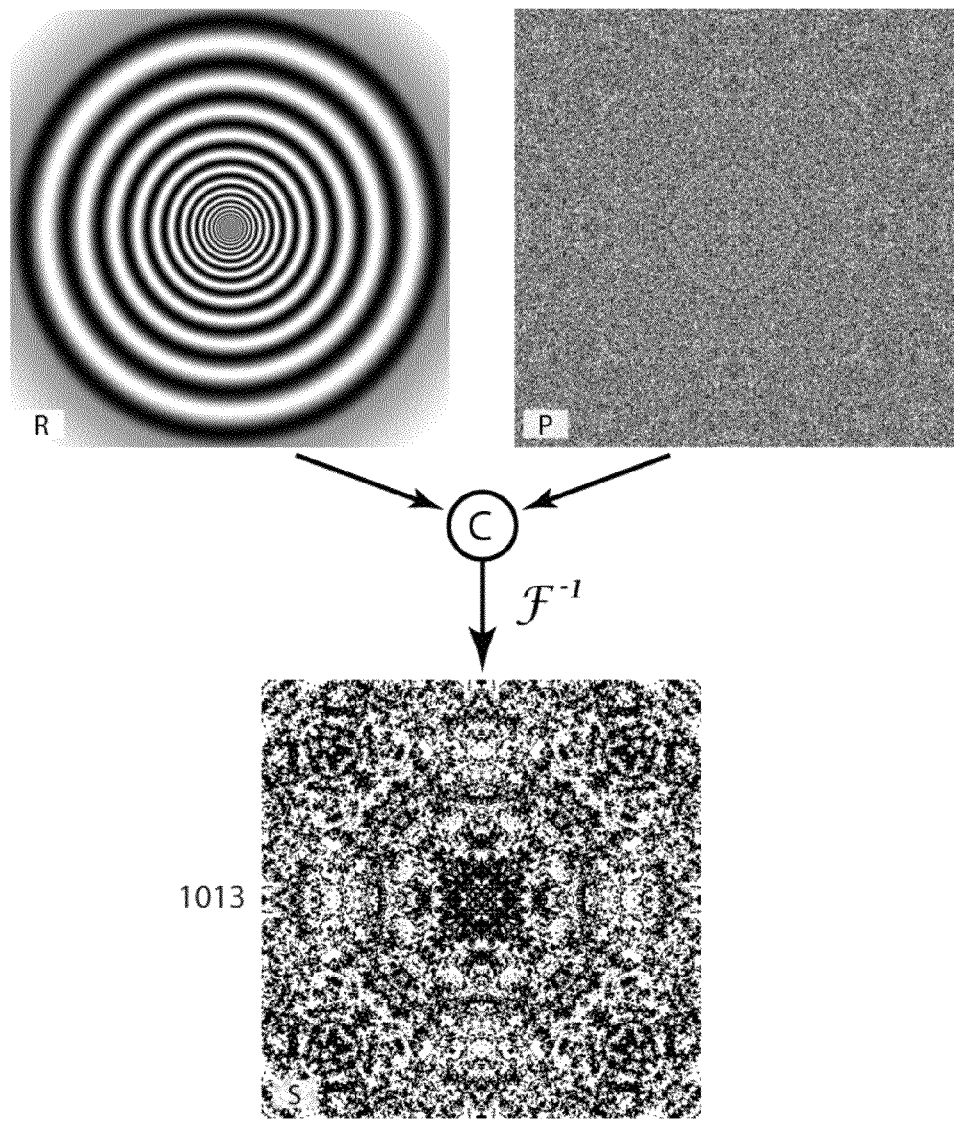
FIG. 4 shows the generation of a security pattern (S) in the frequency domain from a circularly symmetric magnitude component (R) and a phase component (P) with 90°/45° symmetry.

Once the subdivision process is complete, the coefficients of the bottom left-octant $P_0^8$ resulting from the last subdivision step are assigned random values using a stochastic process following an uniform distribution in the range $[\pi,-\pi]$. After this first assignment, half of the values of the bottom-left quadrant $P_0^4$ are also determined. $P_0^8$ is then replicated across the diagonal axis that forms its left side in order to assign the values of the left-bottom octant $P_1^8$ (1009). After this second assignment, all the values of the bottom-left quadrant $P_0^4$ are determined, and $P_0^4$ is replicated across the horizontal axis that forms its upper side in order to assign the values of the top-left quadrant $P_1^4$ (1010). After this third assignment, all the values of the left half $P_0^2$ are determined, and $P_0^2$ is replicated across the vertical axis that forms its right side in order to assign the values of the right half $P_1^2$ (1011). After this fourth and last assignment, all the values of P are determined (1012). R and P are used to compute an array C of complex numbers using the relation $C_{xy}=R_{xy}\cdot e^{iP_{xy}}$. The inverse discrete Fourier transform is applied to C, as illustrated in the FIG. 4, in order to obtain a security pattern S in the spatial domain (1013).

By construction, P contains four axes of symmetry, and these axes are preserved by the inverse Fourier transform. Apart from these symmetries however, the spatial content of S does not match the spatial content of P.

Figure 5:
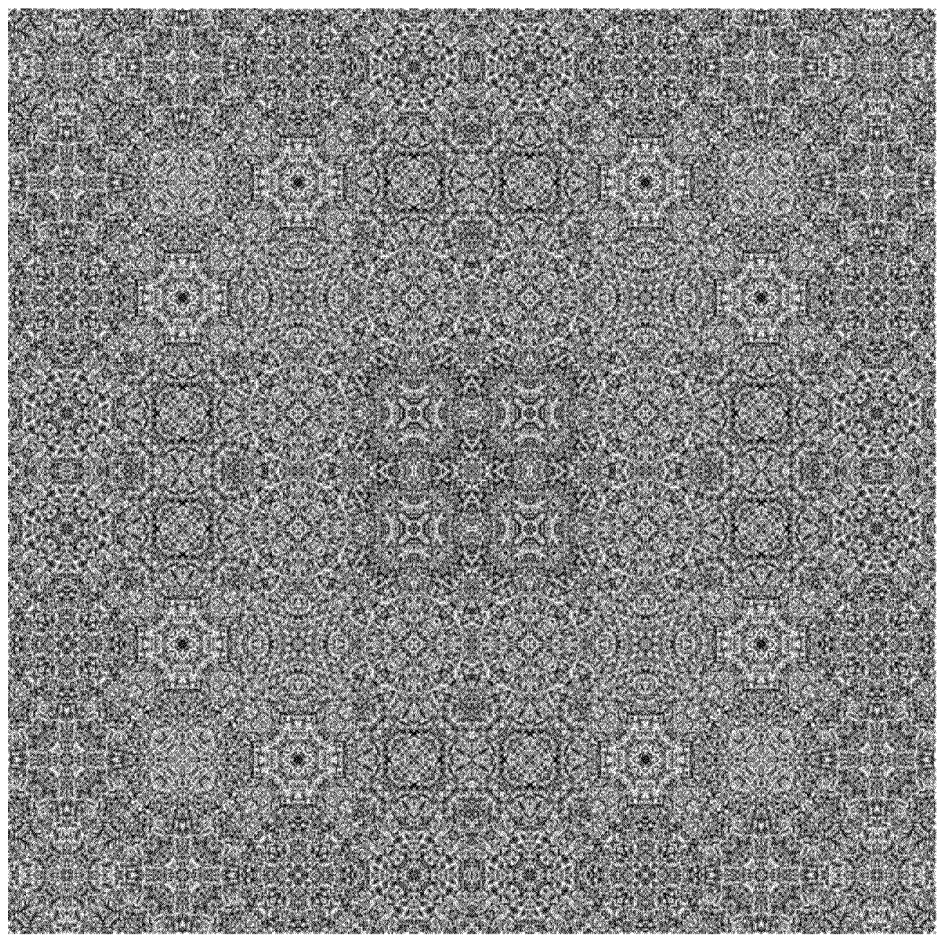
FIG. 5 shows a phase component with recursive 90°/45° symmetry.

If P is large, the subdivision process may be iterated on each quadrant of P, then of each subquadrant of the quadrants, and so on (1014), as illustrated in the FIG. 5. However, the dominant spatial frequency of the resulting pattern is inversely proportional to the short-range correlation of the phase component. As the subdivision depth increases, so does the short-range correlation of the phase component, and the resulting security pattern tends to become less and less uniform. Therefore, the lower limit to the iterative symmetrical subdivision of the phase component depends on the visual characteristics that are expected from the security pattern.

The depth of the basic 90°/45° subdivision is equal to one and the size of the base element (i.e. the octant $P_0^8$) is equal to $$\frac{p}{2},$$

where p is the size of the phase component P. More generally, a subdivision depth of d yields a base element with a size that is equal to $$\frac{p}{2^d}.$$

As d increases, many variants may be applied to the basic 90°/45° subdivision process used by the second method. For instance, the values of every other base quadrant may be inverted or shifted by $$\frac{\pi}{4},$$

or two independent base quadrants may be used in alternation, and so on.

(3) Circularly Symmetric Magnitude and Stochastic Phase with 120° Symmetry

Figure 6:
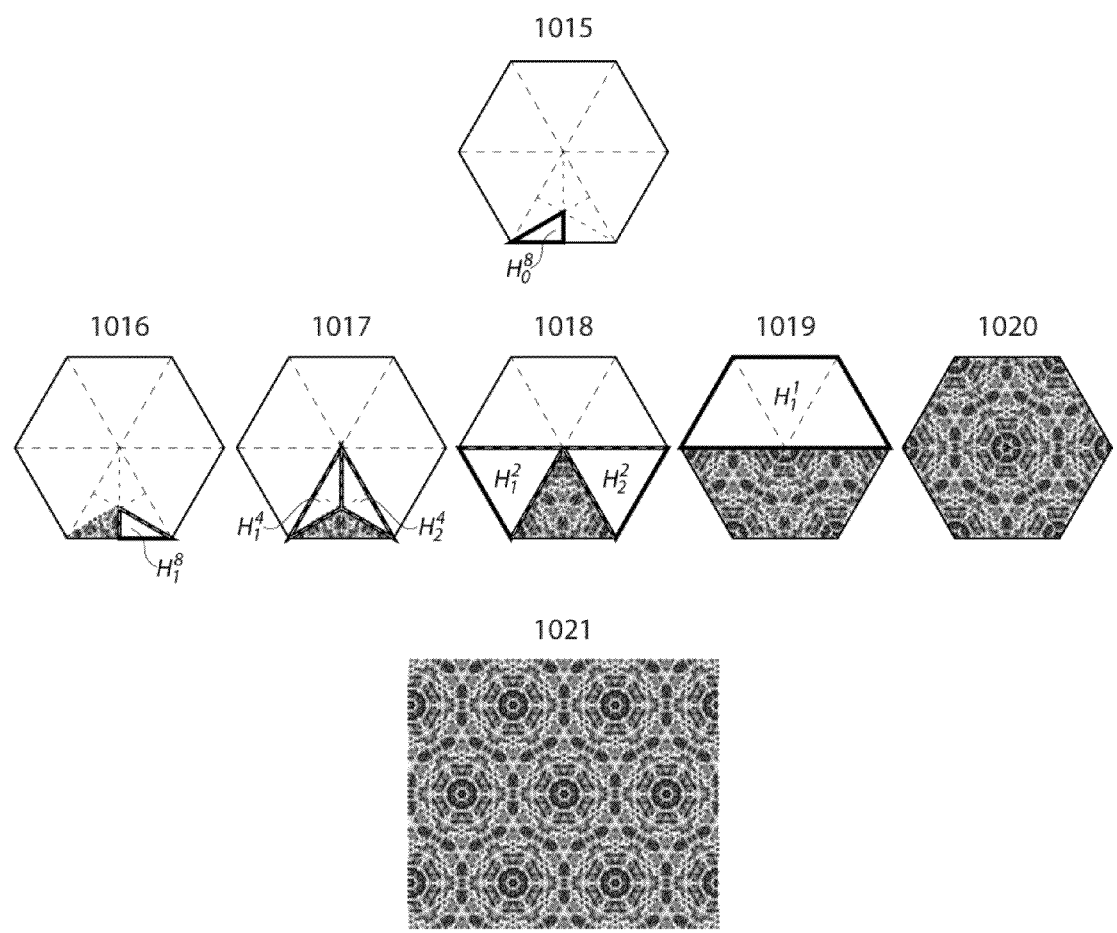
FIG. 6 shows the generation of a phase component with 120°/60° symmetry.
Figure 7:
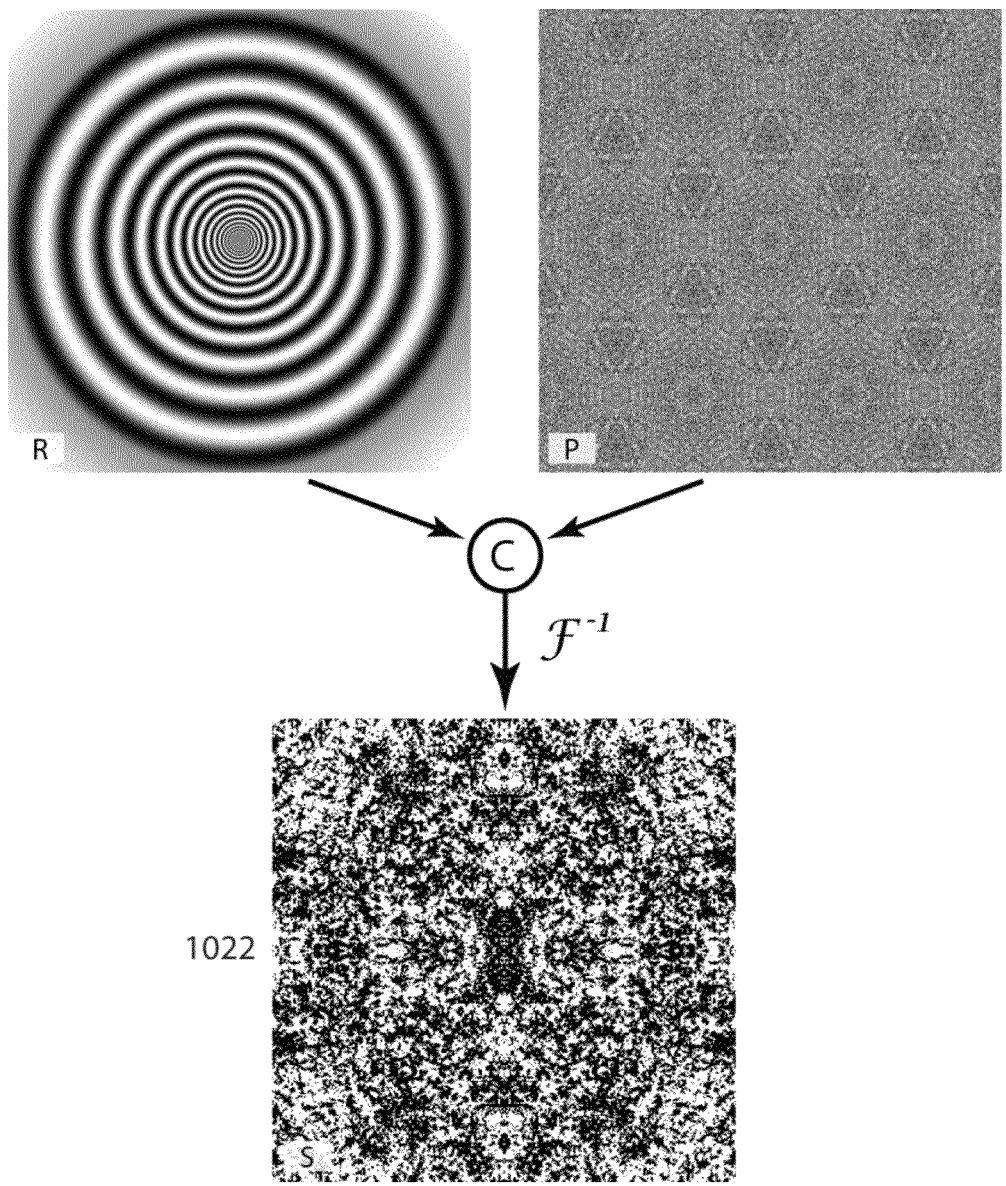
FIG. 7 shows the generation of a security pattern (S) in the frequency domain from a circularly symmetric magnitude component (R) and a phase component (P) with 120°/60° symmetry.

In the third method illustrated in FIG. 6, the magnitude component R takes the form of a 2D circularly symmetric grating. An empty version of the phase component P is created as a 2D array of zeroes. The largest hexagon H that can be inscribed in the phase component P is then subdivided along its 120° axes of symmetry: the first subdivision step divides H in six equilateral triangles along its three longest diagonals. The second step subdivides each equilateral triangles in six right triangles along their three medians (1015). Formally, this subdivision scheme is equivalent to the wallpaper group p6m; for reference, see:
http://en.wikipedia.orq/wiki/Wallpaper_group#Group_p6m Once the subdivision process is complete, the coefficients of the bottom-left right triangle $H_0^8$ resulting from the last subdivision step are assigned random values using a stochastic process following an uniform distribution in the range $[\pi,-\pi]$ (1016). After this first assignment, half the values of the bottom isosceles triangle $H_0^4$ are also determined. $H_0^8$ is then replicated across the vertical axis that forms its right side in order to assign the values of the bottom-right right triangle $H_1^8$ (1017). After this second assignment, all the values of the bottom isosceles triangle $H_0^4$ are determined. $H_0^4$ is then replicated across the 30° and 150° axes that form its left and right sides in order to assign the values of the two isosceles triangles $H_1^4$ and $H_2^4$ (1018). After this third assignment, all the values of the bottom equilateral triangle $H_0^2$ are determined. $H_0^2$ is then replicated across the 60° and 120° axes that form its left and right sides in order to assign the values of the two equilateral triangles $H_1^2$ and $H_2^2$ (1019). After this fourth assignment, $H_0^2$, $H_1^2$ and $H_2^2$ are replicated across the horizontal axis passing through the center of H in order to assign the values of the three equilateral triangles $H_3^2$, $H_4^2$ and $H_5^2$ that form the top half of H. After this fifth and last assignment, all the values of H are determined (1020), but the values of P outside of H are still zero. To assign these values, H is replicated by a series of translations so as to fill the unassigned regions of P (1021). R and P are used to compute an array C of complex numbers using the relation $C_{xy}=R_{xy}\cdot e^{iP_{xy}}$. The inverse discrete Fourier transform is applied to C, as illustrated in the FIG. 7, in order to obtain a security pattern S in the spatial domain (1022).

Figure 8:
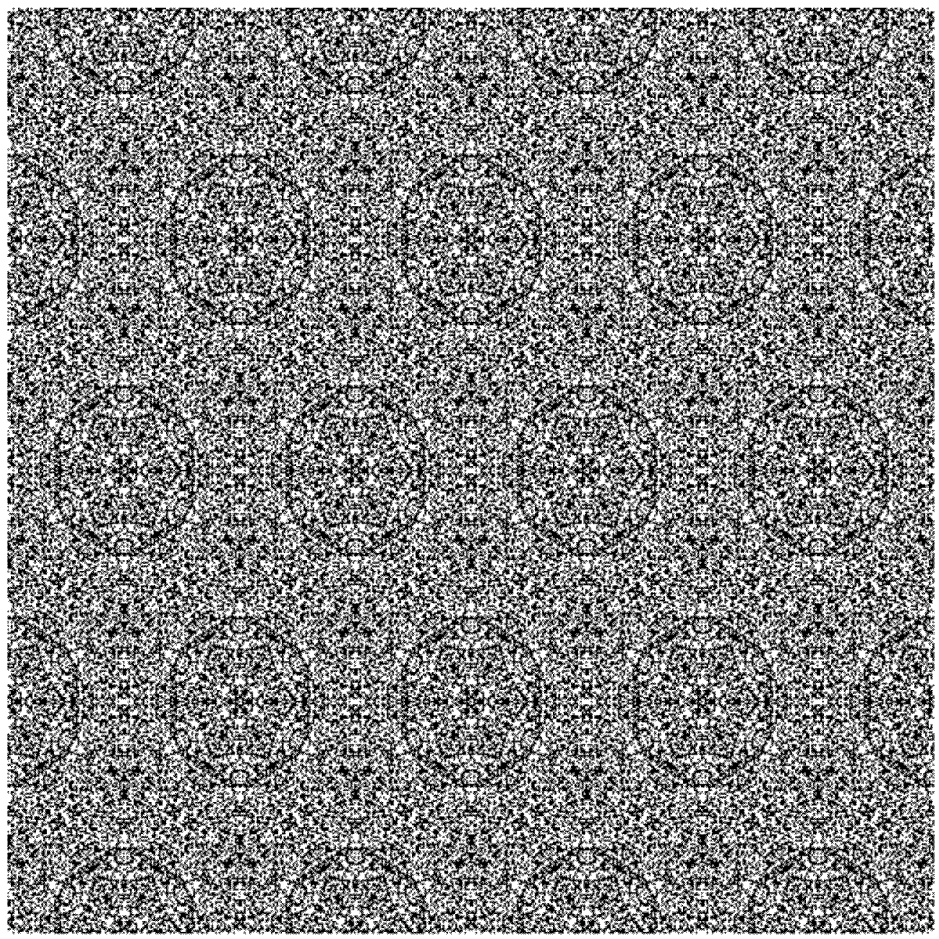
FIG. 8 shows a phase component with 120°/60° symmetry that is sampled on an orthogonal grid.

By construction, P contains six axes of symmetry. However, unlike the phase component generated with the second method, P is implicitly sampled on a hexagonal grid. Since C is based on P, the same consequence applies; therefore, if the coefficients of C are directly mapped onto the orthogonal grid used by the inverse Fourier transform, the axes of symmetry in P will not be completely preserved in S (1023), as illustrated in the FIG. 8. In order to preserve the hexagonal symmetry of P in S, the coefficients of P and R must be resampled on an orthogonal grid before they are combined to form the coefficients of C.

Figure 9:
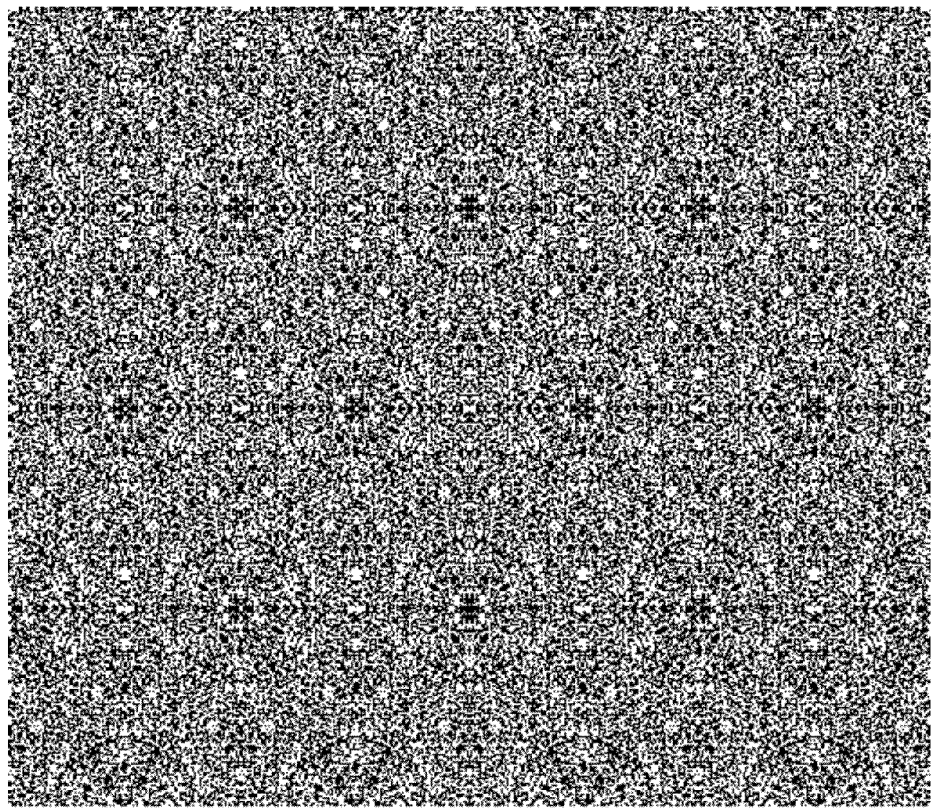
FIG. 9 shows a phase component with 120°/60° symmetry that is sampled on a hexagonal grid.

This resampling has the side effect of changing the aspect ratio of P (1024), as illustrated in the FIG. 9.

(4) Hybrid Magnitude and Deterministic Phase

Figure 10:
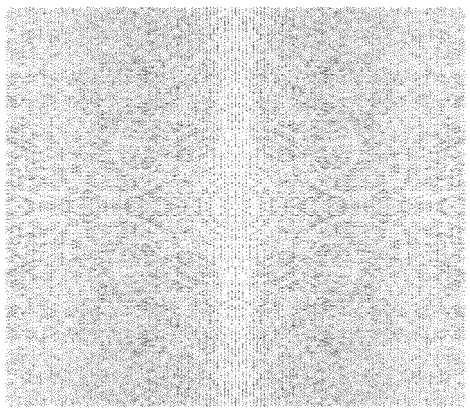
FIG. 10 shows the magnitude and the phase of a pattern with 120°/60° symmetry that is sampled on an hexagonal grid.
Figure 10:
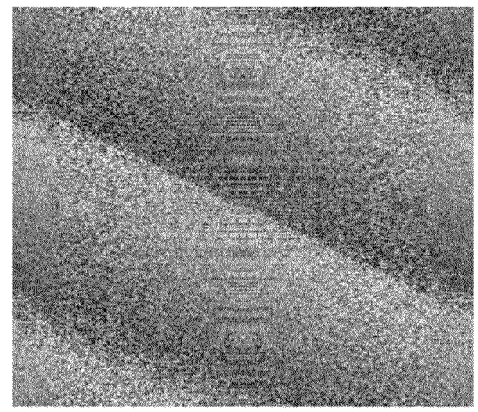
Figure 11:
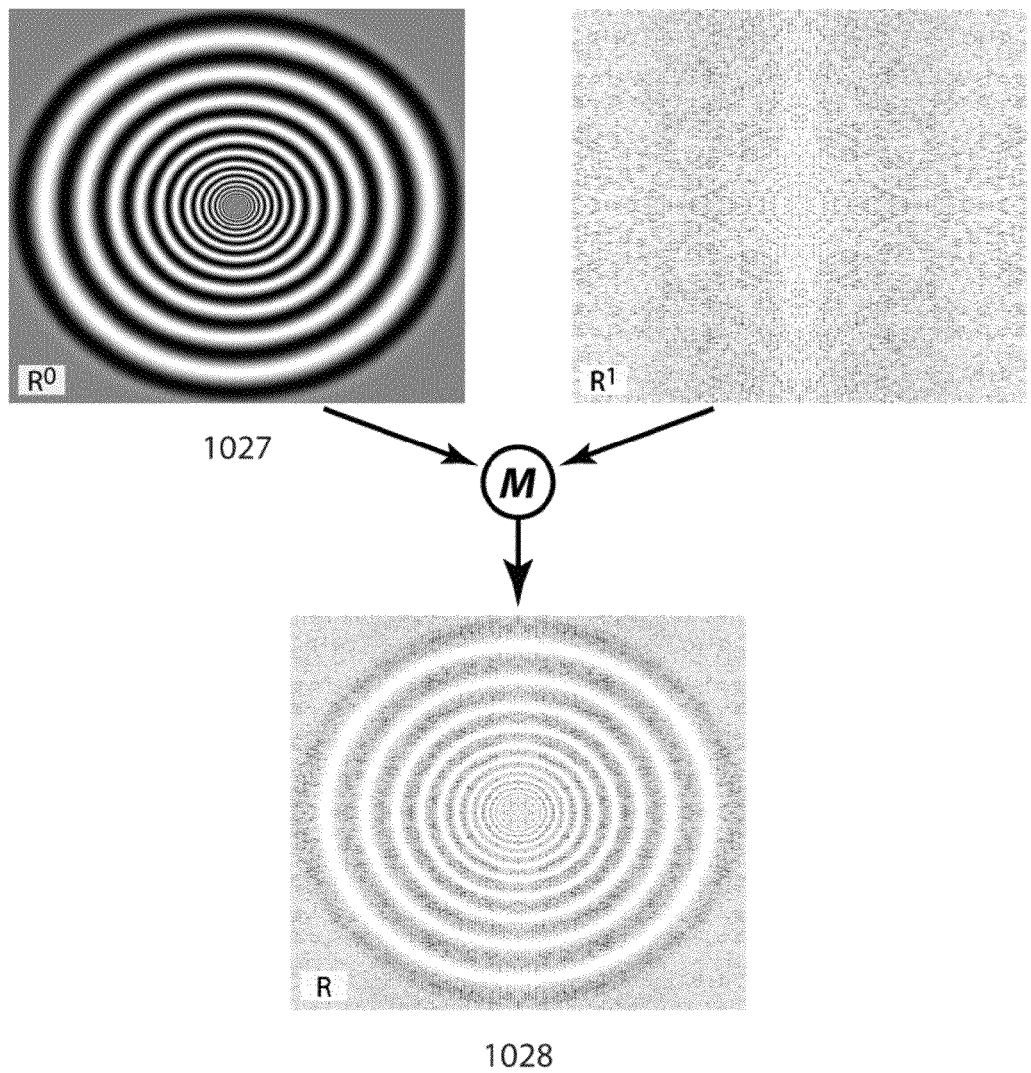
FIG. 11 shows the mixing of two magnitude components.
Figure 12:
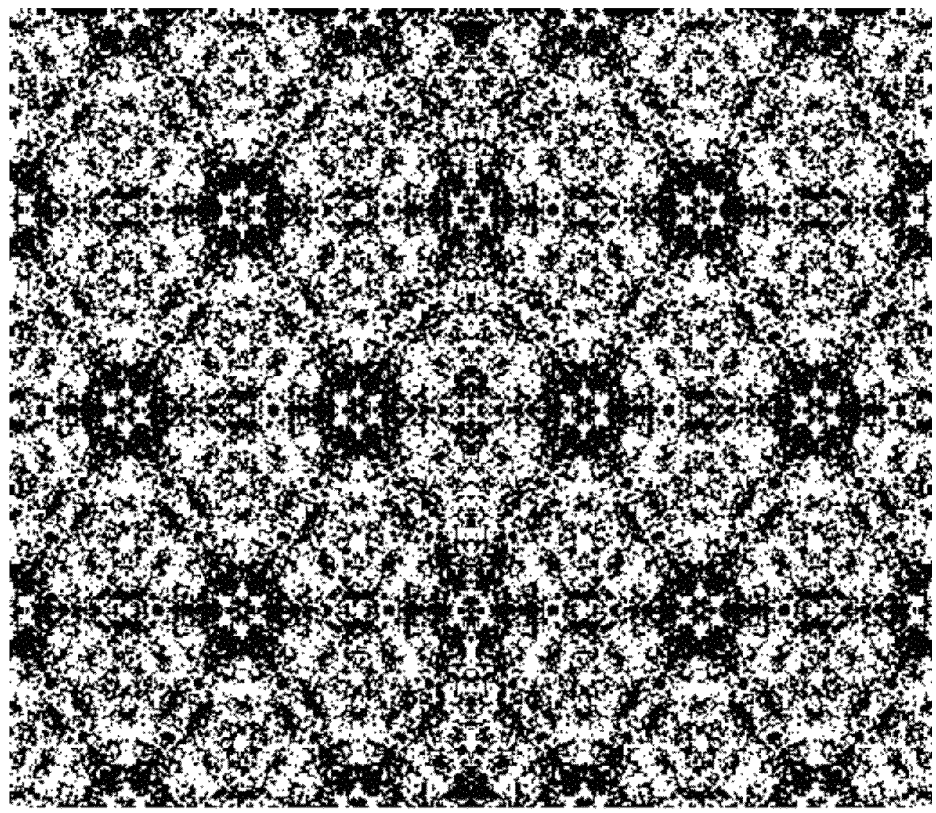
FIG. 12 shows a security pattern with 120°/60° symmetry.
Figure 13:
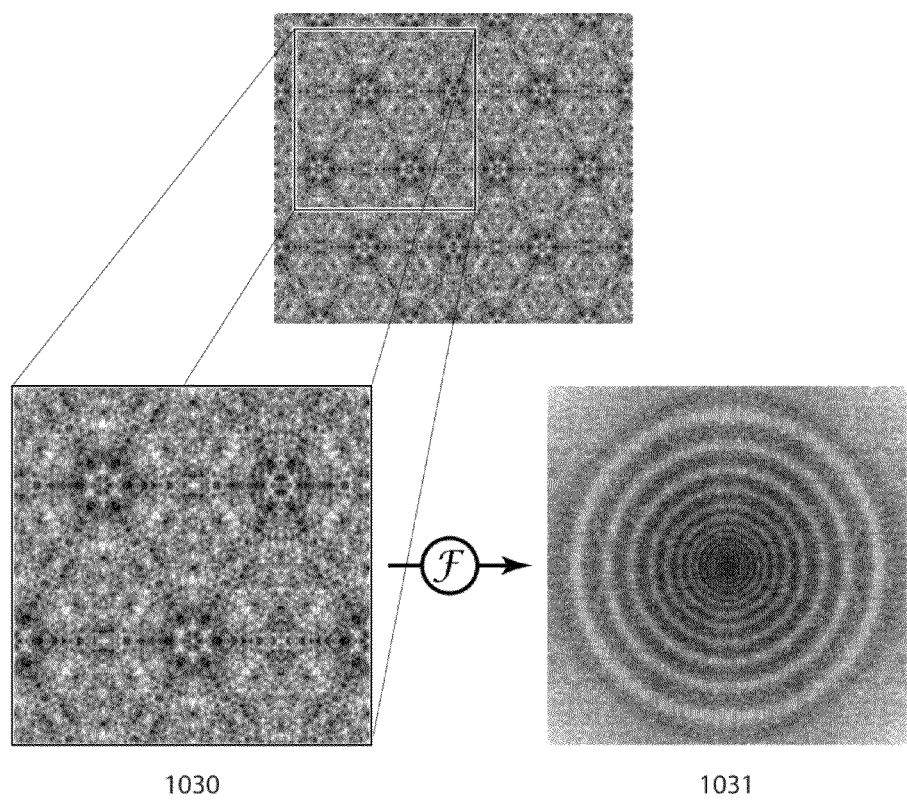
FIG. 13 shows the magnitude component of the 2D Fourier transform of a square chunk of a security pattern with 120°/60° symmetry.

In the fourth method, the discrete Fourier transform is applied to a source halftone pattern having the same dimensions as R in order to generate an array $C^0$ of complex numbers. The magnitude (1025) and the phase (1026) components $\{R^0,P^0\}$ of $C^0$ are extracted with the relations $R_{xy}^0 = \sqrt{Im_{xy}^2 + Re_{xy}^2}$ and $$P_{xy}^0 = \arctan\left(\frac{Im_{xy}}{Re_{xy}}\right),$$

where $Im_{xy}$ is the imaginary part of $C_{xy}^0$ and $Re_{xy}$ is the real part of $C_{xy}^0$, as illustrated in the FIG. 10. A magnitude component $R^1$ having the same size as the largest dimension of $R^0$ is synthesized under the form of a 2D circularly symmetric grating, and is then resized along one direction only so as to have exactly the same size as $R^0$ (1027). Since $R^0$ is not necessarily square, this non-uniform resizing can have the effect of distorting the concentric rings that form the 2D circularly symmetric grating into concentric ellipses. The two magnitude components $R^0$ and $R^1$ are mixed together, as illustrated in the FIG. 11, in order to generate a hybrid magnitude component R (1028) with $R=M(R^0, R^1)$. Examples of the function M used for mixing $R^0$ and $R^1$ include linear combinations of $R^0$ with $R^1$, weighted multiplications of $R^0$ with $R^1$, or combinations of these two operations. The phase component $P^0$ is combined with the hybrid magnitude component R to compute an array C of complex numbers using the relation $C_{xy}=R_{xy}\cdot e^{iP_{xy}^0}$. The inverse discrete Fourier transform is applied to C in order to obtain a security pattern S in the spatial domain (1029), as illustrated in the FIG. 12. S is not necessarily square; however, the magnitude component of the discrete Fourier transform of any square region (1030) of S yields the original 2D circularly symmetric grating (1031), as illustrated in the FIG. 13.

It is a well-known fact that most of the perceptual information of an image is encoded in the phase component of its Fourier transform (Oppenheim and Lim, *The importance of phase in signals*, 1981, *Proc. IEEE* 69). By construction, S has a perceptual aspect that is close to the aspect of the source halftone pattern, but that can exhibit artifacts due to the presence of the synthetic magnitude component. These artifacts can be removed by adjusting the parameters of the function M used for mixing the extracted magnitude component $R^0$ with the synthetic magnitude component $R^1$.

(5) Adjusted Envelope of the Magnitude Component

Figure 14:
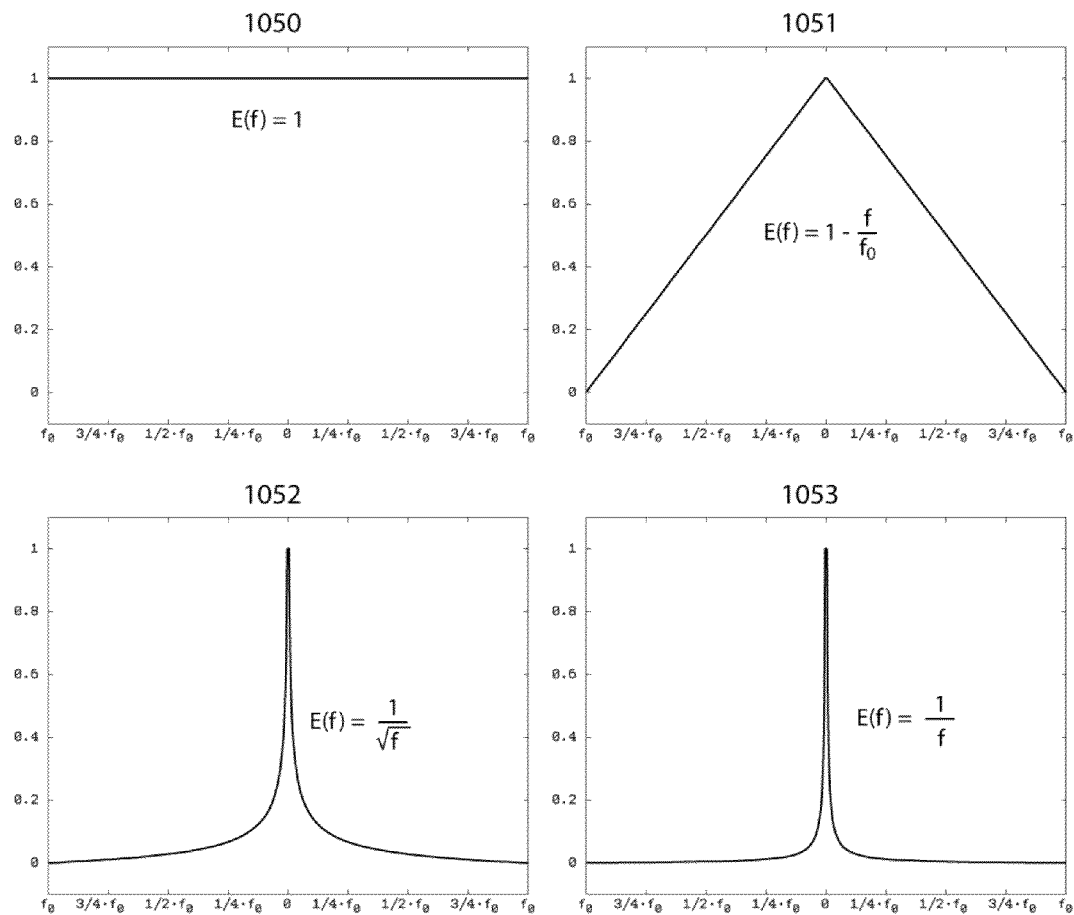
FIG. 14 shows 1D slices of four different 2D envelope modulation functions.

By construction, the Fourier transform of the security pattern S generated with one of the four previous methods has a magnitude component that is essentially flat. Because of this flatness, higher spatial frequencies prevail over lower spatial frequencies in S, which offers a visual aspect close to white noise. The fifth method expands the four previous methods with an additional processing step in which the magnitude component R is multiplied by a 2D, circularly symmetric envelope modulation function E, with $E_{xy}=e(\sqrt{x^2+y^2})=e(f)$, where f represents the frequency. In order to tilt the balance toward the lower frequencies, E is maximal at the center of R and decreases monotonically toward the borders of R. Many functions fit this definition, as illustrated in the FIG. 14; in practice, e(f) is a function of the form $e(f)=f^{-k}, k\in\mathbb{R}_+^*$ (1050-1053). A special case of e(f) is the function $$e(f) = 1 - \frac{f}{f_N} (1051),$$

where $f_N$ is the maximum frequency that can be represented by R. Another special case of e(f) is the function $$e(f) = \frac{1}{f}(1053),$$

which characterizes the power spectral density of pink noise.

Figure 15:
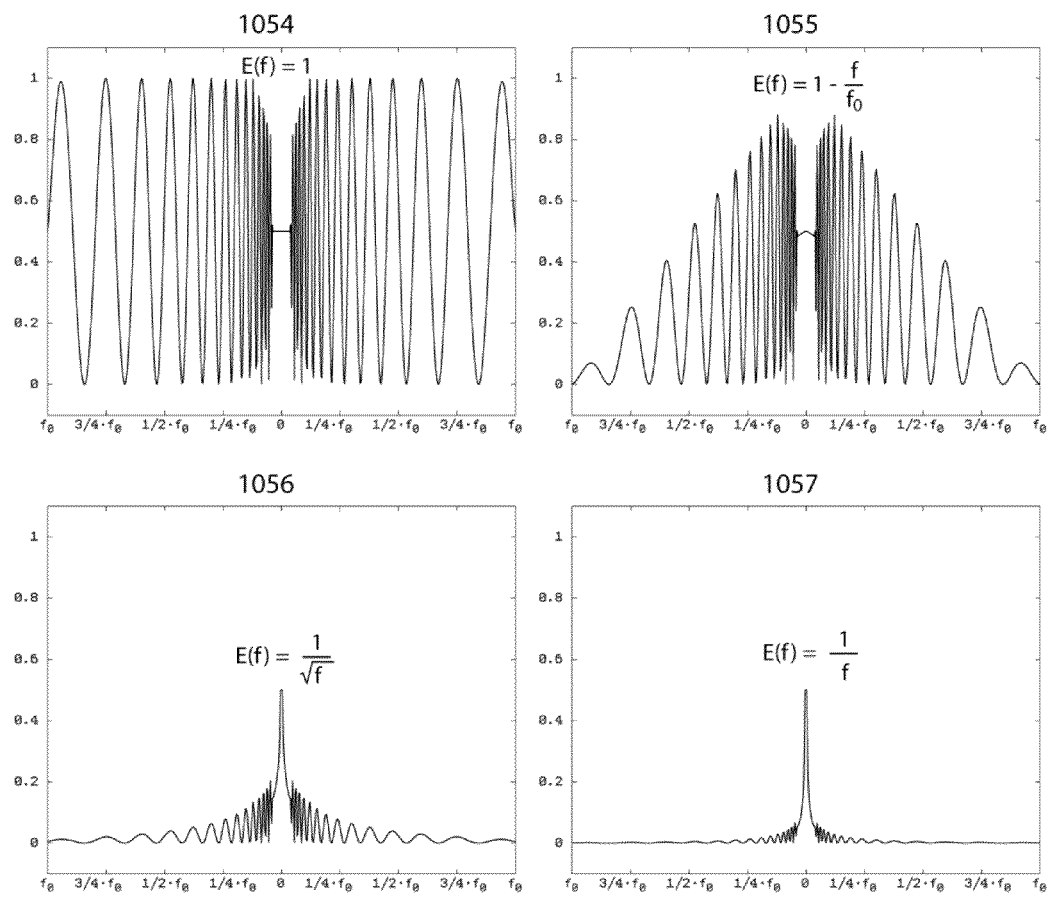
FIG. 15 shows 1D slices of a 2D circularly symmetric grating multiplied by four different 2D envelope modulation functions.
Figure 16:
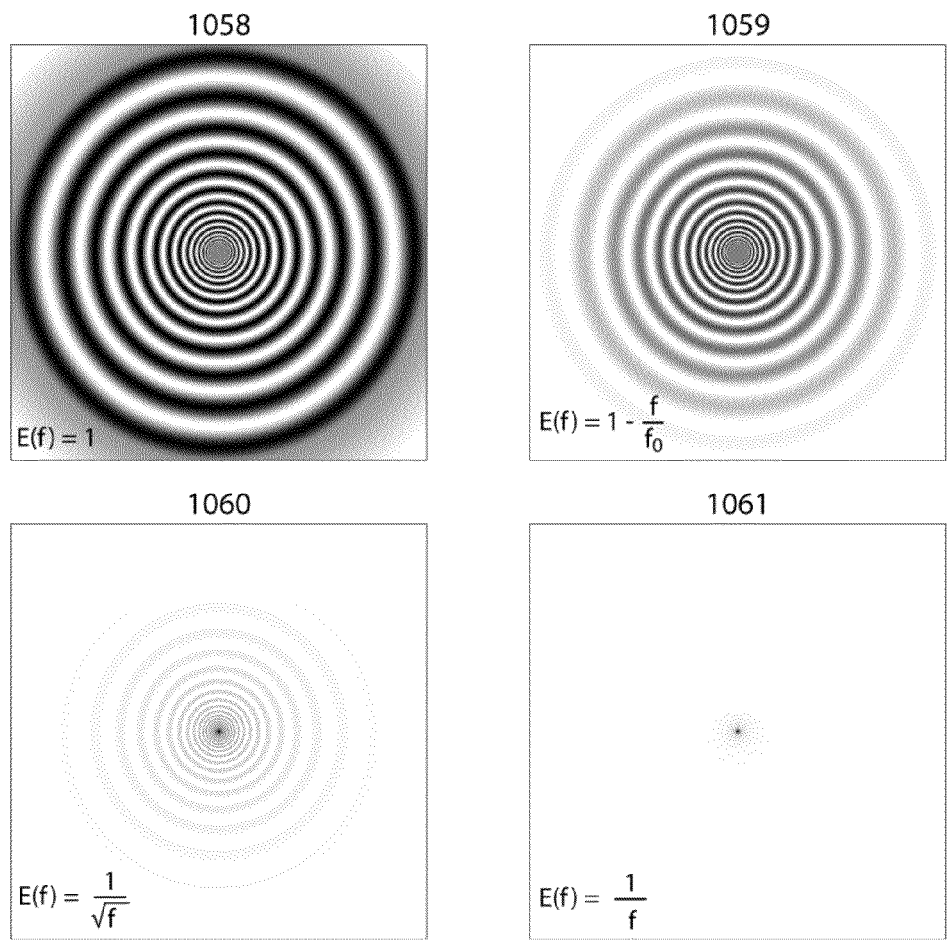
FIG. 16 shows a 2D circularly symmetric grating multiplied by four different 2D envelope modulation functions.
Figure 17:
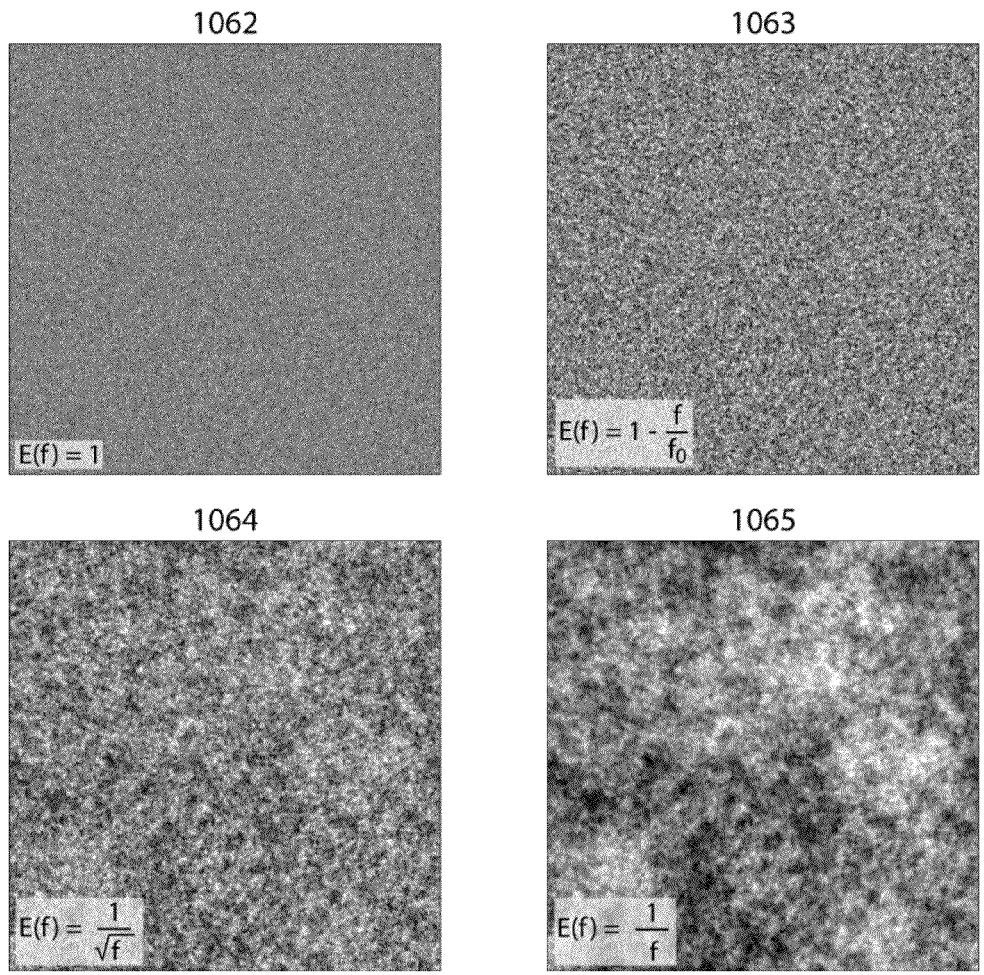
FIG. 17 shows a grayscale security pattern generated with four different granularities.
Figure 18:
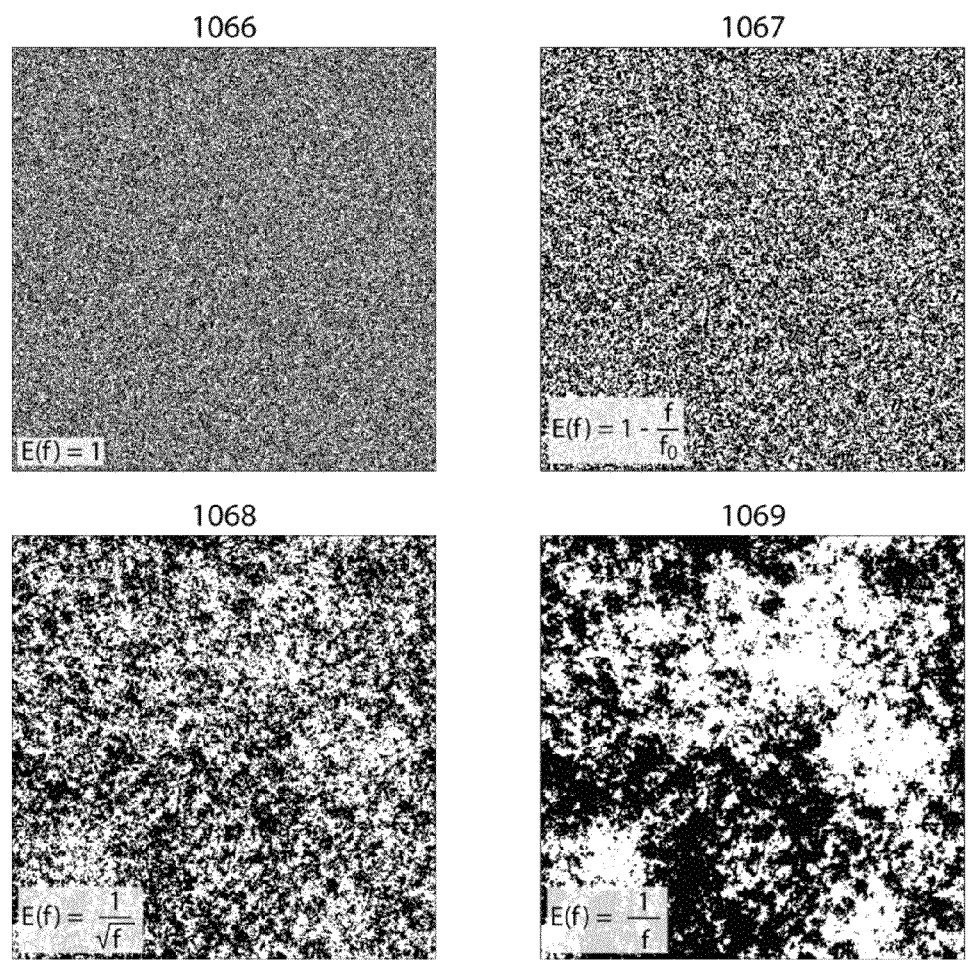
FIG. 18 shows a bilevel security pattern generated with four different granularities.

The multiplication of R with E (1054-1061) has the effect of modulating the power spectral density of S in the frequency domain, as illustrated in the FIGS. 15 and 16. In the spatial domain, this modulation is reflected on the coarseness of the security pattern, which can be continuously changed from fine to coarse in order to meet specific perceptual requirements, either in grayscale from (1062-1065), as illustrated in the FIG. 17, or in bilevel form (1066-1069), as illustrated in the FIG. 18.

Generation of a Security Image

Figure 19:
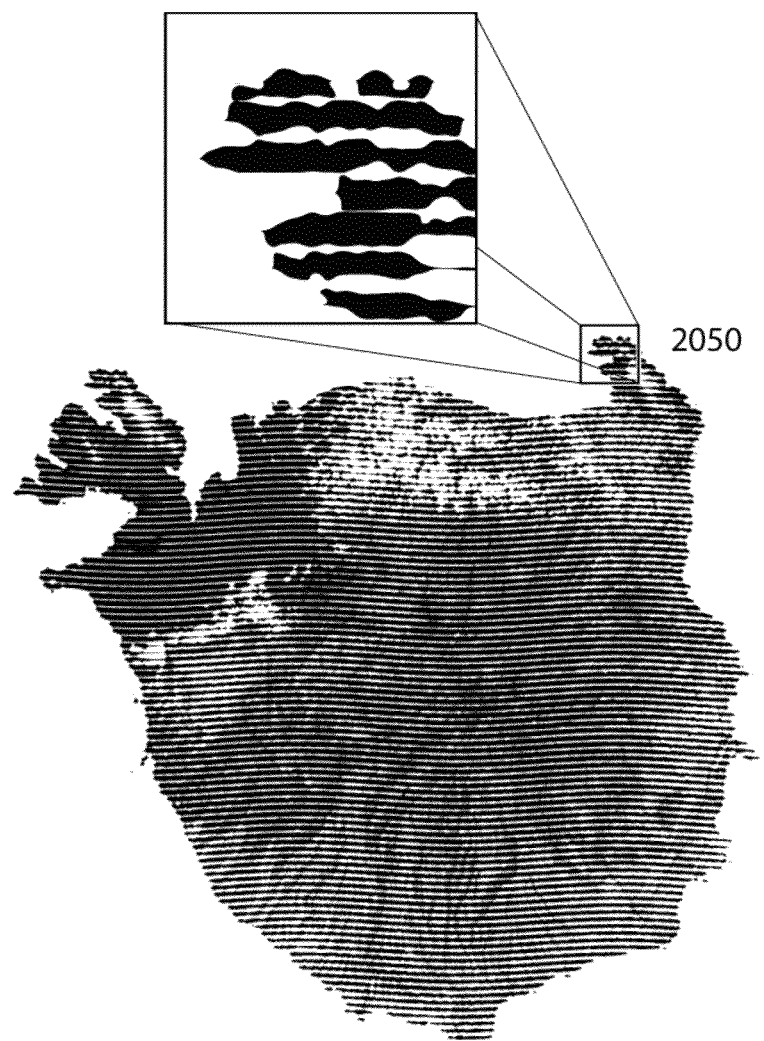
FIG. 19 shows an original halftone separation image.
Figure 20:
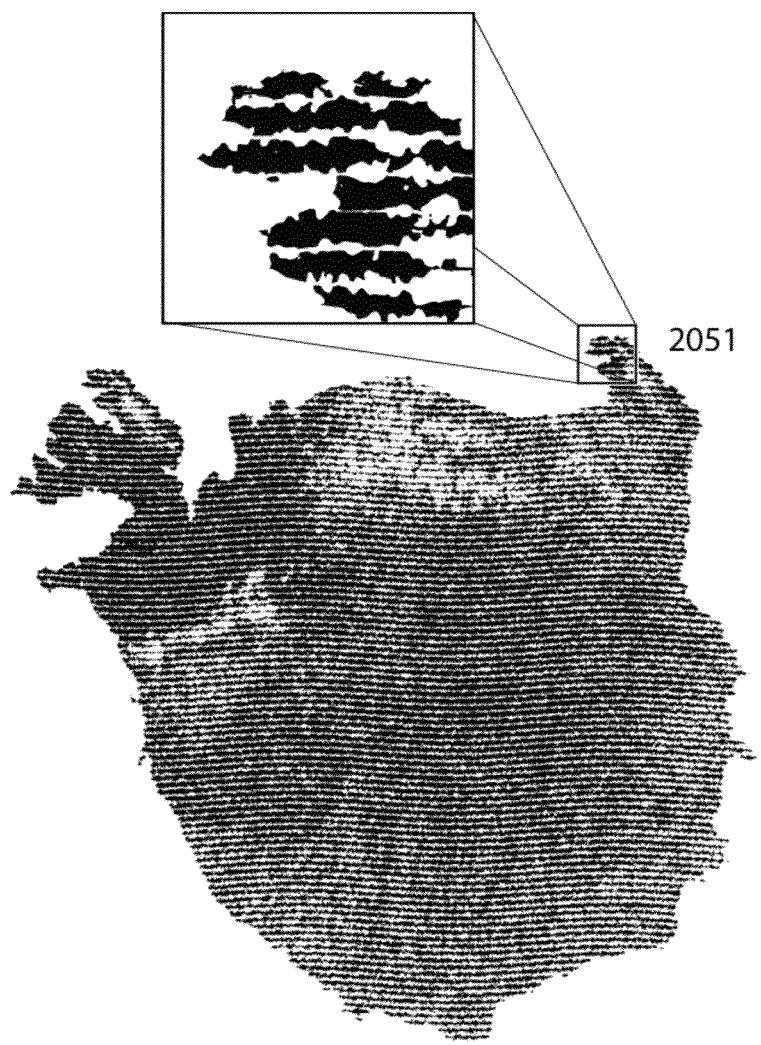
FIG. 20 shows a security halftone separation image.
Figure 21:
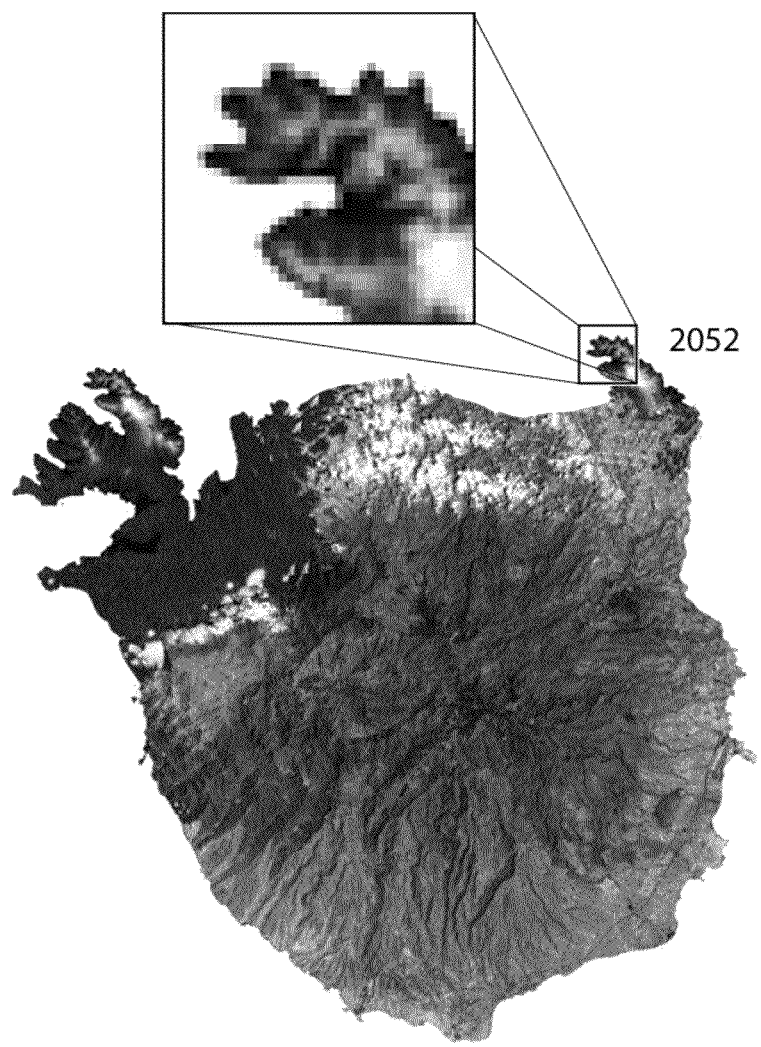
FIG. 21 shows an original grayscale image.
Figure 22:
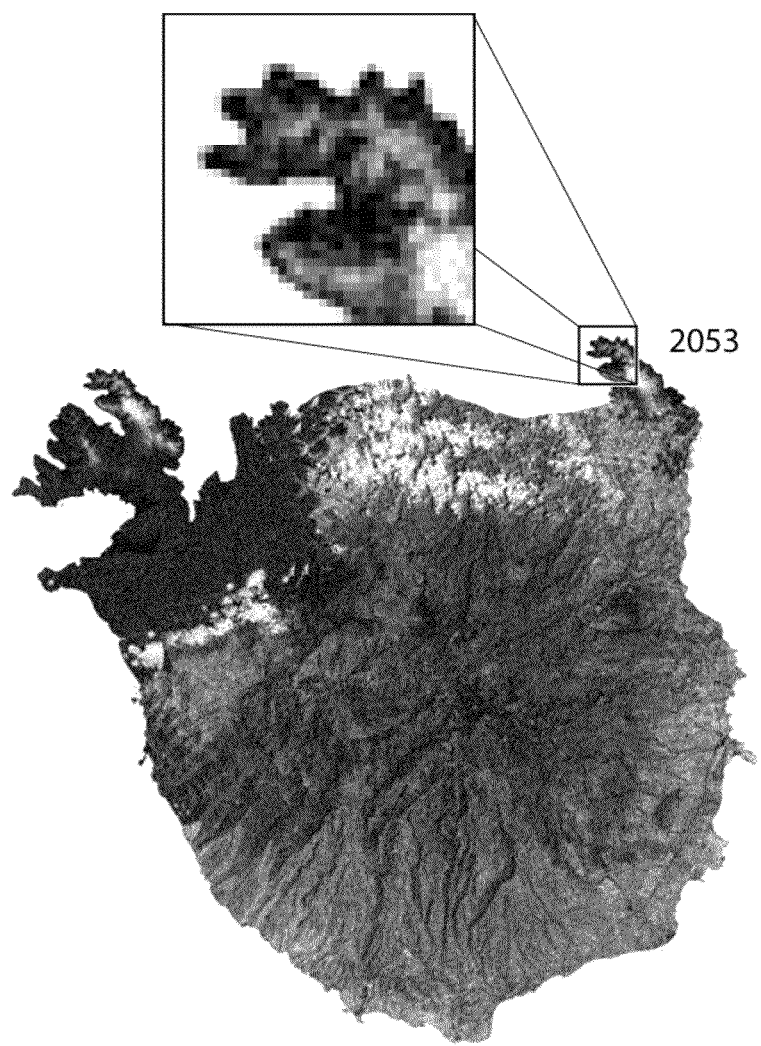
FIG. 22 shows a security grayscale image.

Several methods are provided for generating an image containing a security pattern. With one exception, all these methods require an original separation halftone image (2050) as their input, as illustrated in the FIG. 19, and produce a security separation halftone image (2051) as their output, as illustrated in the FIG. 20. The set of possible values for the dots of a halftone image contains two values: 0 and 1, also called ON and OFF. A dot with a value of 0 (ON) indicates the presence of ink at the position it occupies, and is represented by a black pixel. A dot with a value of 1 (OFF) indicates the absence of ink at the position it occupies, and is represented by a white pixel. A separation image is defined as an image crafted by the designer of the banknote with the purpose of producing one of the offset or intaglio plates that are used for transferring the ink colors to the banknote paper during the printing process. Usually, a separation image takes the form of a bilevel halftone image; the black areas indicate the presence of ink, and the white areas indicate the absence of ink. One additional method is also provided, which takes a continuous tone, grayscale image (2052) as its input, as illustrated in the FIG. 21, and produces a security grayscale image (2053) as its output, as illustrated in the FIG. 22. This security grayscale image can then be used as the input of a standard halftoning process in order to generate a security separation halftone image.

In the first method, the security pattern is merged with a low-resolution grayscale image that is subsequently halftoned in order to produce a high-resolution halftone image. In the second method, the security pattern is merged with a high-resolution halftone image. In the third method, the security pattern is merged with a high-resolution halftone image, and the features of the halftone image are preserved against excessive distortions caused by erosion and dilation. In the fourth method, the security pattern is merged with a high-resolution halftone image, and the features of the halftone image having a size inferior to a predetermined threshold are preserved.

(1) Security Pattern Merged with a Grayscale Image

In the first method, a security halftone image M used as a separation for printing one layer of ink on a banknote is obtained by modulating an original grayscale image G (2052) with a security pattern S in order to obtain a security grayscale image G' (2053). The security grayscale image G' is then halftoned to produce a bilevel security halftone image M. The resolution of the grayscale image G doesn't have to match the printing resolution of M, and low-resolution (e.g. 300 dpi) grayscale images are commonly used to produce halftone images with a resolution ten times higher.

The first step of this method merges the security pattern S with a grayscale image G by means of a linear interpolation in order to obtain a security grayscale image G': $G'=(1-j)\cdot G+j\cdot S=G+j\cdot(S-G)$. The interpolation factor j is in the range [0 . . . 1] and controls the amount of the security pattern S that is merged with the grayscale image G. When j is close to 0, the security grayscale image G' is close to G and the visibility of the security pattern S is low; conversely, when j gets closer to 1, the security grayscale image G' gets closer to S and the structure of the security pattern becomes more and more visible. In other words, the interpolation factor j plays the role of an embedding intensity factor and will be referred to as such hereafter.

In the second step of this method the security grayscale image G' is halftoned in order to generate a bilevel security separation halftone image M. Possible halftoning methods include cluster-dot screening, error diffusion, blue- and green-noise mask dithering, artistic screening; basically any halftoning method can be used as long as it preserves the spatial frequencies of G'.

(2) Security Pattern Merged with a Bilevel Image

In the second method, a security halftone image M (2051) used as a separation for printing one layer of ink on a banknote is generated by modulating an original separation halftone image H (2050) with a security pattern S. The modulation involves the generation of an auxiliary grayscale image H' derived from the halftone image H. The security pattern S is interpolated with the auxiliary image H', and the result of the interpolation is thresholded in order to produce a bilevel security halftone image M.

In the first step of this method, a pair of complementary distance maps $\{dH_K, dH_W\}$ is derived from the halftone image H. Each distance map is a two-dimensional array of positive numbers. Each array has the same width and height as the halftone image H. The first map $dH_K$ illustrated in the FIG. 23 is called a distance-to-black map (2101) and measures the distance of every white pixel of H to the nearest black pixel of H. By convention, the distance-to-black of a black pixel is zero. The second map $dH_W$ illustrated in the FIG. 23 is called a distance-to-white map (2102) and measures the distance of every black pixel of H to the nearest white pixel of H. By convention, the distance-to-white of a white pixel is zero.

The distance function used in the pair of distance maps $\{dH_K, dH_W\}$ can take three different forms. The first form illustrated in the FIG. 24 is called the Minkowski distance, also known as the Manhattan distance, the taxicab distance, and the $L_1$ distance (2103). With this form, the distance $D_{12}$ between two points $p_1=(x_1,y_1)$ and $p_2=(x_2,y_2)$ is measured along orthogonal axes and is computed as: $D_{12}=(|x_1-x_2|+|y_1-y_2|)$. The second form illustrated in the FIG. 24 is called the Chebyshev distance, also known as the chessboard distance, and the $L_\infty$ distance (2104). With this form, the distance $D_{12}$ between two points $p_1=(x_1,y_1)$ and $p_2=(x_2,y_2)$ is measured along orthogonal and diagonal axes and is computed as: $D_{12}=\max(|x_1-x_2|,|y_1-y_2|)$. The third form illustrated in the FIG. 24 is called the Euclidean distance, also known as the $L_2$ distance (2105). With this form, the distance $D_{12}$ between two points $p_1=(x_1,y_1)$ and $p_2=(x_2,y_2)$ is measured along orthogonal axes and is computed as: $D_{12}=\sqrt{(x_1-x_2)^2+(y_1-y_2)^2}$.

By construction, the distance maps $dH_K$ and $dH_W$ preserve the topology of the white (resp. black) areas of the halftone image H.

In the second step of the method, $dH_K$ and $dH_W$ are clamped so that their elements are in the range [0 . . . 127], then they are merged together in order to build the auxiliary grayscale image H'. The merging operation takes the form: $H'=dH_W-dH_K$, so that the elements of H' are comprised between −127 and +127.

Figure 25:
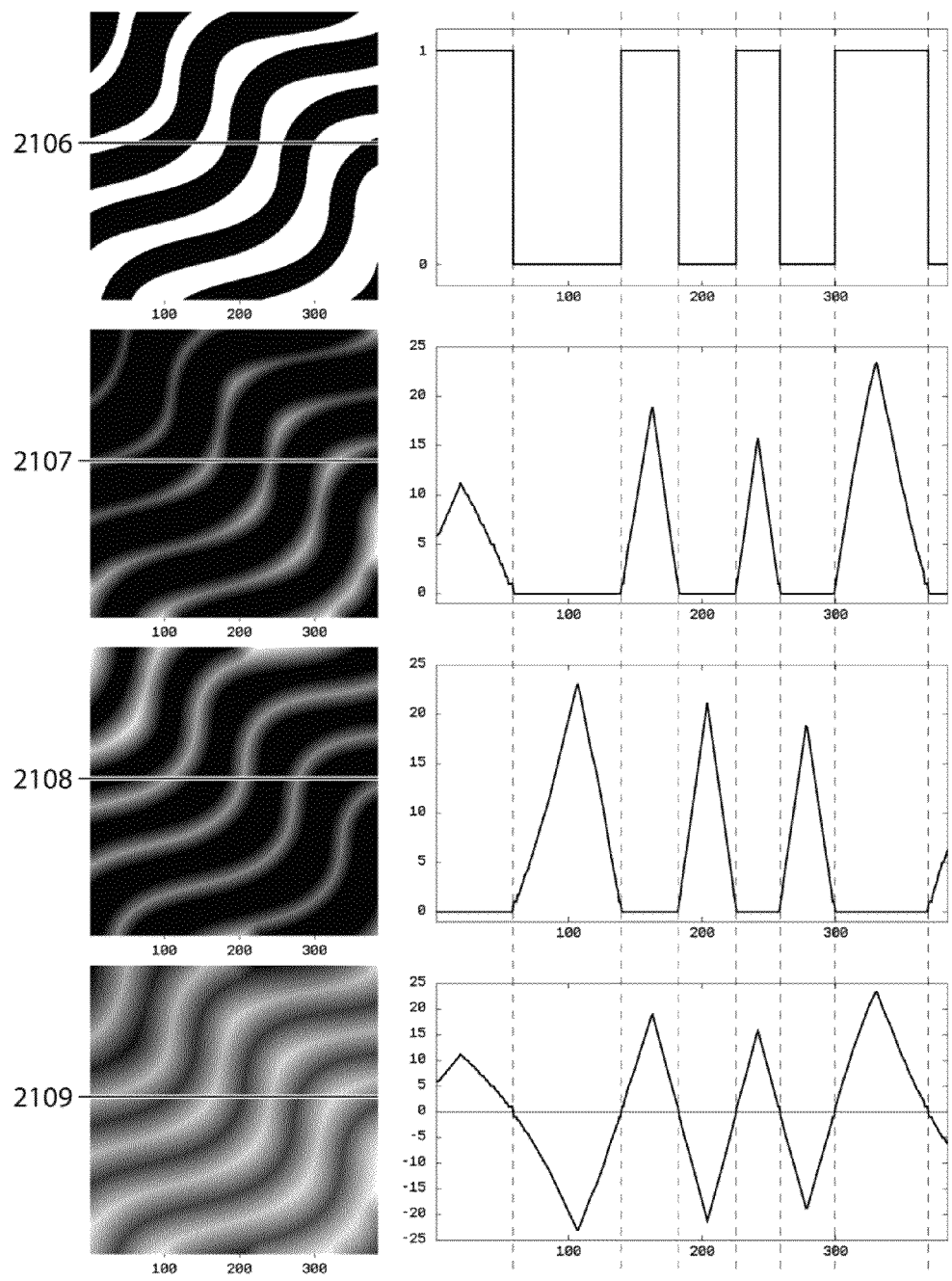
FIG. 25 shows a bilevel image, its distance-to-black and distance-to-white maps, and the auxiliary grayscale image based on these two maps.

The FIG. 25 illustrates the construction of the auxiliary grayscale image H'. A small halftone image H (2106) is sampled along a horizontal line; by convention, the black pixels have a value of 0 and the white pixels have a value of 1. The distance-to-black map $dH_K$ (2107) derived from H is sampled along the same horizontal line; the pixels of $dH_K$ that correspond to a white pixel in H have a value indicating their $L_1$ distance to the nearest black pixel of H, and the pixels of $dH_K$ that correspond to a black pixel in H are uniformly equal to zero. The distance-to-white map $dH_W$ (2108) derived from H is also sampled along the same horizontal line; the pixels of $dH_W$ that correspond to a black pixel in H have a value indicating their $L_1$ distance to the nearest white pixel of H, and the pixels of $dH_W$ that correspond to a white pixel in H are uniformly equal to zero. Finally, the auxiliary grayscale image H' (2109) is also sampled along the same horizontal line; the pixels of H' that correspond to a white pixel in H have a positive value, and the pixels of H' that correspond to a black pixel in H have a negative value.

Figure 26:
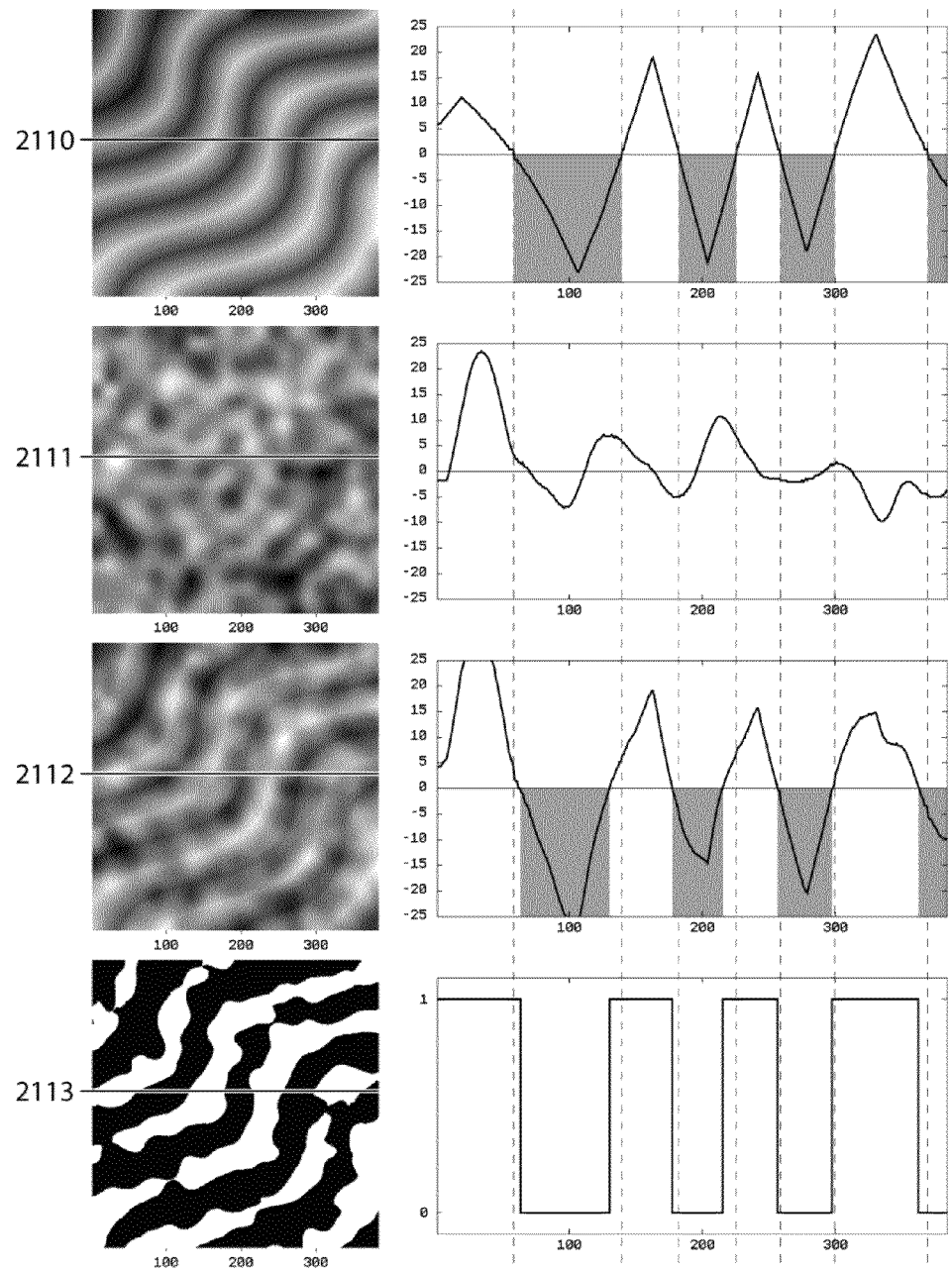
FIG. 26 shows an auxiliary grayscale image, a grayscale security pattern, the merging of the image and the security pattern, and the bilevel image obtained by thresholding this merging.
Figure 27:
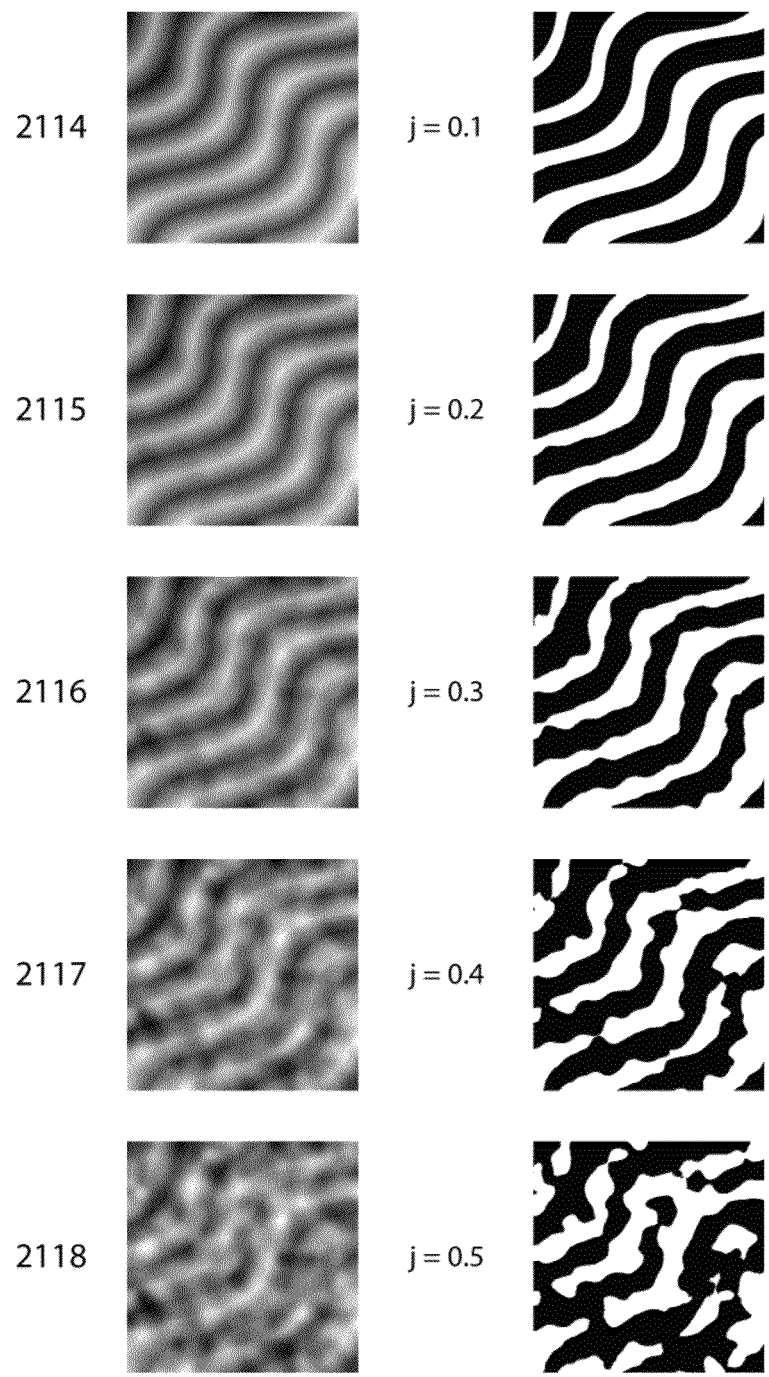
FIG. 27 shows on the left a grayscale security pattern merged with an auxiliary grayscale image at five different embedding intensity levels, and on the right the bilevel images obtained by thresholding the result of the mergings.

The third step of the method illustrated in the FIG. 26 merges the auxiliary grayscale image H' (2110) with the security pattern S (2111) by means of a linear interpolation in order to obtain a security grayscale image M' (2112): $M'=(1-j)\cdot H'+j\cdot S=H'+j\cdot(S-H')$. The interpolation factor j is in the range [0 . . . 1] and controls the amount of the security pattern S that is merged with the grayscale image H', as illustrated in the FIG. 27. When j is close to 0 (2114), the security grayscale image M' is close to H' and the visibility of the security pattern S is low; conversely, when j gets closer to 1 (2118), the security grayscale image M' gets closer to S and the structure of the security pattern becomes more and more visible. In other words, the interpolation factor j plays the role of an embedding intensity factor (2114-2118) and will be referred to as such hereafter.

The fourth step of the method produces the bilevel security halftone separation image M (2112) by thresholding the merged grayscale image M' (2111). All the pixels of M' with a value below 127.5 are mapped to the value 0 and produce a black pixel in M; all the pixels with a value equal to or above 127.5 are mapped to the value 1 and produce a white pixel in M.

If the security pattern S is balanced, that is if its average value is close to 0, then the black percentage of an arbitrary area A of M will be close to the black percentage of the same area A in H. In other words, using a balanced security pattern is a sufficient condition for ensuring that the final halftone image M is close, on average, to the original halftone image H, regardless of the embedding intensity factor j.

(3) Security Pattern Merged with a Bilevel Image while Limiting Erosion and Dilation In the third method, an auxiliary grayscale image H' based on the distance-to-black and distance-to-white maps of an original halftone image H is generated by the steps 1 and 2 of the second method.

During the third step of the third method, H' is merged with the security pattern S. The pixels of H' having an absolute value inferior or equal to a value $\epsilon$ are linearly interpolated between S and H'. The pixels of H' having an absolute value superior to $\epsilon$ are not interpolated, but their value is copied directly from H.

The fourth step of the third method is identical to the fourth step of the second method: the merged grayscale image M' is thresholded at the level 0 in order to produce a bilevel image.

Figure 28:
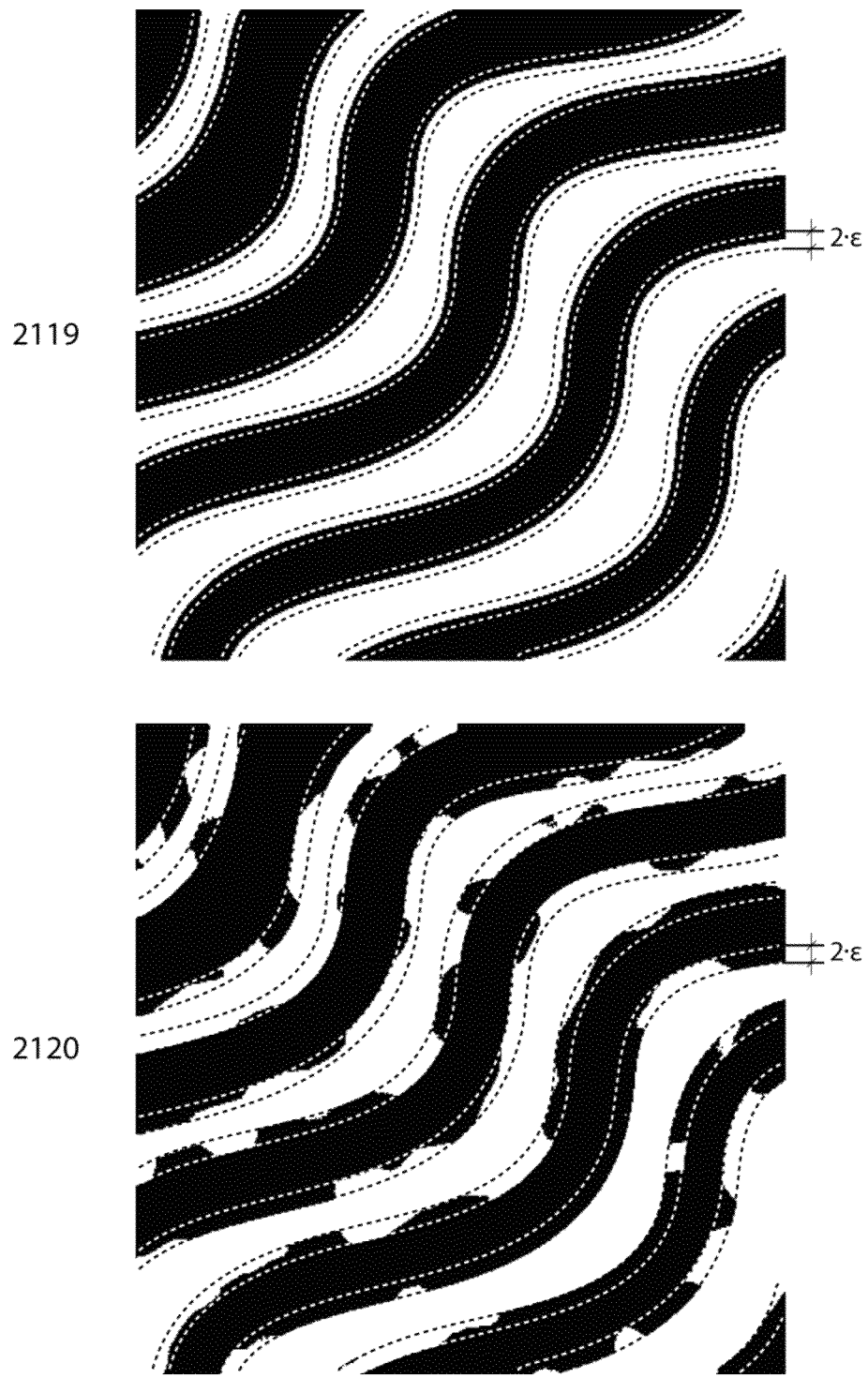
FIG. 28 shows a bilevel image with erosion and dilation limiters, and a second bi-level image obtained by embedding a security pattern in the first, constrained by these erosion and dilation limiters.
Figure 29:
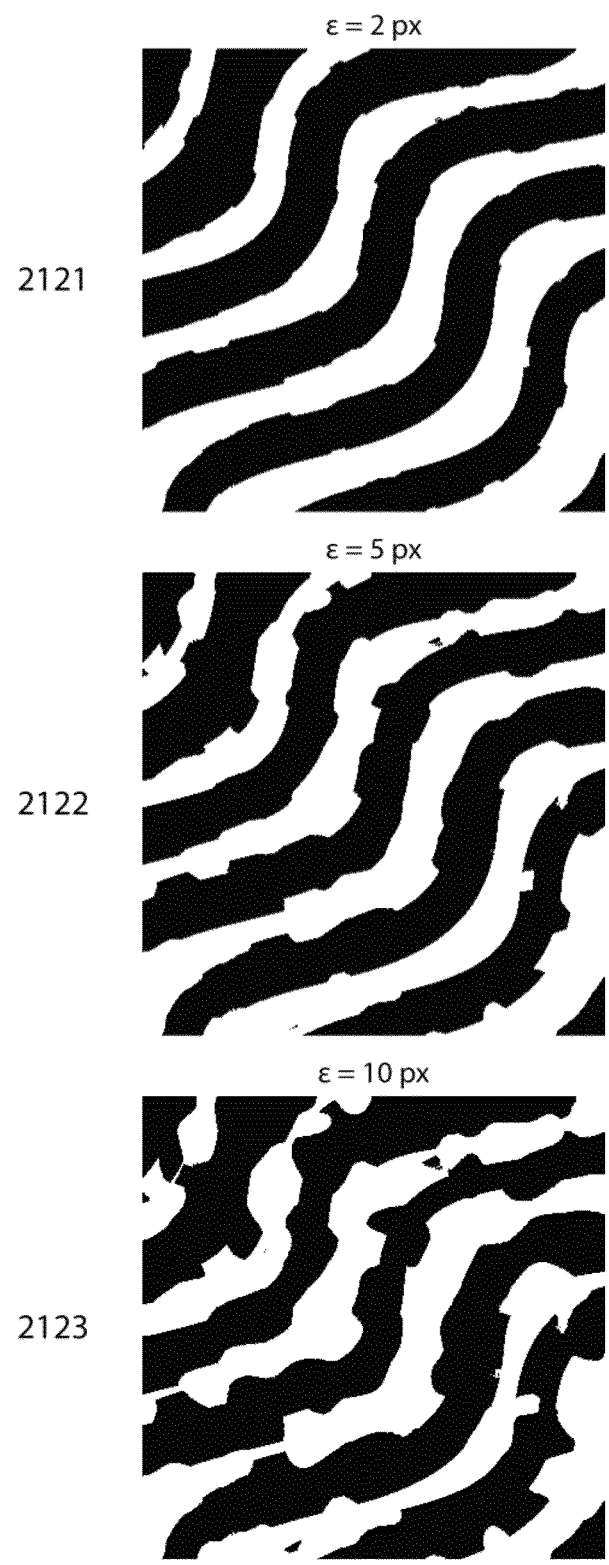
FIG. 29 shows three bilevel images embedded with a security pattern, constrained by three different erosion and dilation limits.

The value $\epsilon$ acts as a limiter for erosion and dilation of the halftone elements (2119), as illustrated in the FIG. 28: the parts of a halftone element that are within a distance $\epsilon$ of the border are eroded or dilated normally, but the parts that are beyond this distance are left untouched (2120). This limited merging illustrated in the FIG. 29 has the effect of reducing the distortion brought by the security pattern in the security halftone image M (2121-2123). The $\epsilon$ limiter is defined by the designer of the banknote in accordance to the characteristics of the original halftone image H and the specifications of the target printing press. For instance, let's suppose that the printing press has a minimum dot size of 30 μm. Let's also suppose that the designer wants to use this press for printing a halftone consisting of black lines with a minimum thickness of 50 μm. It follows from these constraints that the $\epsilon$ limiter must be set at 10 µm in order to prevent a line from being accidentally eroded on both sides to a thickness of less than 30 µm.

Figure 30:
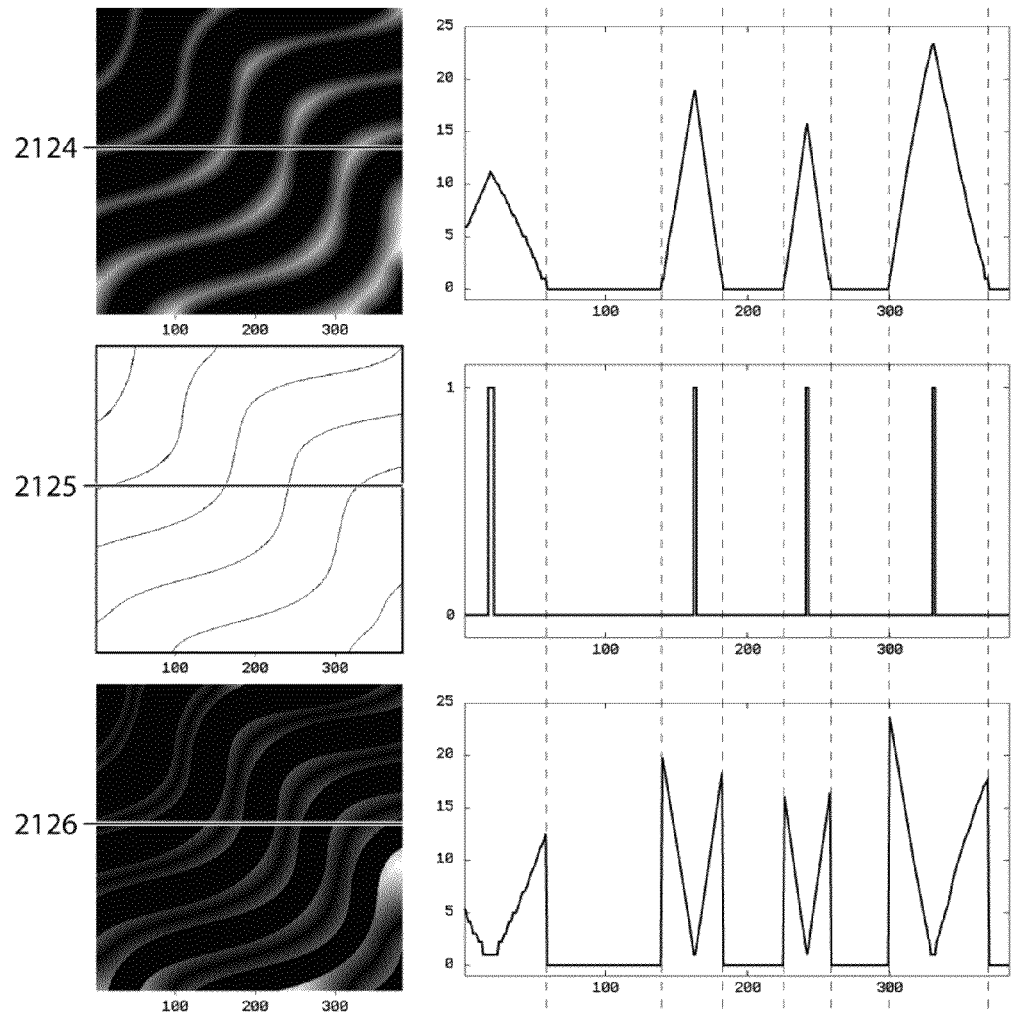
FIG. 30 shows a distance-to-black map, its ridge map and the thickness-of-white map built on this ridge map.
Figure 31:
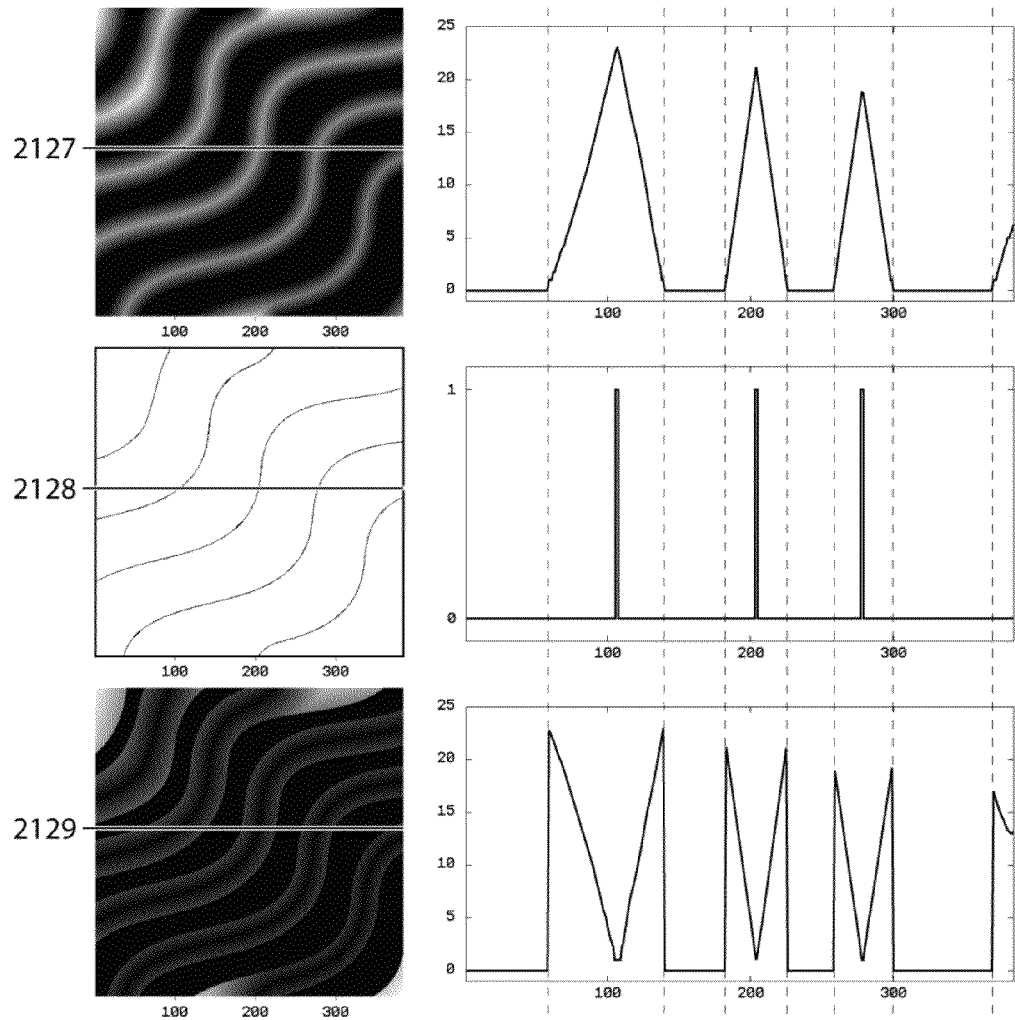
FIG. 31 shows a distance-to-white map, its ridge map and the thickness-of-black map built on this ridge map.

(4) Security Pattern Merged with a Bilevel Image while Preserving a Minimum Thickness In the fourth method illustrated in the FIGS. 30 and 31, a pair of complementary distance maps {$dH_K$, $dH_W$} is derived from an original halftone image H and is merged together in order to generate an auxiliary grayscale image H' following the steps 1 and 2 of the second method.

Before $dH_K$ (2124) and $dH_W$ (2127) are merged, the ridges that form their medial axis are computed and stored in a pair of bilevel images forming the ridge map $R_W$ (2125) and $R_K$ (2128), with 0 (black) indicating a ridge pixel in the corresponding distance map, and 1 (white) indicating a pixel that does not belong to any ridge. There are many ways of defining a ridge pixel, as described in http://en.wikipedia.org/wiki/Ridge_detection. On a distance map, a simple but efficient definition is to consider that a pixel belongs to a ridge if its value is superior or equal to the value of at least 6 of its 8 neighbors. Depending on the distance function used in the construction of the distance map, ridges are lines with a width of exactly one or two pixels. On $R_W$, the ridges are located exactly halfway between the screen elements that constitute the original halftone image H. On $R_K$, the ridges are located exactly on the medial axis of the screen elements that constitute the original halftone image H. The distance-to-black maps {$T_W$, $T_K$} of the ridges $R_W$ and $R_K$ are then computed. The pixels of $T_W$ (2126) that correspond to a black pixel in H are then set to zero, and the pixels of $T_K$ (2129) that correspond to a white pixel in H are also set to zero. Since the ridges of $R_W$ are located exactly halfway between the screen elements of H, it follows that the values of the distance map $T_W$ are a measure of the thickness of the white space separating the screen elements. Reciprocally, since the ridges of $R_K$ are located on the medial axis of the screen elements of H, it follows that the values of the distance map $T_K$ are a measure of the thickness of these screen elements. Based on this observation, $T_W$ and $T_K$ are referred to hereafter as "thickness maps". More specifically, $T_W$ measures the thickness of the white space between screen elements, and is therefore called "thickness-of-white", and $T_K$ measures the thickness of the screen elements themselves, and is therefore called "thickness-of-black".

These thickness maps are used in the third step of the fourth method, which merges H' with the security pattern S in order to obtain a security grayscale image M'. The pixels of H' that correspond to a black pixel of H are matched coordinate wise with the pixels of the thickness-of-black map $T_K$. If a black pixel is associated with a thickness $T_K$ superior or equal to a threshold $\epsilon_K$, then this pixel is linearly interpolated between S and H'. If a black pixel is associated with a thickness $T_K$ inferior to the threshold $\epsilon_K$, its value is copied directly from H. A similar decision is applied to the pixels of H' that correspond to a white pixel of H: they are matched coordinate-wise with the pixels of the thickness-of-white map $T_W$. If a white pixels is associated with a thickness $T_W$ superior or equal to a threshold $\epsilon_W$, then this pixel is linearly interpolated between S and H'. If a white pixel is associated with a thickness $T_W$ inferior to the threshold $\epsilon_W$, its value is copied directly from H.

The fourth step of the fourth method is identical to the fourth step of the first and second methods: the merged grayscale image M' is thresholded at the level 0 in order to produce a bilevel image.

Figure 32:
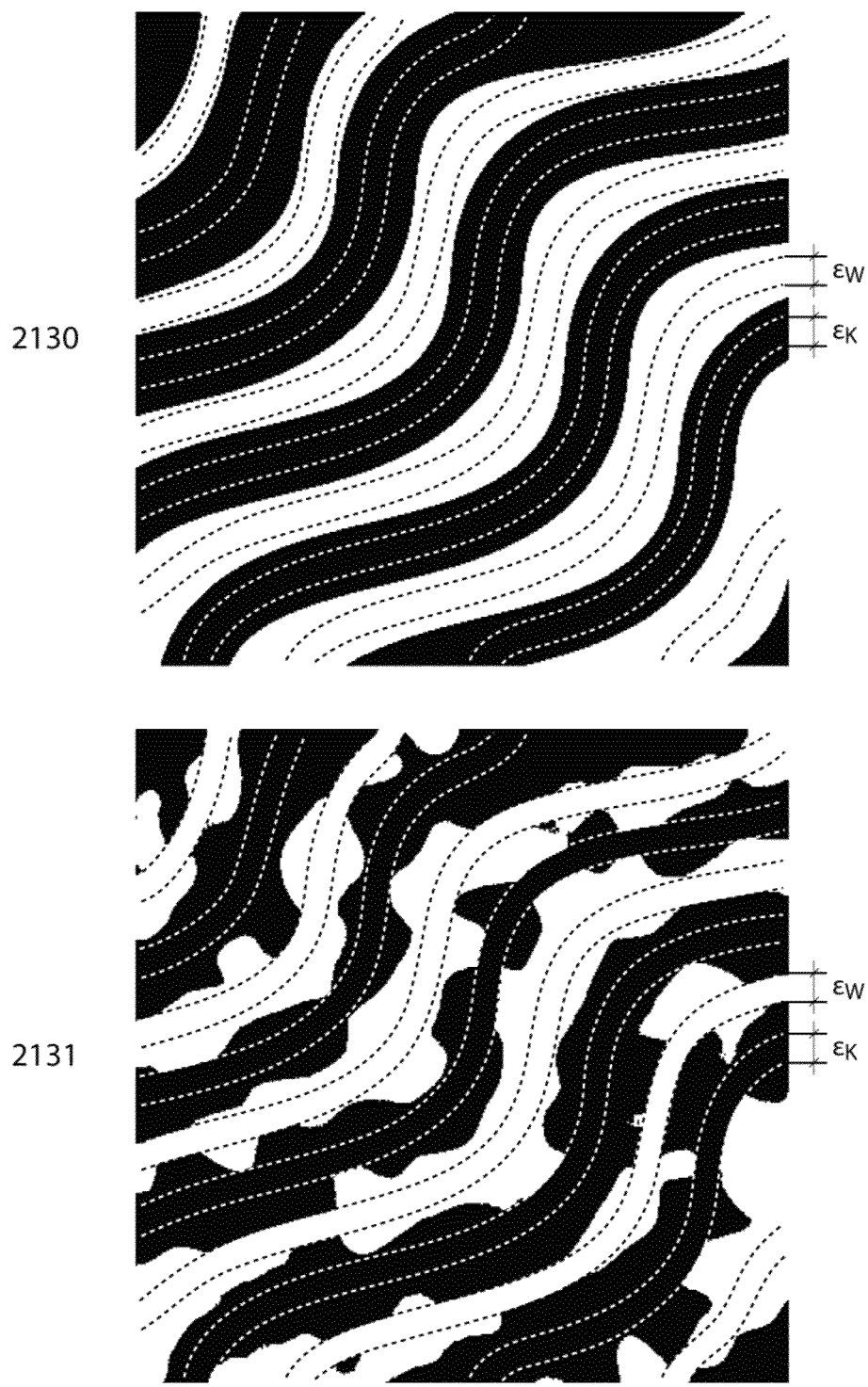
FIG. 32 shows a bilevel image with black and white thickness limiters, and a second bilevel image obtained by embedding a security pattern in the first, constrained by these thickness limiters.
Figure 33:
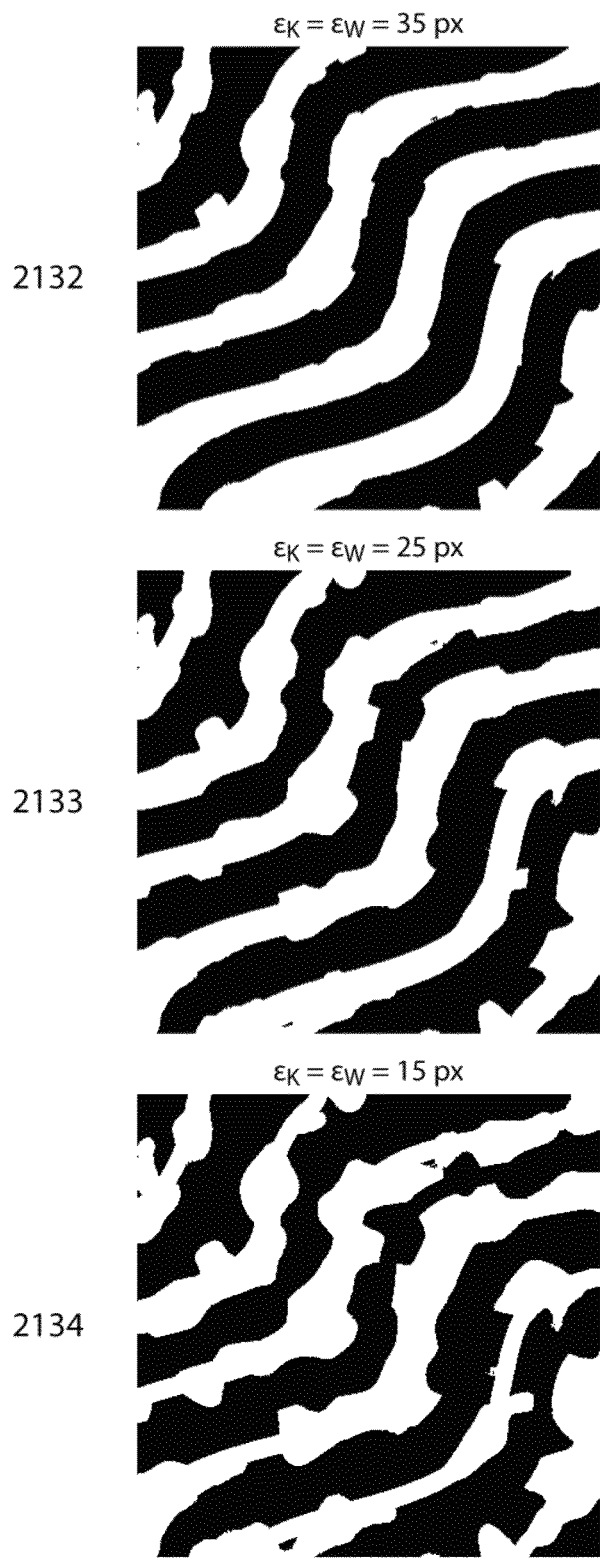
FIG. 33 shows three bilevel images embedded with a security pattern, constrained by three different thickness limiters.

The value $\epsilon_W$ acts as a limiter for the dilation of the halftone elements (2130), as illustrated in the FIG. 32: a halftone element may be dilated up to the point where it would reduce the thickness of its neighboring white space below $\epsilon_W$ (2131). In a similar way, the value $\epsilon_K$ acts as a limiter for the erosion of the halftone elements (2130): a halftone element may be eroded up to the point where this erosion would bring its thickness below $\epsilon_K$ (2131). In other words, the $\epsilon_K$ and $\epsilon_W$ limiters guarantee, that a minimum thickness will be preserved in the black and white screen elements. This limited merging illustrated in the FIG. 33 has the effect of reducing the distortion brought by the security pattern in the security halftone image M (2132-2134). The $\epsilon_K$ and $\epsilon_W$ limiters used in the third step are defined by the designer of the banknote in accordance with the characteristics of the halftone image H and the specifications of the target printing press. For instance, let's suppose that the printing press has a minimum dot size of 30 µm and a minimum dot interval of 40 µm. Let's also suppose that the designer wants to use this press for printing a halftone consisting of alternating black and white lines, with each line having a minimum thickness of 50 µm. It follows from these constraints that the $\epsilon_K$ limiter should be set at 30 µm in order to force black lines to have a thickness of at least 30 µm, and that the $\epsilon_W$ limiter should be set at 40 µm in order to force white lines to have a thickness of at least 40 µm.

Detecting a Security Image

The pattern embedded in a security image is typically recovered after the printout of the image. A digital imaging device (like a digital scanner or a camera for instance) is then used to bring back the printed material in the digital domain. The pattern is designed in such a way that it is possible to trigger a primary detection with a mono-dimensional signal processing performed along a straight line having an arbitrary direction across the pattern, for any scale and rotation transformations (in a previously defined range). If this primary detection yields a conclusive answer, then the detection can stop with a positive or negative result. However, if the answer of the primary detection is inconclusive, a secondary detection process is launched and performs a more thorough examination of the image. Three issues have to be addressed in order to obtain this result: the reliability of the detection trigger (false-positive and false-negative detections), the robustness to geometrical transforms, and the robustness to loss of data in the security image.

The reliability of the detection basically relies on a statistical test. This test must be performed on a sufficiently large set of data in order to reach the performance desired for false-positive (signal detected while not being present) and for false-negative (signal not detected while being present). In the targeted application, the false-positive rate is expected to reach 1 over 10 millions or better. The statistical data can be processed during the digitization or during an unauthorized printing attempt. Since the detection approach relies on a 1 dimensional signal processing, it may also be performed in real-time as data is streamed into the hardware into which the detection is performed. It is also possible to make this primary detection more tolerant to false positives and use a secondary, more thorough detection process on the cases that trigger a positive, yet inconclusive answer.

The robustness to geometrical transforms is achieved by using a source 1D signal that is invariant under affine transformations.

The robustness to loss of data in the security image is achieved by using a secondary, more systematic detection process when the primary detection process returns an inconclusive answer.

Primary 1D Detection through Projection

The primary detection process of the embedded security pattern is based on the discrete Fourier transform of a projection of the image and is described in WO/2006/048368.

Secondary 1D Detection through 2D Sweep

There are cases when the detection of the security pattern through a projection yields an inconclusive result. Such cases include debased security images where the security pattern covers only a small fraction of the total area, images with a very low resolution or security images that were compressed with a lossy compression algorithm using a low quality factor.

Figure 34:
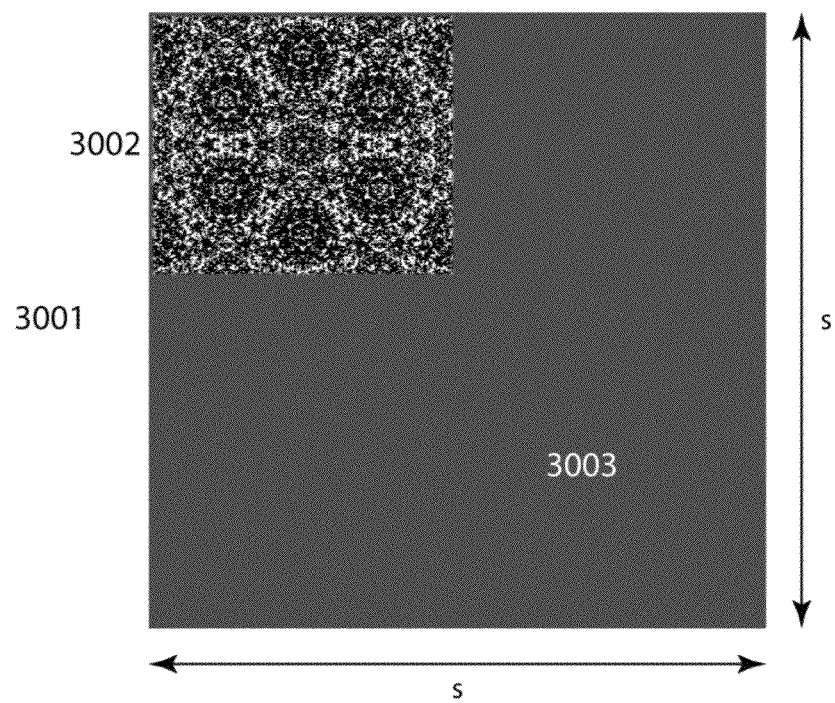
FIG. 34 shows a debased security image consisting in a fragment of a downsampled security pattern surrounded by a uniform gray.
Figure 35:
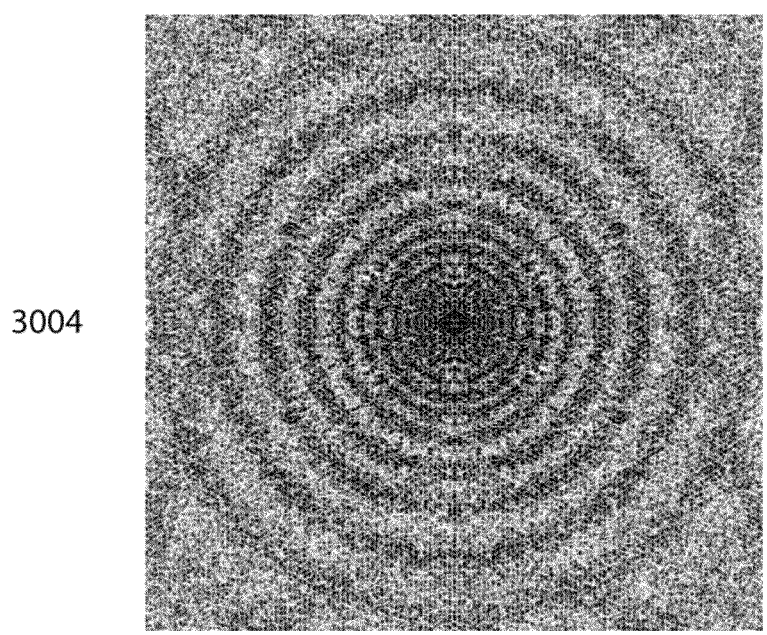
FIG. 35 shows the magnitude component of the 2D Fourier transform of a debased security image.
Figure 36:
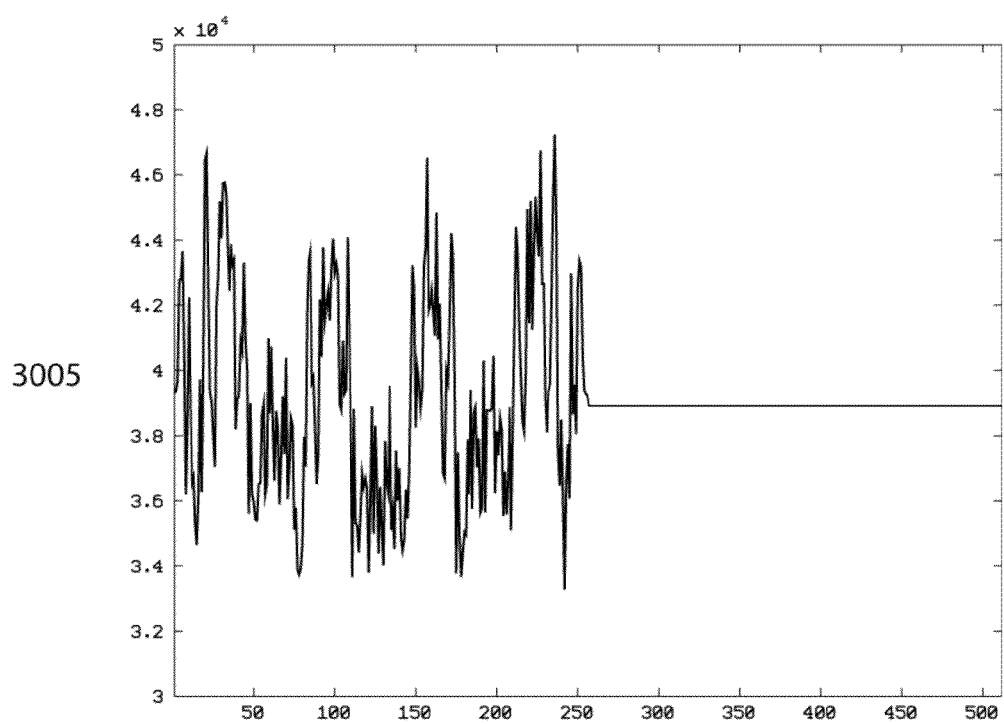
FIG. 36 shows the projection of a debased security image.
Figure 37:
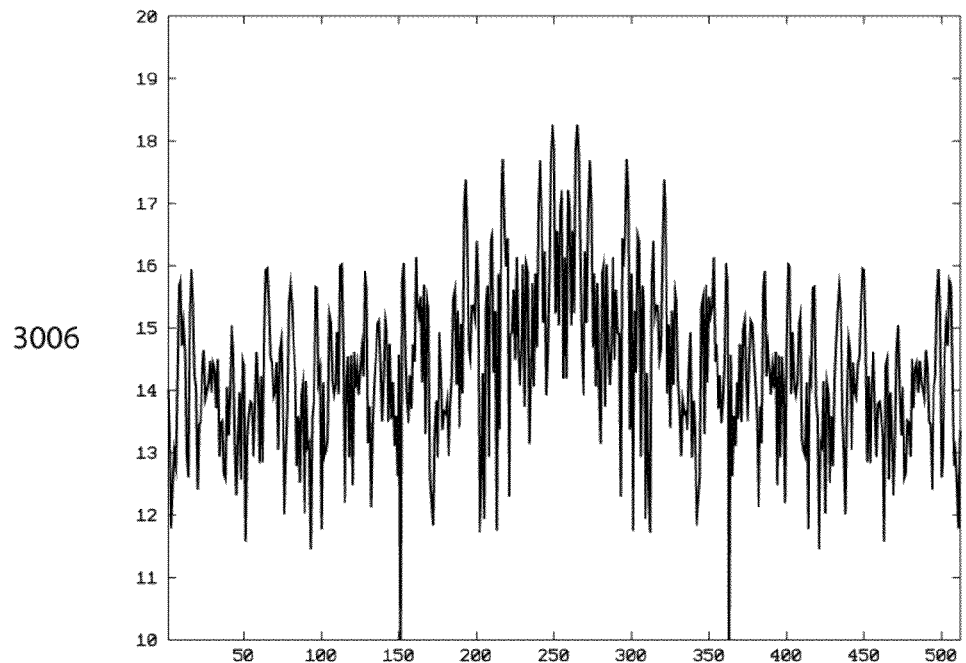
FIG. 37 shows the magnitude of the 1D Fourier transform of the projection of a debased security image.
Figure 38:
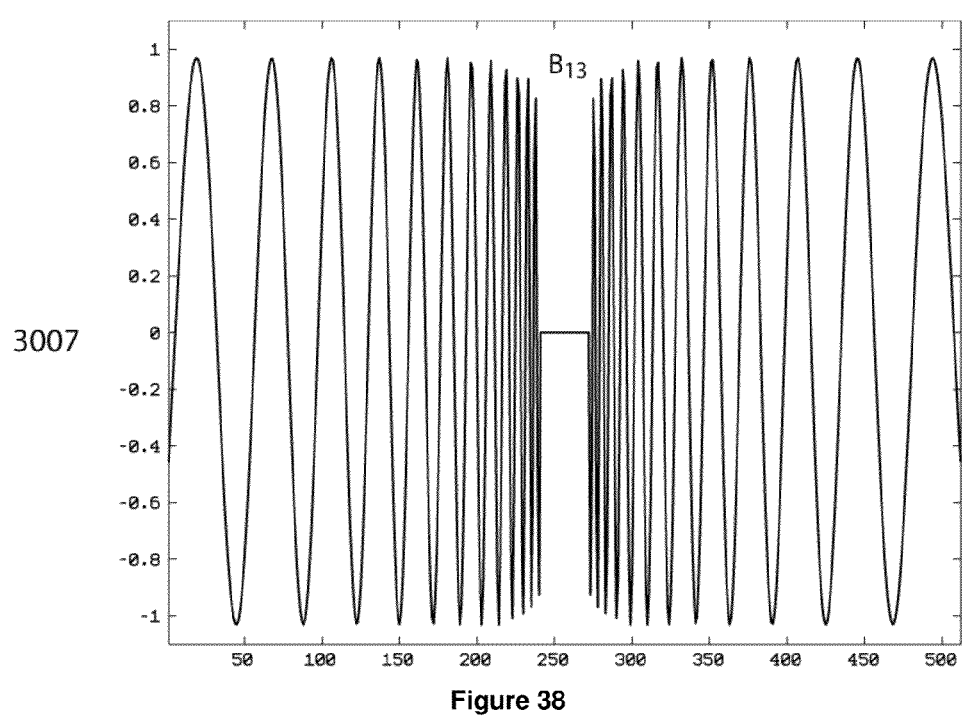
FIG. 38 shows a source 1D function.
Figure 39:
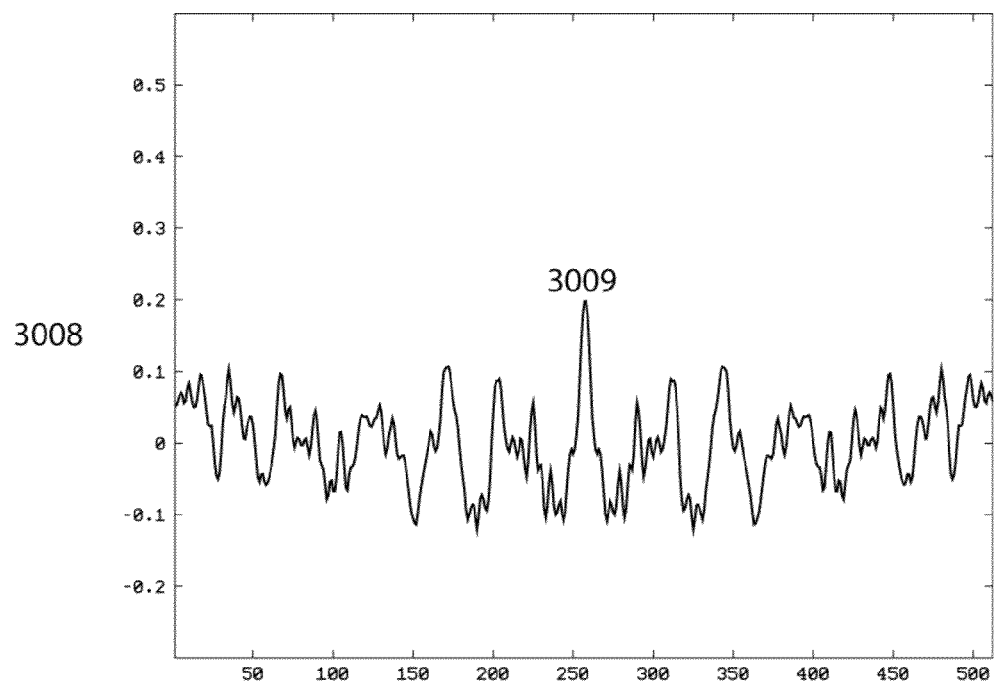
FIG. 39 shows the cross-correlation of a source 1D function with the magnitude of the 1D Fourier transform of the projection of a debased security image.

An example of such a debased security image is illustrated in the FIG. 34 (3001) with a low-resolution security pattern (3002) that covers only $\frac{1}{4}^{th}$ of the image area, the remaining $\frac{3}{4}^{th}$ being a uniform gray (3003). The magnitude (3004) of the discrete 2D Fourier transform of (3001) is illustrated in the FIG. 35 by a faint 2D circularly symmetric grating; a closer look on FIG. 35 reveals that a lot of noise is present in this 2D circularly symmetric grating. As illustrated in the FIGS. 36 and 37, this noise has a large impact on the magnitude (3006) of the discrete 1D transform of the projection (3005) of the image (3001) along its columns, obtained by the application of the projection-slice theorem. The similarity between this magnitude (3006) and the source 1D function (3007) that is illustrated in the FIG. 38 and that was used to generate the 2D circularly symmetric function discernible in (3004) is far from obvious. As a consequence, the normalized 1D cross-correlation (3008) between the source 10 function (3007) and the magnitude (3006) of the 1D Fourier transform of the projection (3005) is very low: as illustrated in the FIG. 39, the value of the cross-correlation peak (3009) reaches approximately 0.2 on a theoretical possible maximum of 1.0. While the cross-correlation peak (3009) indicates the presence of the source 1D function (3007) in the image (3001), its value is not high enough to provide a conclusive answer.

Figure 40:
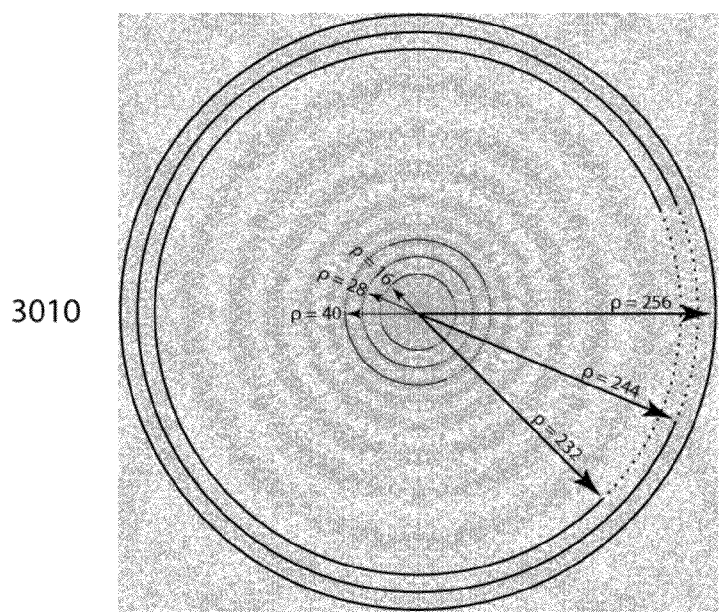
FIG. 40 shows the magnitude component of a 2D Fourier transform superimposed with the polar coordinate system that is used to rank the coefficients of this magnitude component according to their radius.

In the cases where the detection of the security pattern through a projection yields an inconclusive answer, a secondary detection process is carried out in order to obtain an answer with a sufficient degree of reliability. This secondary process consists of 12 steps comprising 11 preprocessing steps followed by 1 comparison step; these steps are described in the paragraphs below numbered from step 1 to step 12.

step 1 The magnitude component R (3004) of the 2D discrete Fourier transform of a fixed-size chunk of the image (3001) is calculated. The size s of this chunk is small, typically ranging between 128 and 512, i.e. the chunk contains from 128×128 pixels to 512×512 pixels.

step 2 The magnitude component R is mapped from Cartesian coordinates to polar coordinates as illustrated in the FIG. 40. and each coefficient $R_{xy}$ is ranked according to its rounded off polar radius ρ (3010), with $$\rho(x, y) = \sqrt{\left(x - \frac{s}{2}\right)^2 + \left(y - \frac{s}{2}\right)^2};$$

$$\rho \in \left\{1, 2, K, \frac{s}{2}\right\}.$$

Figure 41:
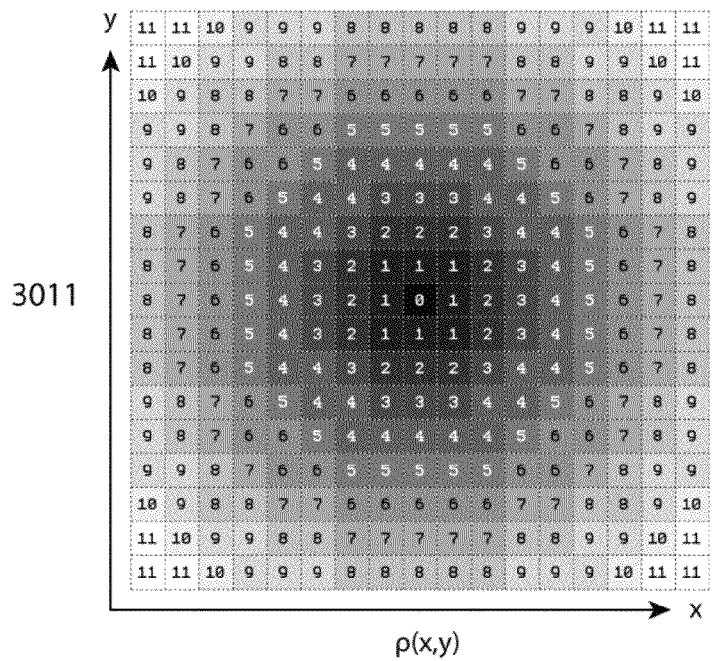
FIG. 41 shows a 2D table of precalculated radii.
Figure 42:
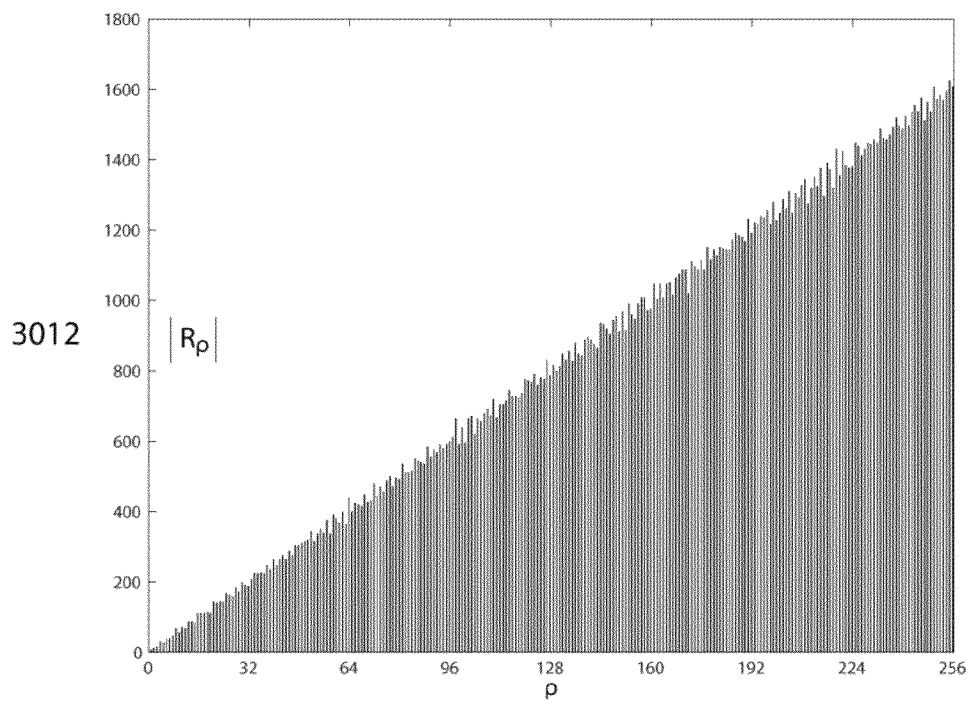
FIG. 42 shows a ragged array containing the coefficients of the magnitude component of a 2D Fourier transform, said coefficients being ranked according to their radius.
Figure 43:
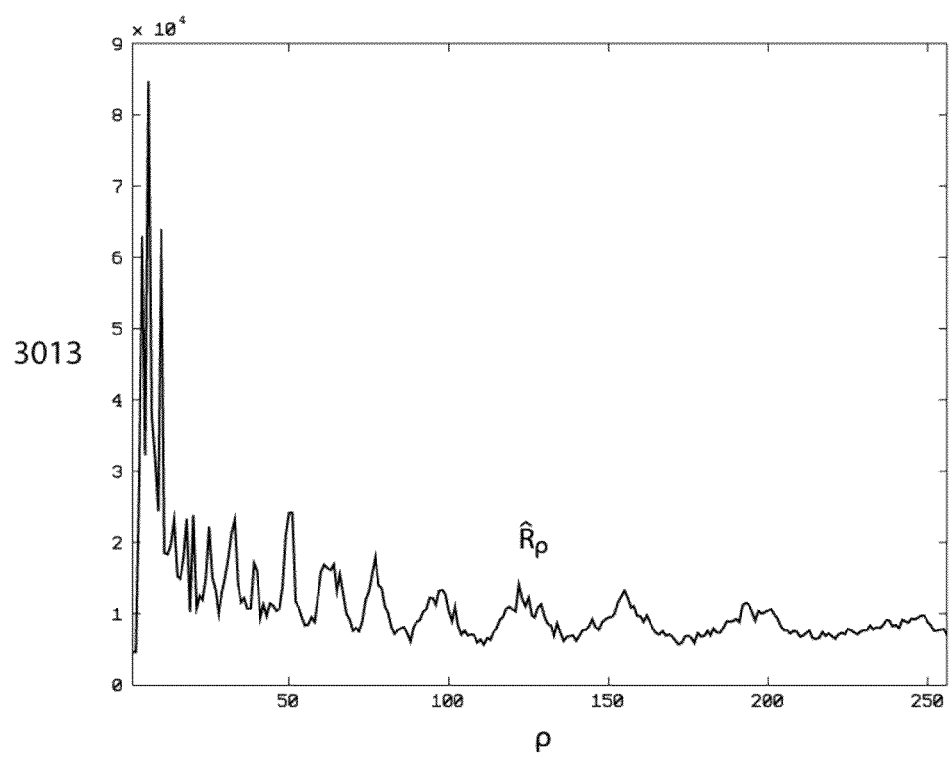
FIG. 43 shows the order statistic of the coefficients of the magnitude component of a 2D Fourier transform, said coefficients being ranked according to their radius.
Figure 44:
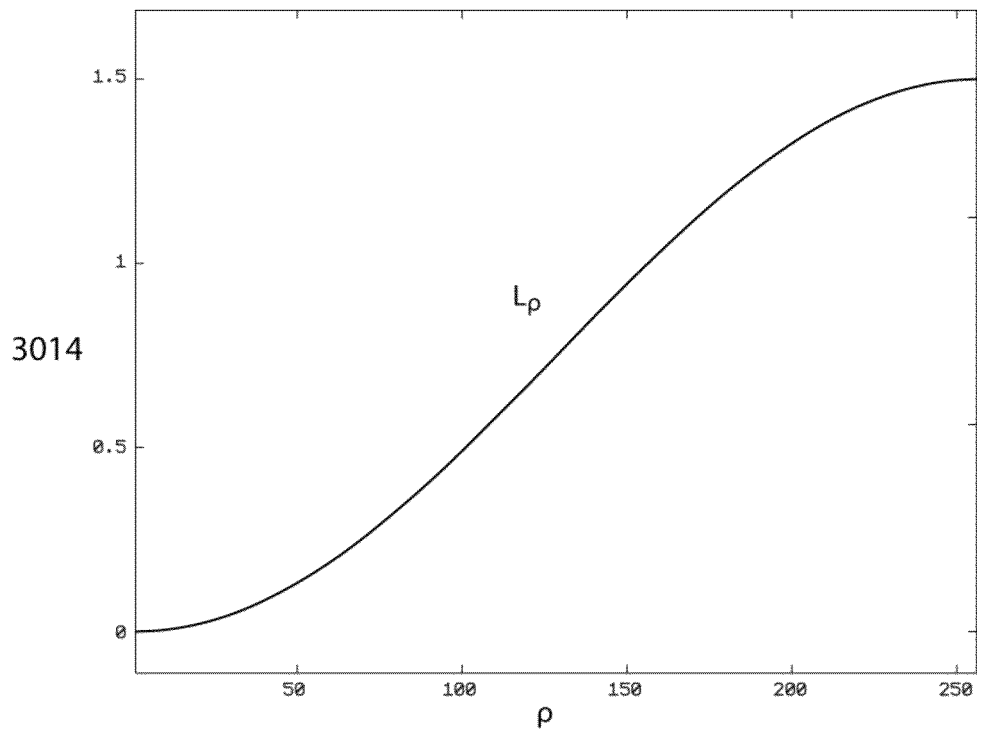
FIG. 44 shows the radial magnitude component of the 2D Fourier transform of the discrete approximation to a Laplacian filter.
Figure 45:
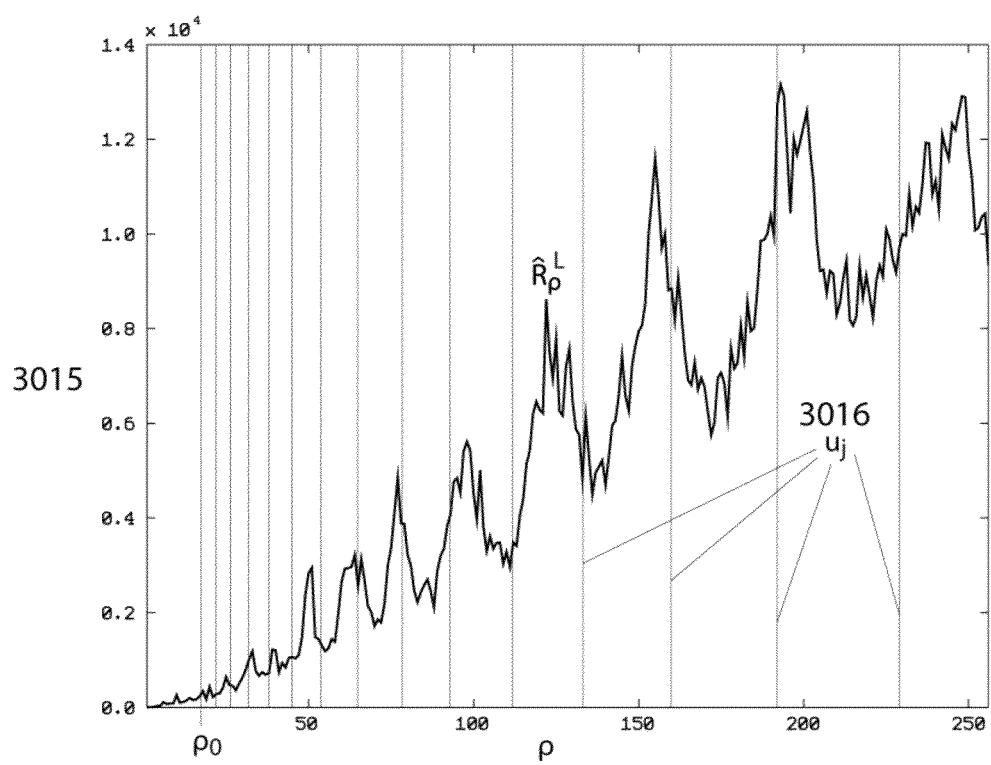
FIG. 45 shows the product of an order statistic with a Laplacian filter, over an inverse-log grid.

This ranking operation is performed using a precomputed table (3011) that maps integer x and y Cartesian coordinates to an integer radius ρ, as illustrated in the FIG. 41. The result of this ranking is a 2D ragged array $R_\rho$ having $$\frac{s}{2}$$

columns (3012) as illustrated in the FIG. 42, with the ρ-th column of $R_\rho$ containing the $|R_\rho|$ coefficients of R that are located at a rounded off distance ρ of the center of R. For each integer radius ρ in the range $$\left\{1, 2, K, \frac{s}{2}\right\},$$

an order statistic $\hat{R}_\rho$ of the ρ-th column of $R_\rho$ is computed in order to get a representative value of R at a distance ρ from its center. Possible order statistics include the median and the first quartile. Using an order statistic at this stage is crucial, because the magnitude of the 2D discrete Fourier transform of typical printed images exhibits sharp peaks that correspond to the dominant spatial frequencies of those images. These frequency peaks tend to disrupt other statistical estimators like the arithmetic mean, but they do not affect order statistics, which have the property of filtering out the outliers.

step 3 As illustrated in the FIG. 43, the 1D curve resulting from the order statistic $\hat{R}_\rho$ (3013) is not flat, because the coefficients near the center of the 2D Fourier transform carry more energy than the coefficients away from the center. As a result, the value of $\hat{R}_\rho$ gets larger when ρ is close to zero. Therefore, the value of the low-frequency coefficients must be decreased by multiplying $\hat{R}_\rho$ with the radial magnitude component of the 2D Fourier transform $L_\rho$ (3014) of the discrete approximation to a Laplacian filter. The kernel of the discrete approximation is $$\frac{1}{8} \cdot \begin{bmatrix} 1 & 1 & 1 \\ 1 & -8 & 1 \\ 1 & 1 & 1 \end{bmatrix};$$

the radial magnitude component of its 2D Fourier transform $L_\rho$ (3014) illustrated in the FIG. 44 is given by $$L_\rho = \frac{3}{4} \cdot \left(1 - \cos\left(\frac{2\pi\rho}{s}\right)\right),$$

where s is the size of the image chunk (3001). As illustrated in the FIG. 45, the result $\hat{R}_\rho^L$ (3015) of this multiplication has a more regular envelope than the unfiltered order statistic $\hat{R}_\rho$ (3013), but it must undergo a thorough flattening in order to provide a reliable cross-correlation with the source 1D signal (3007).

step 4 By construction, a potential source 1D signal (3007) present in the filtered order statistic $\hat{R}_\rho^L$ (3015) has to be self-similar, and therefore cannot be strictly periodic. Therefore, $\hat{R}_\rho^L$ must be resampled so that a potentially present 1D signal becomes strictly periodic. The resampling operation depends on the source 1D signal that is sought by the additional detection process. In this description, the source 1D signal (3007) is a log-harmonic function of the form cos(kπ·log$_2$(ρ)). Therefore, in order to make a potential source 1D signal periodic, the order statistic $\hat{R}_\rho^L$ (3015) is resampled along a sequence of coordinates $\{u_j\}$ (3016) given by the formula:

$$u_j = 2^{log_2 \rho_0 + j \cdot \Delta \rho},$$

with $$\Delta \rho = \frac{\log_2 N - \log_2 \rho_0}{M},$$

Figure 46:
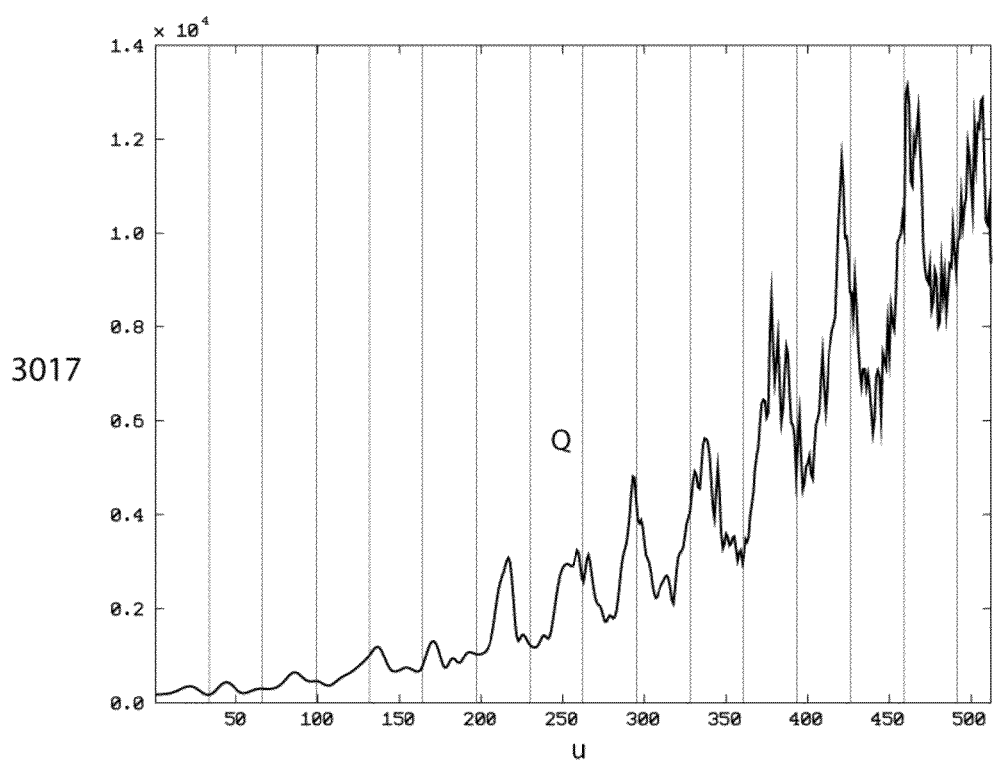
FIG. 46 shows a filtered order statistic resampled over an inverse-log grid.
Figure 47:
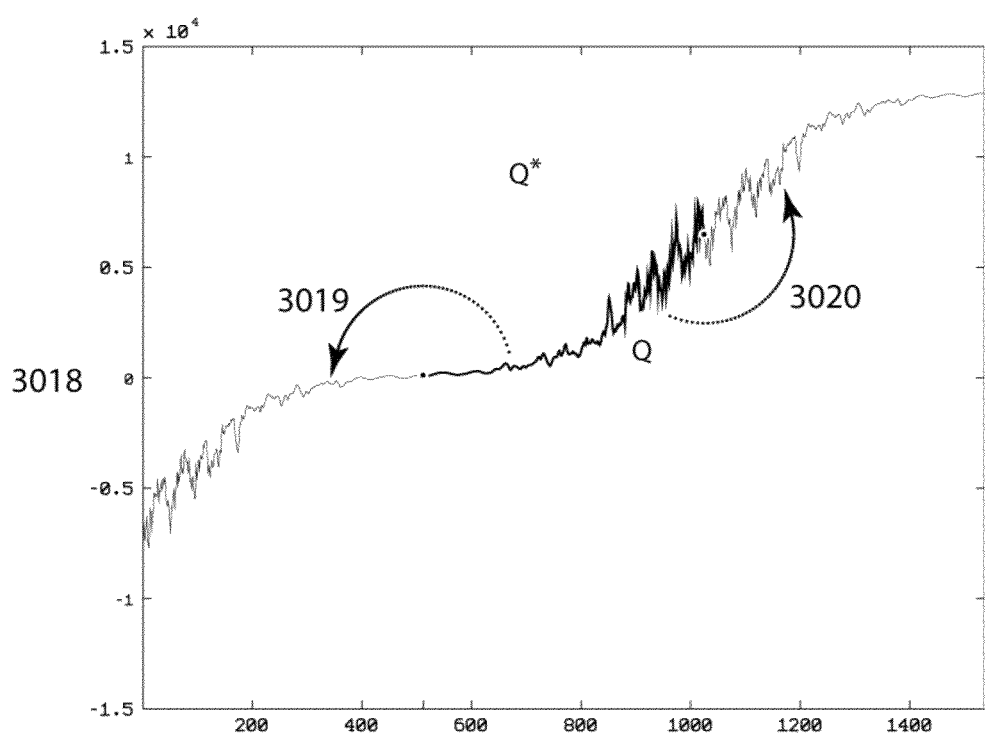
FIG. 47 shows the left and right extension of a resampled, filtered order statistic.
Figure 48:
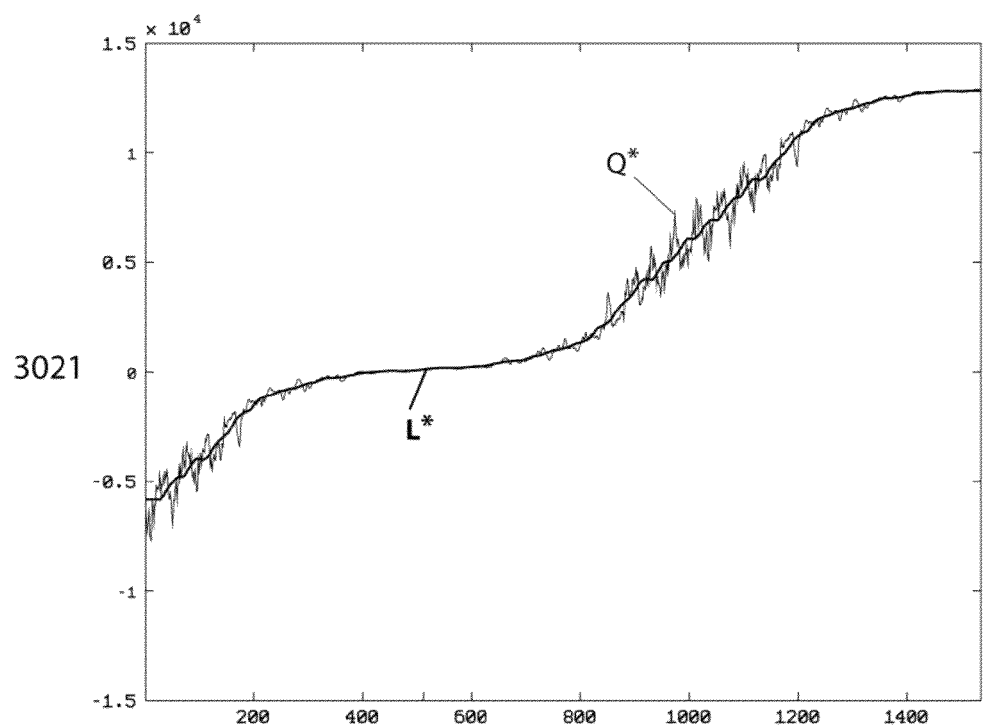
FIG. 48 shows an extended signal and its moving window average.
Figure 49:
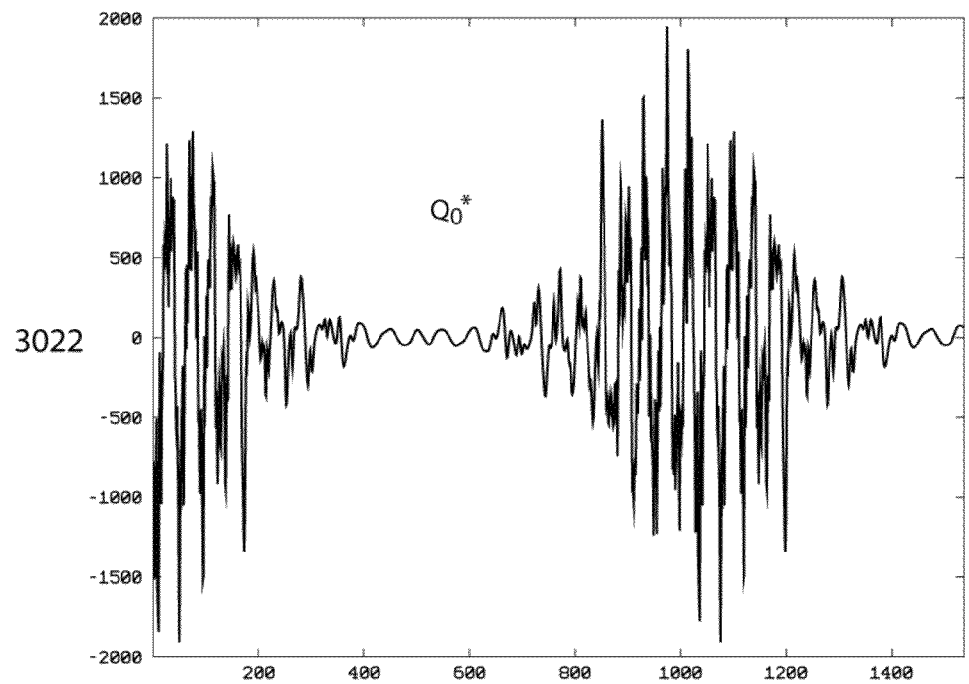
FIG. 49 shows an extended signal after a low-pass filtering.
Figure 50:
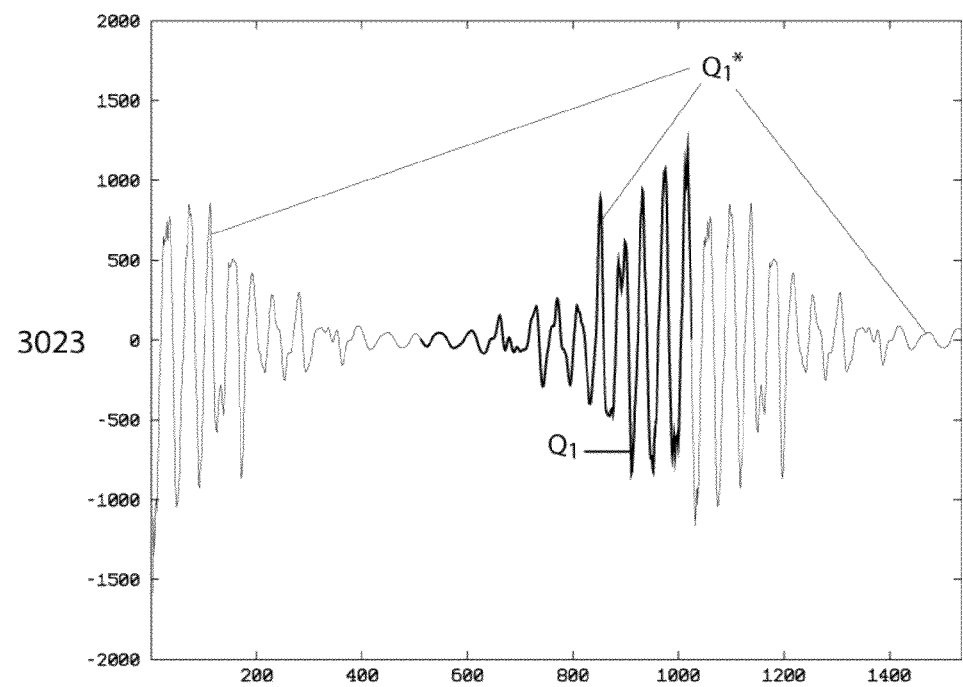
FIG. 50 shows an extended signal after a low-pass and a high-pass filtering.
Figure 51:
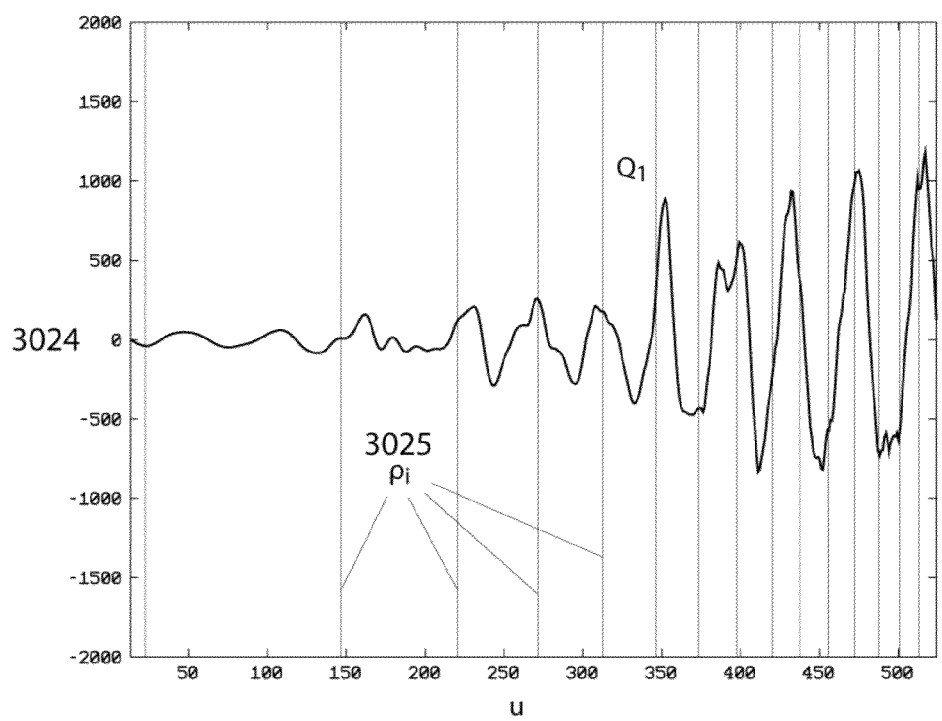
FIG. 51 shows the middle third of a flat, extended signal over a log grid.
Figure 52:
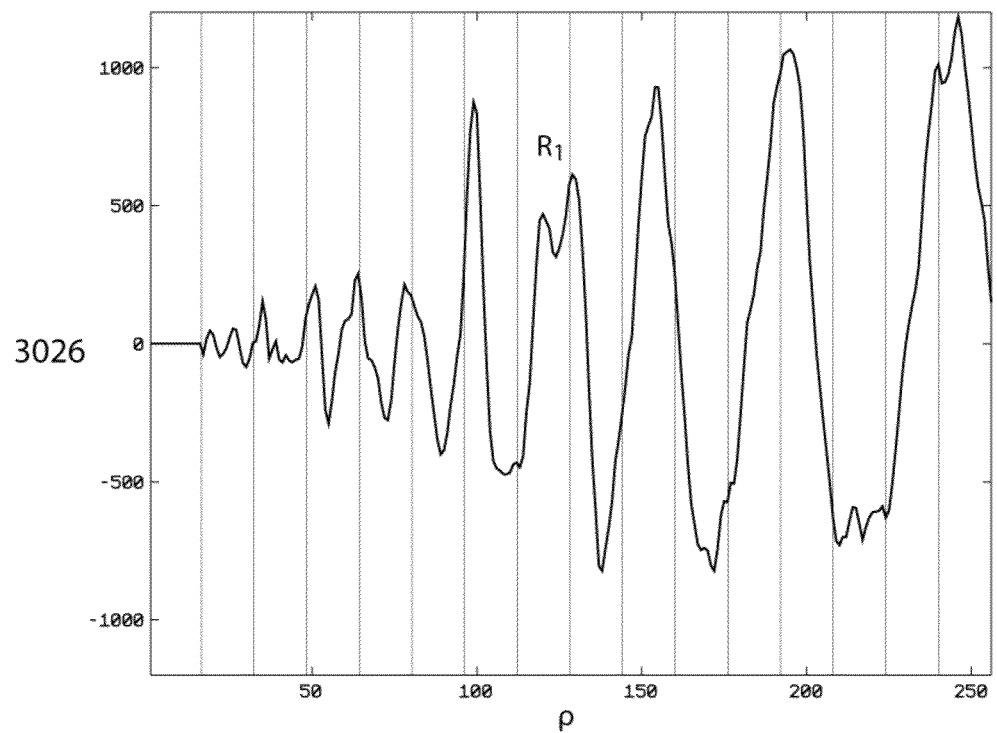
FIG. 52 shows the middle third of a flat, extended signal after a log-resampling.
Figure 53:
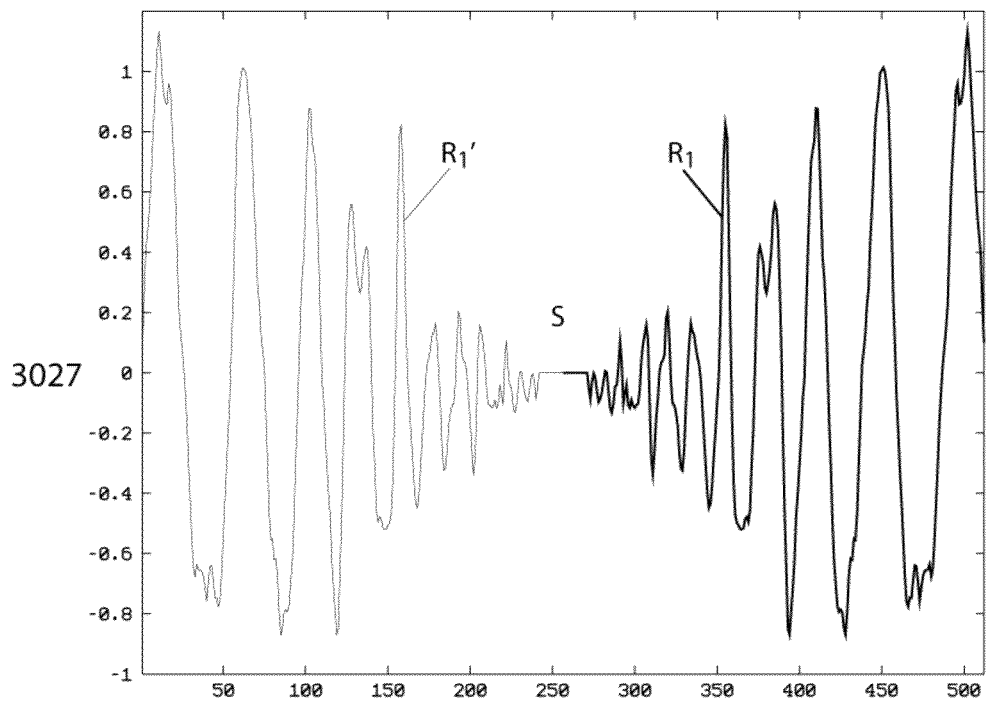
FIG. 53 shows the signature of an image chunk under the form of a normalized, filtered signal concatenated with a copy of itself obtained by a symmetry around the vertical axis.
Figure 54:
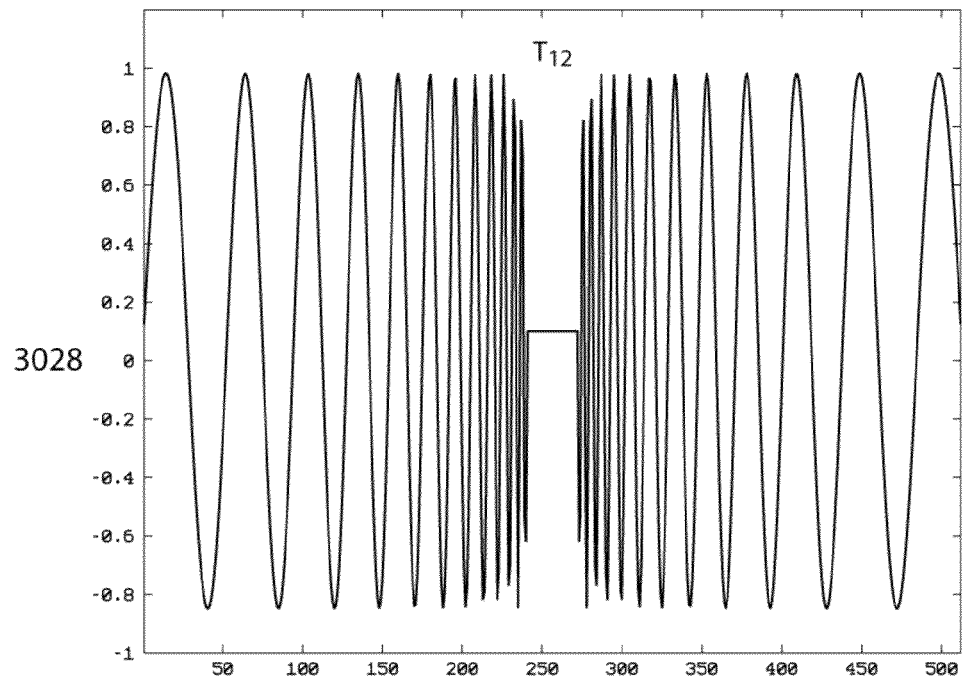
FIG. 54 shows a member of a codebook of template functions.
Figure 55:
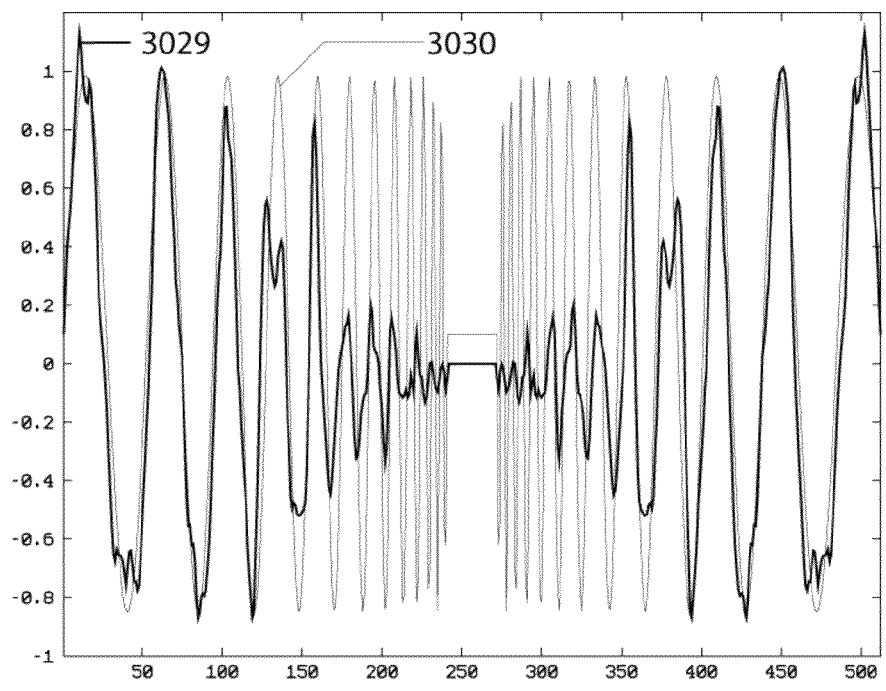
FIG. 55 shows the superposition of the signature of an image chunk and a matching template function.
Figure 56:
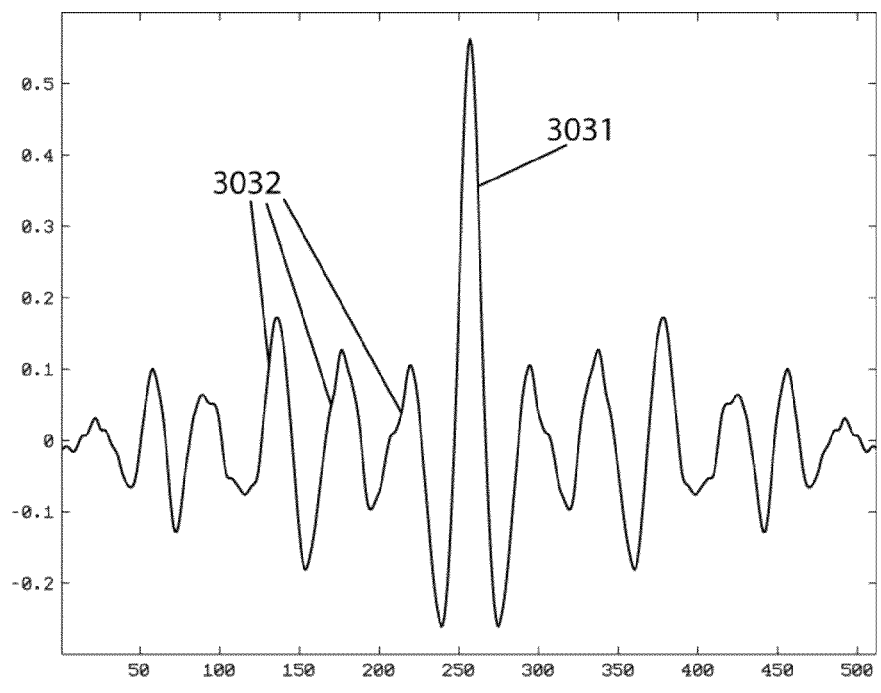
FIG. 56 shows the 1D cross-correlation of a template function with a signature.
Figure 57:
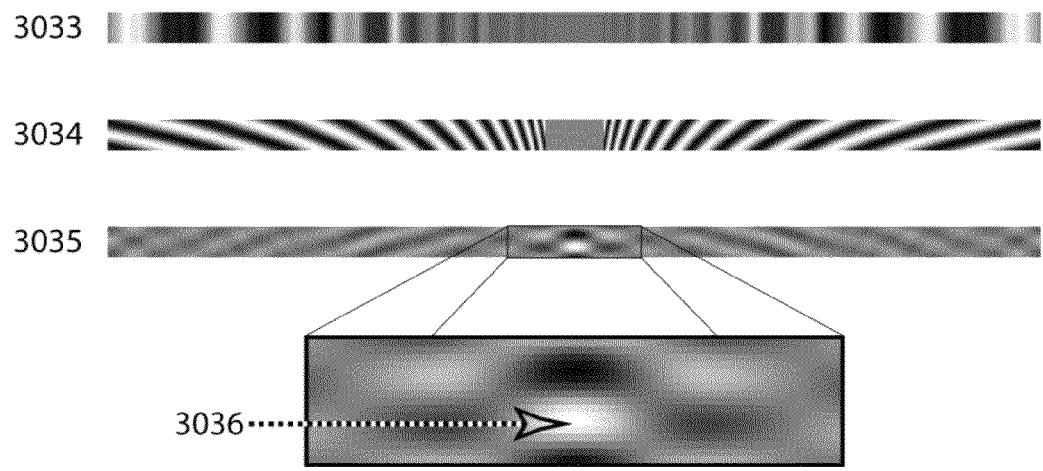
FIG. 57 shows a signature, a set of template functions and the cross-correlations of the signature with each template of this set, stacked up so as to form a grayscale image.
Figure 58:
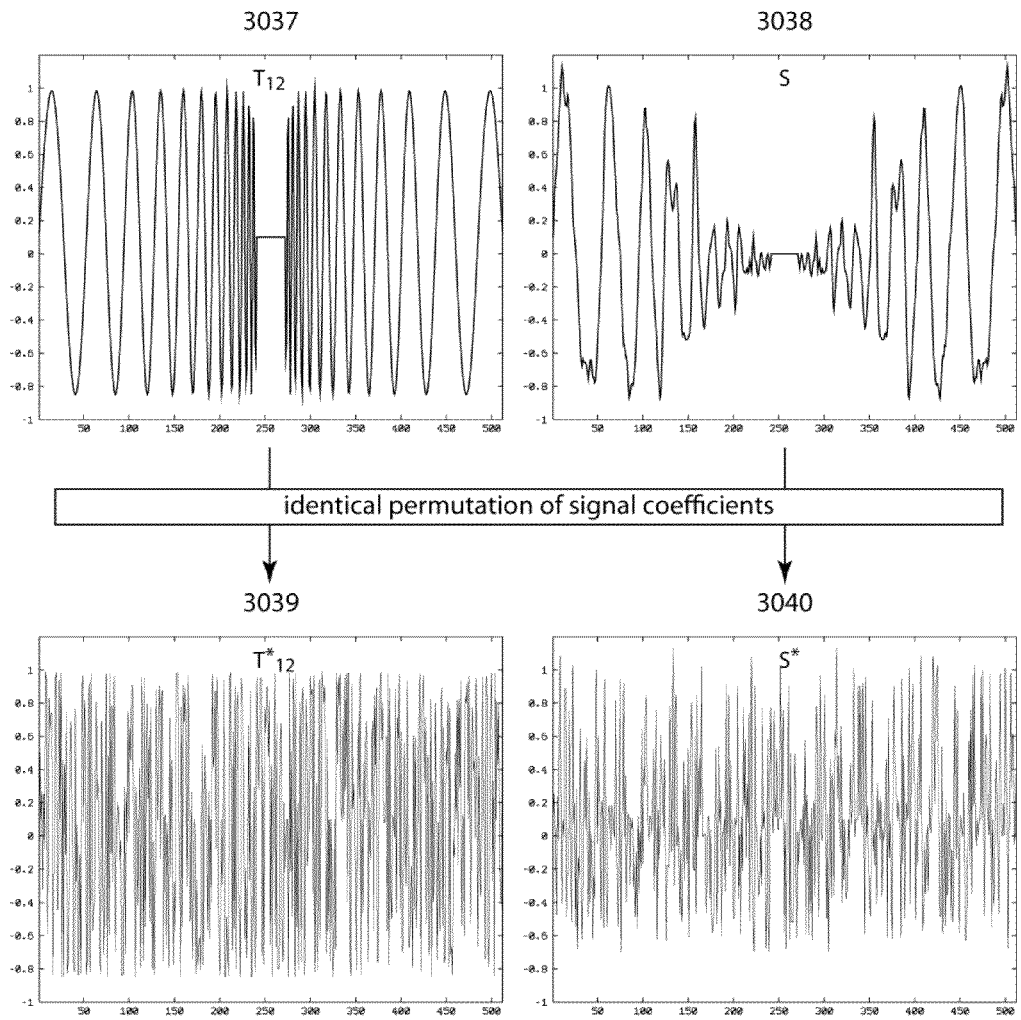
FIG. 58 shows a template and a signature that are decorrelated by a permutation of their coefficients.
Figure 59:
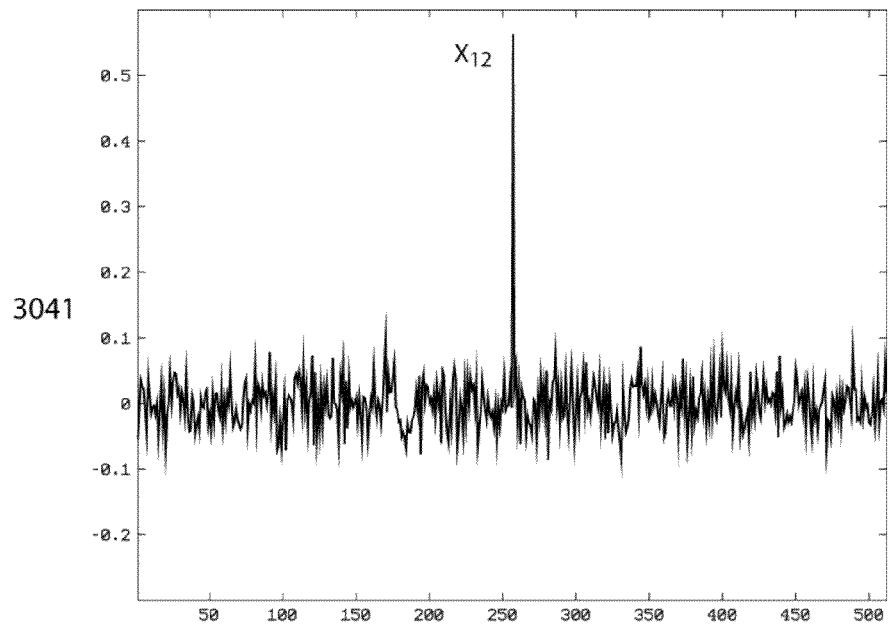
FIG. 59 shows the 1D cross-correlation of a decorrelated template function with a decorrelated signature.
Figure 60:
FIG. 60 shows a decorrelated signature, a set of decorrelated template functions and the cross-correlations of the signature with each template of this set, stacked up so as to form a grayscale image.
Figure 60:
Figure 60:
Figure 60:
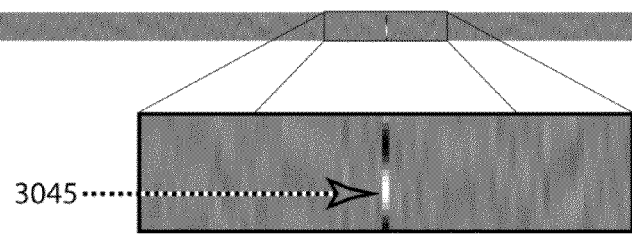
Figure 61:
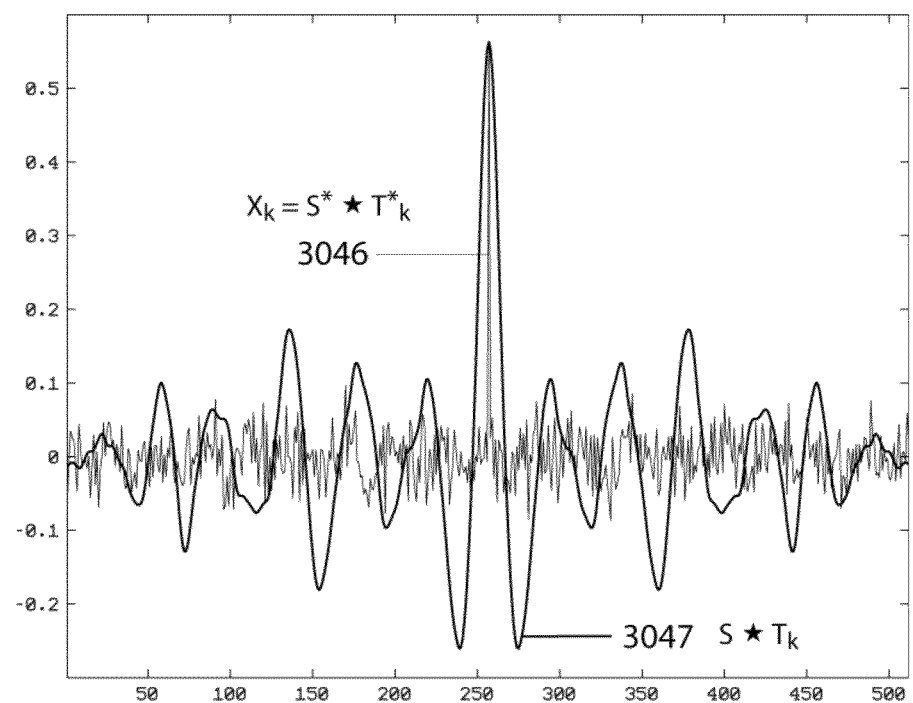
FIG. 61 shows the superposition of two cross-correlations.

M=|{u_j}| and N=s/2. The number M of elements in the coordinates sequence {u_j} and the number N of coefficients in the order statistic $\hat{R}_\rho^L$ are not necessarily equal: in this description, {u_j} has twice as many elements as $\hat{R}_\rho^L$. The result of this resampling is called the inverse-log transform Q (3017) of the order statistic $\hat{R}_\rho^L$ (3015), and is illustrated in the FIG. 46.

step 5 Since the source 1D signal potentially present in Q is periodic, flattening the envelope of Q while preserving the source 1D signal can be achieved with a simple subtraction of Q and a low-pass filtered copy of Q. In order to avoid discontinuities at the extremities of Q, an extended copy Q* (3018) of Q is created by appending a 180°-rotated copy of Q to its left (3019) and right (3020) extremities, as illustrated in the FIG. 47.

step 6 The moving window average L* of Q* (3021) is computed, as illustrated in the FIG. 48. In order to preserve the source 1D signal potentially present in Q*, the length of the moving window used in this step is an integer multiple of the period of the inverse-log transform of the source 1D signal.

step 7 L* is subtracted from Q* in order to produce a flattened version $Q_0^*$ (3022) of Q*, as illustrated in the FIG. 49. By construction, $Q_0^*$ contains only the frequency components of Q* that have a period superior or equal to the length of the moving window used to produce L* in step 6.

step 8 As illustrated in the FIG. 50, the moving window average $Q_1^*$ of $Q_0^*$ (3023) is computed so as to smooth out parasite frequency components of $Q_0^*$. These parasite components are defined as those that have a frequency far superior to the fundamental frequency that the source 1D signal would have after an inverse-log transform identical to the one used on the order statistic $\hat{R}_\rho^L$ in step 4. In order to achieve this goal, the length of the moving window used for this operation is substantially inferior to the fundamental period that the source 1D signal would have after such an inverse-log transform. $Q_1^*$ is then sectioned in three parts of equal length, and only the middle third $Q_1$ is used in the rest of the additional detection process.

step 9 $Q_1$ is optimized for a cross-correlation with the source 1D signal by applying the inverse of the transform used on $\hat{R}_\rho^L$ in step 4. Since this description uses a log-harmonic function of the form $\cos(k\pi \cdot \log_2(\rho))$ as a source 1D signal (3007), it follows that the inverse of the transform used on $\hat{R}_\rho^L$ in step 4 involves resampling $Q_1$ (3024) along a sequence of coordinates {$\rho_i$} (3025) illustrated in the FIG. 51 and given by the formula:

$$\rho_i = \frac{\log_2(\rho_0 + i) - \log_2 \rho_0}{\Delta \rho}, \text{ with}$$

$$\Delta \rho = \frac{\log_2 N - \log_2 \rho_0}{M},$$

$$M = |\{u_j\}| \text{ and } N = s/2.$$

step 10 The reverse-transformed, filtered and flattened order statistic $R_1$ (3026) illustrated in the FIG. 52 is duplicated with a vertical symmetry axis, and the symmetric duplicate $R_1'$ of $R_1$ is appended to the left of $R_1$. As illustrated in the FIG. 53, the result of this concatenation is normalized so as to have an average value of zero and a maximum amplitude of 2, and produces a 1D signal called the signature S (3027) of the image chunk (3001) extracted in step 1. The signature S produced in step 10 is used as the input of the following comparison steps, and is matched against a set of 1D template functions {$T_k$}, with the cardinality |{$T_k$}| of the set {$T_k$} typically in the range 10-20. Each template function $T_k$ of this set is obtained by a minute variation of the source 1D signal. The rationale for this set lies in the fact that the discrete Fourier transform of the image chunk obtained in step 1 is likely to exhibit artifacts such as frequency aliasing and overspill. Using carefully designed variations of the source 1D signal as a cross-correlation basis suppresses the occurrence of false negatives caused by these artifacts while having no effect on the rate of false positives. For example, the template functions $T_{13}$ and $T_{12}$ are shown in (3007) and (3028). These template functions cannot be used in the forms displayed in (3007) and (3038), however. Indeed, since the source 1D signal is self-similar by design, its auto-correlation function illustrated in the FIG. 56 exhibits many secondary peaks aside of the main, central peak. Such secondary peaks (3032) will appear with each and every signal (3029) that matches the source 1D signal (3030) sufficiently well to produce a central cross-correlation peak (3031); the FIG. 55 illustrates an example of such a matching signal (3029). These secondary peaks have the unwanted side effect of decreasing the signal-to-noise ratio of the affected cross-correlation function. This side effect is even more apparent when the 1D cross-correlations obtained by cross-correlating the signature S (3033) with the template function set {$T_k$} (3034) are stacked up so as to produces a 2D grayscale image (3035), as illustrated in the FIG. 57. This grayscale image can be interpreted as a 2D cross-correlation having many secondary peaks and a central peak (3036) that is spread out across a wide range.

step 11 In order to produce a sharp central cross-correlation peak and to suppress secondary peaks, the self-similarity must be removed from the signature S and the template functions {$T_k$}; at the same time, the similarity between S and {$T_k$} must be preserved. In order to achieve the first goal of removing the self-similarity from the template functions {$T_k$}, the individual coefficients of each $T_k$ (3037) are rearranged with a permutation, as illustrated in the FIG. 58. Initially, this permutation is drawn at random, but after this initial draw the same permutation is reused for every basis function. In order to preserve potential similarities between S and {$T_k$}, the same permutation is also applied to the coefficients of S (3038). The permutation of the template functions produce a codebook of decorrelated templates {$T^*_k$} (3039); the permutation of the signature S produces the decorrelated signature S* (3040).

step 12 A 1D cross-correlation $X_k$ (3041) with the decorrelated signature S* is computed for each decorrelated template of the codebook {$T^*_k$}; an example of such a 1D cross-correlation is illustrated in the FIG. 59. When viewed in 2D as illustrated in the FIG. 60, the cross-correlation of S* (3042) with {$T^*_k$} (3043) produces a 2D cross-correlation function (3044) with a sharp and narrow central peak (3045) and no significant secondary peaks. As illustrated in the FIG. 61, the 1D cross-correlation $X_k$ (3046) of S* and a single decorrelated template $T^*_k$ also shows no significant secondary peak when compared to the cross-correlation (3047) of the unpermuted signature S and the template $T_k$ from which S* and $T^*_k$ are derived. Theses characteristics of $X_k$ enable the output of a conclusive detection answer based on the magnitude of the central peak of $X_k$ and on the signal-to-noise ratio between this central peak and the remaining part of $X_k$. The exact detection thresholds for these values depend on a statistical test performed on a large set of data, as described in WO/2006/048368.

Assessment of the Signal Strength in Printed Banknotes

Figure 62:
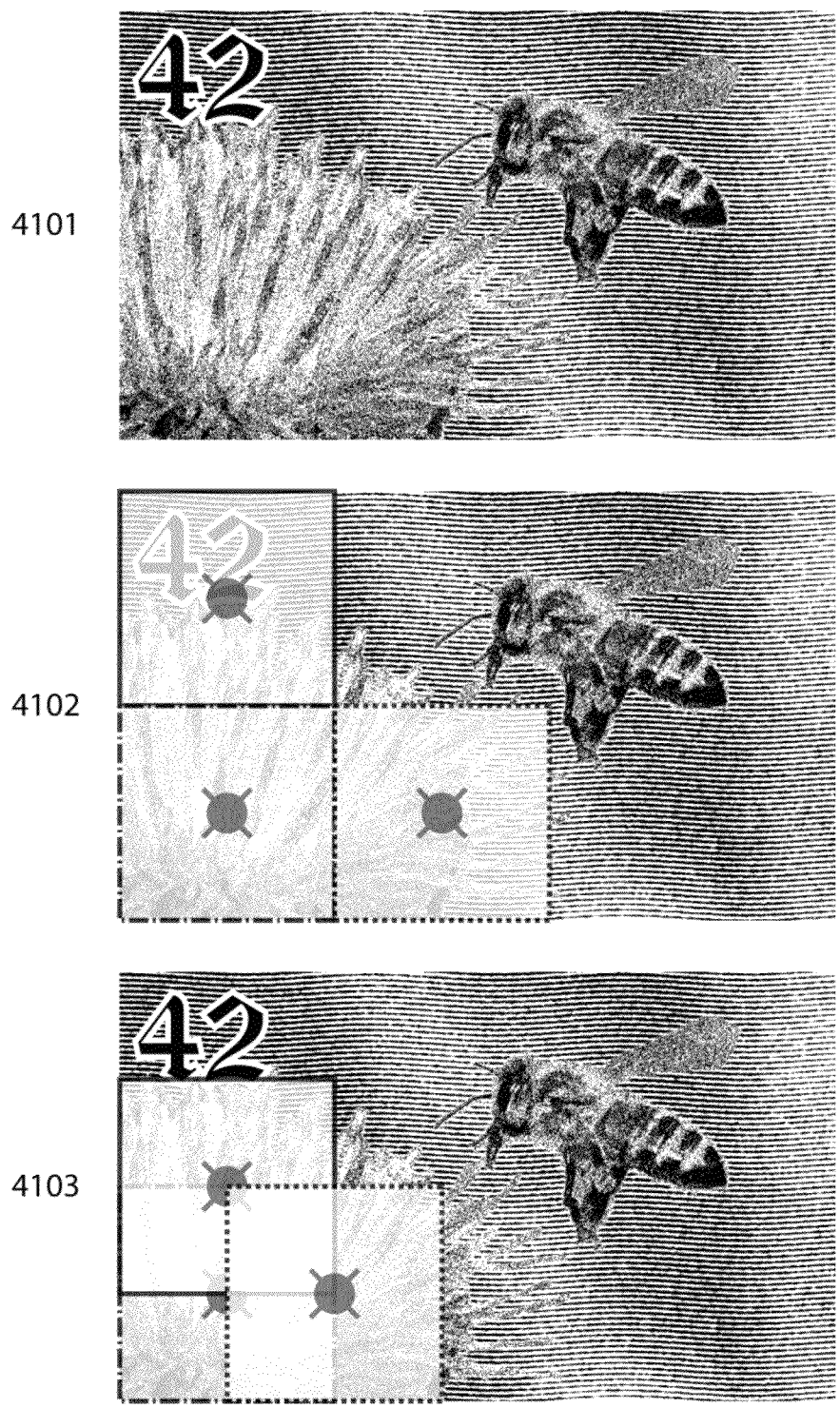
FIG. 62 shows a digital copy of a banknote, a subdivision of a digital copy in regularly spaced, non-overlapping blocks, and a subdivision of a digital copy in regularly spaced, overlapping blocks.

A printed banknote is the result of an industrial process, and as such it must undergo stringent quality controls before its release. If it is supposed to contain an embedded security pattern, the actual presence and the quality of this pattern must be assessed in order to get a reliable evaluation of the response that it will trigger when going through a signal detector. This assessment is performed on a digital copy of the banknote, usually acquired through a scanning device. As illustrated in the FIG. 62, the digital copy (4101) is subdivided into blocks of identical size that are sampled at regularly spaced intervals. If a quick assessment is desired, the sampling can be loose (4102) and there is little or no overlapping between two successive blocks. On the other hand, if a thorough assessment is desired, the sampling must be tight (4103) and there is a lot of overlapping between two successive blocks.

Figure 63:
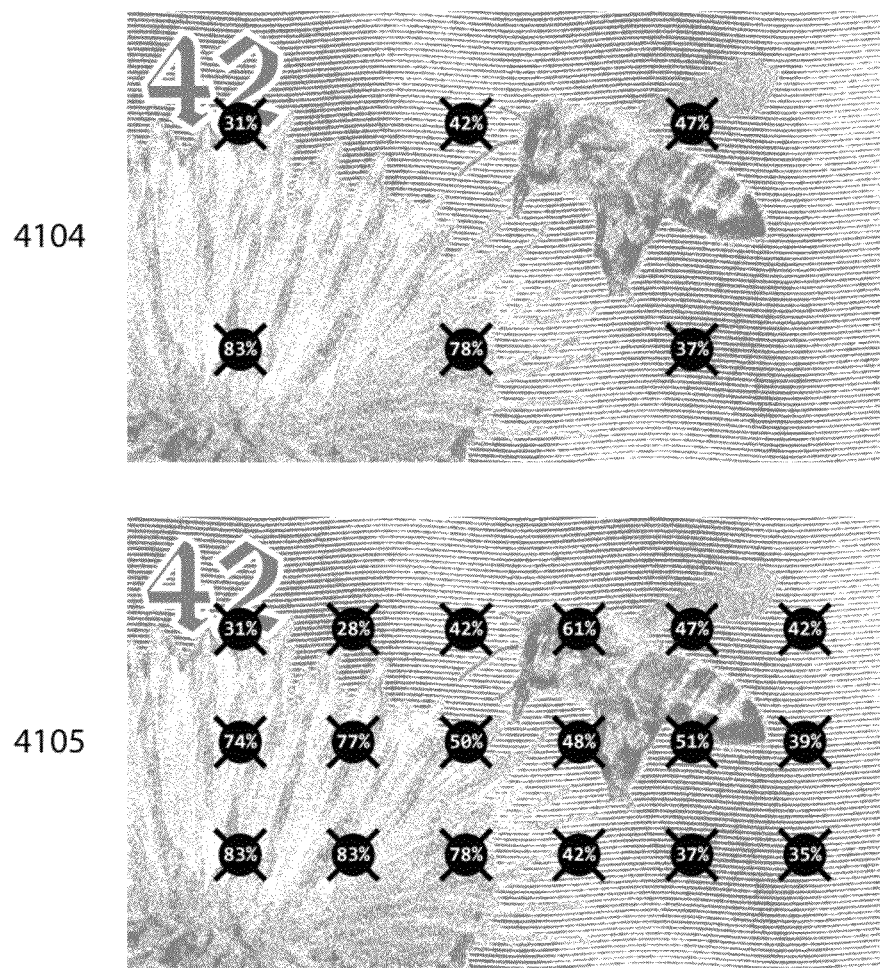
FIG. 63 shows two maps of the strength of the signal across a digital copy of a banknote, the first one with a loose sampling rate and the second one with a tight sampling rate.

Each block is subjected to a secondary detection process. The magnitude of highest cross-correlation peak $X_k$ obtained for a given block in step 12 of the secondary detection process is associated with the coordinates $\{x, y\}$ of the center of that block. The set of triples $\{x, y, X_k\}$ constitutes a map of the strength of the signal across the banknote (4104-4105), as illustrated in the FIG. 63. This map serves as a basis for a visual assessment of the quality of the banknote with respect to the signal strength. If the assessment must be automatized, several estimators may be used for deriving a single quality factor, such as the maximal signal strength over all the map, the average strength across the map, the amount of map points with a strength superior to a predefined threshold, etc.

The invention claimed is:

1. A method for generating a security bi-level image used to form one of the inks in a banknote, the method comprising the steps of:
   receiving an original bi-level image;
   obtaining a security pattern, said security pattern being obtained in the spatial domain by the inverse Fourier transform of the combination in the frequency domain between a two-dimensional phase component and a two-dimensional sweep, said two-dimensional sweep being a circularly symmetric, two-dimensional pattern created by sweeping a self-similar, one-dimensional function along a 360-degree arc, such that said security pattern being detectable from the maximum value of the cross-correlation of said one-dimensional function with the Fourier transform of one line of said banknote;
   determining a distance map of the original bi-level image;
   generating a merged image by linearly interpolating at least a part of said distance map with said security pattern; and
   thresholding the merged image to obtain the security bi-level image.

2. The method of claim 1, in which the two-dimensional phase component is a white noise pattern.

3. The method of claim 1, in which the two-dimensional phase component is subdivided into eight octants along its 90-degree and 45-degree axes of symmetry, the bottom-left octant being a white noise pattern and the remaining octants being obtained by replicating the bottom-left octant across 90-degree and 45-degree axes of symmetry.

4. The method of claim 1, in which an hexagon is inscribed in the two-dimensional phase component, said hexagon being subdivided into six equilateral triangles along its 120-degree axes of symmetry, each of the equilateral triangles being further subdivided into six right triangles along their median, the bottom-left right triangle in the bottom equilateral triangle being a white noise pattern, the remaining right triangles in the bottom equilateral triangle being obtained by replicating the bottom-left right triangle across the medians of the bottom equilateral triangle, the remaining equilateral triangles being obtained by replicating the bottom equilateral triangle across 120-degree axes of symmetry, and the part of the two-dimensional phase component outside of the hexagon being obtained by translating the hexagon.

5. The method of claim 1, in which the two-dimensional sweep is modulated with an envelope modulation function defined as a circularly symmetric sweep obtained by sweeping a monotonically decreasing 1D function.

6. The method of claim 1, in which the generation of the merged image comprises the steps of:
   determining one positive and one negative distance values (epsilon) defining the maximal and minimal distance for which interpolation is allowed on the distance map; and
   interpolating the elements of the distance map that are between the positive and negative distance values and keeping the other elements unchanged.

7. The method of claim 1, in which the original bi-level image is formed by ON and OFF dots, the ON dots corresponding to the deposit of ink, and the OFF dots corresponding to the absence of ink, the generation of the merged image comprises the steps of:
   computing the medial axes of the distance map in order to obtain two ridge maps;
   computing the distance function of the two ridge maps in order to obtain two thickness maps;
   determining a first thickness value corresponding to the minimal thickness formed by consecutive ON dots, and a second thickness value corresponding to the minimal thickness formed by consecutive OFF dots;
   interpolating the elements of the distance map having a positive value, for which the corresponding element in one of the thickness map has a value superior or equal to the first thickness value;
   interpolating the elements of the distance map having a negative value, for which the corresponding element in the other thickness map has a value superior or equal to the second thickness value; and
   keeping the other elements of the distance map unchanged.

* * * * *